United States Patent
Wenzel et al.

(10) Patent No.: US 11,409,274 B2
(45) Date of Patent: Aug. 9, 2022

(54) MODEL PREDICTIVE MAINTENANCE SYSTEM FOR PERFORMING MAINTENANCE AS SOON AS ECONOMICALLY VIABLE

(71) Applicant: Johnson Controls Technology Company, Auburn Hills, MI (US)

(72) Inventors: Michael J. Wenzel, Grafton, WI (US); Jingduo Fan, Milwaukee, WI (US); Mohammad N. Elbsat, Milwaukee, WI (US); Robert D. Turney, Watertown, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 28 days.

(21) Appl. No.: 16/697,099

(22) Filed: Nov. 26, 2019

(65) Prior Publication Data
US 2020/0096985 A1    Mar. 26, 2020

Related U.S. Application Data

(63) Continuation-in-part of application No. 15/895,836, filed on Feb. 13, 2018.
(Continued)

(51) Int. Cl.
*G05B 23/02* (2006.01)
*G05B 13/04* (2006.01)

(52) U.S. Cl.
CPC ....... *G05B 23/0283* (2013.01); *G05B 13/047* (2013.01); *G05B 13/048* (2013.01)

(58) Field of Classification Search
CPC ............ G05B 23/0283; G05B 23/0294; G05B 13/047; G05B 13/048; G06Q 30/0206;
(Continued)

(56) References Cited

U.S. PATENT DOCUMENTS 5,216,612 A    6/1993  Cornett et al.
5,630,070 A    5/1997  Dietrich et al.
(Continued)

FOREIGN PATENT DOCUMENTS

CA    2499695        4/2004
EP    3 088 972 A2   11/2016
(Continued)

OTHER PUBLICATIONS

International Search Report and Written Opinion on PCT/US2020/042916, dated Oct. 8, 2020, 14 pages.
(Continued)

*Primary Examiner* — Juan C Ochoa
(74) *Attorney, Agent, or Firm* — Foley & Lardner LLP

(57) ABSTRACT

A model predictive maintenance system for building equipment that performs operations including obtaining an objective function defining a cost of operating and performing maintenance on the equipment as a function of operating and maintenance decisions for time steps within a time period of a life cycle horizon and including performing a first computation of the objective function under a first scenario where maintenance is performed on the equipment during the period, a result of the first computation indicating a first cost. The operations include performing a second computation under a second scenario in which maintenance is not performed during the period, a result indicating a second cost. The operations include initiating an automated action to perform maintenance on the equipment in accordance with decisions defined by the first scenario if the first cost is less than or equal to the second cost.

20 Claims, 13 Drawing Sheets

Related U.S. Application Data

(60) Provisional application No. 62/511,113, filed on May 25, 2017.

(58) Field of Classification Search
CPC ... G06Q 10/20; G06Q 10/06315; G06Q 50/08
USPC ........................................................ 703/2, 6
See application file for complete search history.

(56) References Cited

U.S. PATENT DOCUMENTS

| | | |
|---|---|---|
| 7,062,361 B1 | 6/2006 | Lane |
| 7,124,059 B2 | 10/2006 | Wetzer et al. |
| 7,457,762 B2 | 11/2008 | Wetzer et al. |
| 7,464,046 B2 | 12/2008 | Wilson et al. |
| 7,693,735 B2 | 4/2010 | Carmi et al. |
| 8,014,892 B2 | 9/2011 | Glasser |
| 8,126,574 B2 | 2/2012 | Discenzo et al. |
| 8,170,893 B1 | 5/2012 | Rossi |
| 8,396,571 B2 | 3/2013 | Costiner et al. |
| 8,880,962 B2 | 11/2014 | Hosking et al. |
| 8,903,554 B2 | 12/2014 | Stagner |
| 9,058,568 B2 | 6/2015 | Hosking et al. |
| 9,058,569 B2 | 6/2015 | Hosking et al. |
| 9,185,176 B2 | 11/2015 | Nielsen et al. |
| 9,235,847 B2 | 1/2016 | Greene et al. |
| 9,424,693 B2 | 8/2016 | Rodrigues |
| 9,514,577 B2 | 12/2016 | Ahn et al. |
| 9,740,545 B2 | 8/2017 | Aisu et al. |
| 9,760,068 B2 | 9/2017 | Harkonen et al. |
| 10,094,586 B2 | 10/2018 | Pavlovski et al. |
| 10,101,731 B2 | 10/2018 | Asmus et al. |
| 10,190,793 B2 | 1/2019 | Drees et al. |
| 10,250,039 B2 | 4/2019 | Wenzel et al. |
| 10,359,748 B2 | 7/2019 | Elbsat et al. |
| 10,437,241 B2 * | 10/2019 | Higgins ................. G06Q 10/20 |
| 10,438,303 B2 | 10/2019 | Chen et al. |
| 10,591,875 B2 | 3/2020 | Shanmugam et al. |
| 10,700,942 B2 | 6/2020 | Hamilton et al. |
| 10,762,475 B2 | 9/2020 | Song et al. |
| 11,003,175 B2 | 5/2021 | Xenos et al. |
| 2002/0072988 A1 | 6/2002 | Aram |
| 2003/0158803 A1 | 8/2003 | Darken et al. |
| 2004/0049295 A1 | 3/2004 | Wojsznis et al. |
| 2004/0054564 A1 | 3/2004 | Fonseca et al. |
| 2005/0091004 A1 | 4/2005 | Parlos et al. |
| 2007/0005191 A1 | 1/2007 | Sloup et al. |
| 2007/0203860 A1 | 8/2007 | Golden et al. |
| 2009/0204267 A1 | 8/2009 | Sustaeta et al. |
| 2009/0210081 A1 * | 8/2009 | Sustaeta ................. H04L 67/125 715/702 |
| 2009/0240381 A1 | 9/2009 | Lane |
| 2009/0313083 A1 | 12/2009 | Dillon et al. |
| 2009/0319090 A1 | 12/2009 | Dillon et al. |
| 2010/0241285 A1 | 9/2010 | Johnson et al. |
| 2011/0018502 A1 | 1/2011 | Bianciotto et al. |
| 2011/0035328 A1 | 2/2011 | Nielsen et al. |
| 2011/0093310 A1 | 4/2011 | Watanabe et al. |
| 2011/0130857 A1 | 6/2011 | Budiman et al. |
| 2011/0178643 A1 | 7/2011 | Metcalfe |
| 2011/0231028 A1 | 9/2011 | Ozog |
| 2011/0231320 A1 | 9/2011 | Irving |
| 2012/0016607 A1 | 1/2012 | Cottrell et al. |
| 2012/0036250 A1 | 2/2012 | Vaswani et al. |
| 2012/0092180 A1 | 4/2012 | Rikkola et al. |
| 2012/0245968 A1 | 9/2012 | Beaulieu et al. |
| 2012/0296482 A1 | 11/2012 | Steven et al. |
| 2012/0310860 A1 | 12/2012 | Kim et al. |
| 2012/0316906 A1 | 12/2012 | Hampapur et al. |
| 2013/0006429 A1 | 1/2013 | Shanmugam et al. |
| 2013/0010348 A1 | 1/2013 | Massard et al. |
| 2013/0020443 A1 | 1/2013 | Dyckrup et al. |
| 2013/0103481 A1 | 4/2013 | Carpenter et al. |
| 2013/0113413 A1 | 5/2013 | Harty |
| 2013/0204443 A1 | 8/2013 | Steven et al. |
| 2013/0274937 A1 | 10/2013 | Ahn et al. |
| 2013/0282195 A1 * | 10/2013 | O'Connor ............. G05B 13/04 700/291 |
| 2013/0339080 A1 | 12/2013 | Beaulieu et al. |
| 2014/0039709 A1 | 2/2014 | Steven et al. |
| 2014/0163936 A1 | 6/2014 | Hosking et al. |
| 2014/0201018 A1 | 7/2014 | Chassin |
| 2014/0244051 A1 | 8/2014 | Rollins et al. |
| 2014/0249680 A1 | 9/2014 | Wenzel |
| 2014/0277769 A1 | 9/2014 | Matsuoka et al. |
| 2014/0316973 A1 | 10/2014 | Steven et al. |
| 2015/0008884 A1 | 1/2015 | Waki et al. |
| 2015/0088576 A1 | 3/2015 | Steven et al. |
| 2015/0134123 A1 | 5/2015 | Obinelo |
| 2015/0309495 A1 | 10/2015 | Delorme et al. |
| 2015/0311713 A1 | 10/2015 | Asghari et al. |
| 2015/0316903 A1 | 11/2015 | Asmus et al. |
| 2015/0316907 A1 | 11/2015 | Elbsat et al. |
| 2015/0326015 A1 | 11/2015 | Steven et al. |
| 2015/0331972 A1 | 11/2015 | McClure et al. |
| 2015/0371328 A1 | 12/2015 | Gabel et al. |
| 2016/0020608 A1 | 1/2016 | Carrasco et al. |
| 2016/0043550 A1 | 2/2016 | Sharma et al. |
| 2016/0077880 A1 | 3/2016 | Santos et al. |
| 2016/0092986 A1 | 3/2016 | Lian et al. |
| 2016/0148137 A1 | 5/2016 | Phan et al. |
| 2016/0148171 A1 | 5/2016 | Phan et al. |
| 2016/0190805 A1 | 6/2016 | Steven et al. |
| 2016/0209852 A1 | 7/2016 | Beyhaghi et al. |
| 2016/0216722 A1 | 7/2016 | Tokunaga et al. |
| 2016/0218505 A1 | 7/2016 | Krupadanam et al. |
| 2016/0246908 A1 | 8/2016 | Komzsik |
| 2016/0275630 A1 | 9/2016 | Strelec et al. |
| 2016/0281607 A1 | 9/2016 | Asati et al. |
| 2016/0305678 A1 | 10/2016 | Pavlovski et al. |
| 2016/0329708 A1 | 11/2016 | Day |
| 2016/0356515 A1 | 12/2016 | Carter |
| 2016/0363948 A1 | 12/2016 | Steven et al. |
| 2016/0373453 A1 | 12/2016 | Ruffner et al. |
| 2016/0379149 A1 | 12/2016 | Saito et al. |
| 2017/0003667 A1 | 1/2017 | Nakabayashi et al. |
| 2017/0083822 A1 | 3/2017 | Adendorff et al. |
| 2017/0097647 A1 | 4/2017 | Lunani et al. |
| 2017/0102162 A1 | 4/2017 | Drees et al. |
| 2017/0102433 A1 | 4/2017 | Wenzel et al. |
| 2017/0102434 A1 | 4/2017 | Wenzel et al. |
| 2017/0102675 A1 | 4/2017 | Drees |
| 2017/0103483 A1 | 4/2017 | Drees et al. |
| 2017/0104332 A1 | 4/2017 | Wenzel et al. |
| 2017/0104336 A1 | 4/2017 | Elbsat et al. |
| 2017/0104337 A1 | 4/2017 | Drees |
| 2017/0104342 A1 | 4/2017 | Elbsat et al. |
| 2017/0104343 A1 | 4/2017 | Elbsat et al. |
| 2017/0104344 A1 | 4/2017 | Wenzel et al. |
| 2017/0104345 A1 | 4/2017 | Wenzel et al. |
| 2017/0104346 A1 | 4/2017 | Wenzel et al. |
| 2017/0104449 A1 | 4/2017 | Drees |
| 2017/0167742 A1 | 6/2017 | Radovanovic et al. |
| 2017/0169143 A1 | 6/2017 | Farahat et al. |
| 2017/0205818 A1 | 7/2017 | Adendorff et al. |
| 2017/0236222 A1 | 8/2017 | Chen et al. |
| 2017/0268795 A1 | 9/2017 | Yamamoto et al. |
| 2017/0288455 A1 | 10/2017 | Fife |
| 2017/0309094 A1 | 10/2017 | Farahat et al. |
| 2017/0351234 A1 | 12/2017 | Chen et al. |
| 2017/0366414 A1 | 12/2017 | Hamilton et al. |
| 2018/0046149 A1 | 2/2018 | Ahmed |
| 2018/0082373 A1 | 3/2018 | Hong et al. |
| 2018/0173214 A1 | 6/2018 | Higgins et al. |
| 2018/0180314 A1 | 6/2018 | Brisette et al. |
| 2018/0196456 A1 | 7/2018 | Elbsat |
| 2018/0197253 A1 | 7/2018 | Elbsat et al. |
| 2018/0203961 A1 | 7/2018 | Aisu et al. |
| 2018/0224814 A1 | 8/2018 | Elbsat et al. |
| 2018/0341255 A1 | 11/2018 | Turney et al. |
| 2018/0373234 A1 | 12/2018 | Khalate et al. |
| 2019/0066236 A1 | 2/2019 | Wenzel |
| 2019/0129403 A1 | 5/2019 | Turney et al. |
| 2019/0271978 A1 | 9/2019 | Elbsat et al. |

(56) References Cited

U.S. PATENT DOCUMENTS

| | | | |
|---|---|---|---|
| 2019/0295034 A1 | 9/2019 | Wenzel et al. | |
| 2019/0311332 A1 | 10/2019 | Turney et al. | |
| 2019/0325368 A1 | 10/2019 | Turney et al. | |
| 2019/0338972 A1 | 11/2019 | Schuster et al. | |
| 2019/0338973 A1 | 11/2019 | Turney et al. | |
| 2019/0338974 A1 | 11/2019 | Turney et al. | |
| 2019/0338977 A1 | 11/2019 | Turney et al. | |
| 2019/0347622 A1 | 11/2019 | Elbsat et al. | |
| 2019/0354071 A1 | 11/2019 | Turney et al. | |
| 2020/0090289 A1 | 3/2020 | Elbsat et al. | |
| 2020/0096985 A1 | 3/2020 | Wenzel et al. | |
| 2020/0166230 A1 | 5/2020 | Ng et al. | |
| 2020/0284458 A1 | 9/2020 | Yoshida et al. | |

FOREIGN PATENT DOCUMENTS

| | | | |
|---|---|---|---|
| EP | 3 447 258 A1 | 2/2019 | |
| JP | 2001-357112 | 12/2001 | |
| JP | 2003-141178 | 5/2003 | |
| JP | 2005-148955 A | 6/2005 | |
| JP | 2005-182465 | 7/2005 | |
| JP | 2010-078447 A | 4/2010 | |
| JP | 2012-073866 | 4/2012 | |
| WO | WO-2011/080547 A1 | 7/2011 | |
| WO | WO-2012/145563 A1 | 10/2012 | |
| WO | WO-2014/143908 A1 | 9/2014 | |
| WO | WO-2015/031581 A1 | 3/2015 | |
| WO | WO-2016/144586 | 9/2016 | |
| WO | WO-2018/217251 A1 | 11/2018 | |

OTHER PUBLICATIONS

International Search Report and Written Opinion on PCT/US2020/045238, dated Oct. 26, 2020, 14 pages.
U.S. Appl. No. 16/034,057, filed Jul. 12, 2018, Johnson Controls Technology Company.
U.S. Appl. No. 16/294,433, filed Mar. 6, 2019, Hitachi-Johnson Controls Air Conditioning, Inc.
Afram et al., Artificial Neural Network (ANN) Based Model Predictive Control (MPC) and Optimization of HVAC Systems: A State of the Art Review and Case Study of a Residential HVAC System, Apr. 15, 2017.
Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 14 pages.
De Carlo et al., Maintenance Cost Optimization in Condition Based Maintenance: A Case Study for Critical Facilities, Oct.-Nov. 2013, 7 pages.
Diederik Kingma and Jimmy Ba. Adam: A Method for Stochastic Optimization. In International Conference on Learning Representations (ICLR), 2015, 15 pages.
Ebbers et al. "Smarter Data Centers—Achieving Great Efficiency—Second Edition", Oct. 21, 2011, 138 pages.
Extended European Search Report on European Patent Application No. 18150740.1 dated May 16, 2018. 7 pages.
Extended European Search Report on European Patent Application No. 18155069.0 dated Jun. 11, 2018. 6 pages.
Extended European Search Report on European Patent Application No. 18190786.6 dated Oct. 10, 2018. 7 pages.
Extended European Search Report on EP Patent Application No. 18176474 dated Sep. 5, 2018. 8 pages.
George EP Box, Gwilym M Jenkins, Gregory C Reinsei, and Greta M Ljung. Time Series Analysis: Forecasting and Control. John Wiley & Sons, 2015, chapters 13-15. 82 pages.
International Search Report and Written Opinion for PCT/US2018/018039, dated Apr. 24, 2018, 14 pages.
Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 12 pages.
K. J. Astrom. Optimal Control of Markov Decision Processes with Incomplete State Estimation. J. Math. Anal. Appl., 10:174-205, 1965. 32 pages.
Kelman and F. Borrelli. Bilinear Model Predictive Control of a HVAC System Using Sequential Quadratic Programming. In Proceedings of the 2011 IFAC World Congress, 2011, 6 pages.
Lennart Ljung and Torsten Soderstrom. Theory and practice of recursive identification, vol. 5. JSTOR, 1983, chapters 2, 3 & 7, 80 pages.
Lennart Ljung, editor. System Identification: Theory for the User (2nd Edition). Prentice Hall, Upper Saddle River, New Jersey, 1999, chapters 5 and 7, 40 pages.
Moritz Hardt, Tengyu Ma, and Benjamin Recht. Gradient Descent Learns Linear Dynamical Systems. arXiv preprint arXiv:1609.05191, 2016, 44 pages.
Moseley et al. "Electrochemical Energy Storage for Renewable Sources and Grid Balancing" Nov. 7, 2014. 14 pages.
Nevena et al. Data center cooling using model-predictive control, 10 pages. 2018.
PJM Economic Demand Resource in Energy Market, PJM State and Member Training Department, 2014, 119 pages.
PJM Manual 11: Energy & Ancillary Services Market Operations, pp. 122-137, PJM, 2015.
PJM Open Access Transmission Tariff, Section 3.3A, Apr. 4, 2016, 10 pages.
Sergio Bittanti, Marco C Campi, et al. Adaptive Control of Linear Time Invariant Systems: The "Bet on the Best" Principle. Communications in Information & Systems, 6(4):299-320, 2006. 21 pages.
Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 21 pages.
Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012. 8 pages.
U.S. Appl. No. 62/673,479, filed May 18, 2018, Johnson Controls Technology Co.
U.S. Appl. No. 62/673,496, filed May 18, 2018, Johnson Controls Technology Co.
U.S. Appl. No. 62/853,983, filed May 29, 2019, Johnson Controls Technology Co.
Ahou et al., "Reliability-centered predictive maintenance scheduling for a continuously monitored system subject to degradation," Reliability Engineering & System Safety, 2007, 92.4, pp. 530-534.
Aynur, "Variable refrigerant flow systems: A review." Energy and Buildings, 2010, 42.7, pp. 1106-1112.
Chan et al., "Estimation of Degradation-Based Reliability in Outdoor Environments," Statistics Preprints, Jun. 19, 2001, 25, 33 pages.
Chu et al., "Predictive maintenance: The one-unit replacement model," International Journal of Production Economics, 1998, 54.3, pp. 285-295.
Chua et al., "Achieving better energy-efficient air conditioning—a review of technologies and strategies," Applied Energy, 2013, 104, pp. 87-104.
Crowder et al., "The Use of Degradation Measures to Design Reliability Test Plans." World Academy of Science, Engineering and Technology, International Journal of Mathematical, Computational, Physical, Electrical and Computer Engineering, 2014, 8, 18 pages.
Costa et al., "A multi-criteria model for auditing a Predictive Maintenance Programme," European Journal of Operational Research, Sep. 29, 2011, 217.2, pp. 381-393.
Emmerich et al., "State-of-the-Art Review of CO2 Demand Controlled Ventilation Technology and Application," NISTIR, Mar. 2001, 47 pages.

(56) References Cited

OTHER PUBLICATIONS

Fu et al., "Predictive Maintenance in Intelligent-Control-Maintenance-Management System for Hydroelectric Generating Unit," IEEE Transactions on Energy Conversion, Mar. 2004, 19.1, pp. 179-186.
Fuller, Life-Cycle Cost Analysis (LCCA) I WBDG—Whole Building Design Guide, National Institute of Standards and Technology (NIST), https://www.wbdg.org/resources/life-cycle-cost-analysis-lcca, 2016, pp. 1-13.
Gedam, "Optimizing R&M Performance of a System Using Monte Carlo Simulation", 2012 Proceedings Annual Reliability and Maintainability Symposium, 2012, pp. 1-6.
Grall et al., "Continuous-Time Predictive-Maintenance Scheduling for a Deteriorating System," IEEE Transactions on Reliability, Jun. 2002, 51.2, pp. 141-150.
Hagmark, et al., "Simulation and Calculation of Reliability Performance and Maintenance Costs", 2007 Annual Reliability and Maintainability Symposium, IEEE Xplore, 2007, pp. 34-40, 2007.
Hong et al. "Development and Validation of a New Variable Refrigerant Flow System Model in Energyplus," Energy and Buildings, 2016, 117, pp. 399-411.
Hong et al., "Statistical Methods for Degradation Data With Dynamic Covariates Information and an Application to Outdoor Weathering Data," Technometrics, Nov. 2014, 57.2, pp. 180-193.
JP2003141178 WIPO Translation, Accessed Feb. 18, 2020, 15 pages.
Kharoufeh et al., "Semi-Markov Models for Degradation-Based Reliability," IIE Transactions, May 2010, 42.8, pp. 599-612.
Li et al., "Reliability Modeling and Life Estimation Using an Expectation Maximization Based Wiener Degradation Model for Momentum Wheels" IEEE Transactions on Cybernetics, May 2015, 45.5, pp. 969-977.
Mohsenian-Rad et al., "Smart Grid for Smart city Activities in the California City of Riverside," In: Alberto Leon-Garcia et al.: "Smart City 360°", Aug. 6, 2016, 22 Pages.
Office Action on EP 18150740.1, dated Nov. 5, 2019, 6 pages.
Office Action on EP 18176474.7 dated Sep. 11, 2019. 5 pages.
Office Action on EP 18176474.7, dated Feb. 10, 2020, 6 pages.
Office Action on EP 18190786.6, dated Feb. 5, 2020, 4 pages.
Pan et al., "Reliability modeling of degradation of products with multiple performance characteristics based on gamma processes," Reliability Engineering & System Safety, 2011, 96.8, pp. 949-957.
Peng et al., "Bayesian Degradation Analysis with Inverse Gaussian Process Models Under Time-Varying Degradation Rates," IEEE Transactions on Reliability, Mar. 2017, 66.1, pp. 84-96.
Peng et al., "Bivariate Analysis of Incomplete Degradation Observations Based on Inverse Gaussian Processes and Copulas," IEEE Transactions on Reliability, Jun. 2016, 65.2, pp. 624-639.
Peng et al., "Switching State-Space Degradation Model with Recursive Filter/Smoother for Prognostics of Remaining Useful Life," IEEE Transactions on Industrial Informatics, Feb. 2019, 15.2, pp. 822-832.
Perez-Lombard et al., "A review on buildings energy consumption information," Energy and Buildings, 2008, 40.3, pp. 394-398.
Rahman et al., "Cost Estimation for Maintenance Contracts for Complex Asset/Equipment", 2008 IEEE International Conference on Industrial Engineering and Engineering Management, 2008, pp. 1355-1358.

Ruijters et. al., "Fault Maintenance Trees: Reliability Centered Maintenance via Statistical Model Checking", 2016 Annual Reliability and Maintainability Symposium (RAMS), Jan. 25-28, 2016, pp. 1-6.
Wan et al., "Data Analysis and Reliability Estimation of Step-Down Stress Accelerated Degradation Test Based on Wiener Process," Prognostics and System Health Management Conference (PHM-2014 Hunan), Aug. 2014, 5 pages.
Wang et al., "Reliability and Degradation Modeling with Random or Uncertain Failure Threshold," Reliability and Maintainability Symposium, 2007, pp. 392-397.
Xiao et al., "Optimal Design for Destructive Degradation Tests with Random Initial Degradation Values Using the Wiener Process," IEEE Transactions on Reliability, Sep. 2016, 65.3, pp. 1327-1342.
Xu et al., "Real-time Reliability Prediction for a Dynamic System Based on the Hidden Degradation Process Identification," IEEE Transactions on Reliability, Jun. 2008, 57.2, pp. 230-242.
Yang et al., "Thermal comfort and building energy consumption implications—a review," Applied Energy, 2014, 115, pp. 164-173.
Zhang et al., "A Novel Variable Refrigerant Flow (VRF) Heat Recovery System Model: Development and Validation," Energy and Buildings, Jun. 2018, 168, pp. 399-412.
Zhang et al., "An Age- and State-Dependent Nonlinear Prognostic Model for Degrading Systems," IEEE Transactions on Reliability, Dec. 2015, 64.4, pp. 1214-1228.
Zhang et al., "Analysis of Destructive Degradation Tests for a Product with Random Degradation Initiation Time," IEEE Transactions on Reliability, Mar. 2015, 64.1, pp. 516-527.
Zhou et al. "Asset Life Prediction Using Multiple Degradation Indicators and Lifetime Data: a Gamma-Based State Space Model Approach," 2009 8th International Conference on Reliability, Maintainability and Safety, Aug. 2009, 5 pages.
Extended European Search Report on EP 18806317.6, dated Jun. 17, 2021, 10 pages.
Moon, Jin Woo, "Performance of ANN-based predictive and adaptive thermal-control methods for disturbances in and around residential buildings," Building and Environment, 2012, vol. 48, pp. 15-26.
Weigel et al., "Applying GIS and OR Techniques to Solve Sears Technician-Dispatching and Home Delivery Problems," Interface, Jan.-Feb. 1999, 29:1, pp. 112-130.
Doring, Matthias, "Prediction vs Forecasting: Predictions do not always concern the future . . . ," Data Science Blog, URL: https://www.datascienceblog.net/post/machine-learning/forecasting_vs_prediction/, 3 pages, Dec. 9, 2018, 3 pages.
JP Office Action on JP 2020-107153, dated Oct. 5, 2021, 7 pages with English language translation.
Furuta et al., "Optimal Allocation of Fuzzy Controller and its rule tuning for Structural Vibration," Journal of Japan Society for Fuzzy Theory and Intelligent Informatics, Dec. 2008, vol. 20, No. 6 (pp. 921-934).
JP Office Action on JP Appl. Ser. No. 2020-109855 dated Dec. 7, 2021 (10 pages).
International Preliminary Report on Patentability on PCT Appl. Ser. No. PCT/US2020/045238 dated Feb. 17, 2022 (8 pages).
International Preliminary Report on Patentability on PCT Appl. Ser. No. PCT/US2020/042916 dated Feb. 3, 2022 (8 pages).
Japanese Office Action on JP Appl. No. 2019-554919 dated Mar. 29, 2022 (9 pages with English language translation).

\* cited by examiner

MODEL PREDICTIVE MAINTENANCE SYSTEM FOR PERFORMING MAINTENANCE AS SOON AS ECONOMICALLY VIABLE

CROSS-REFERENCE TO RELATED PATENT APPLICATIONS

This application is a continuation-in-part of U.S. patent application Ser. No. 15/895,836 filed Feb. 13, 2018, which claims the benefit of and priority to U.S. Provisional Patent Application No. 62/511,113 filed May 25, 2017. The entire contents of both these patent applications are incorporated herein by reference.

BACKGROUND

The present disclosure relates generally to a maintenance system for building equipment and more particularly to a maintenance system that determines a maintenance and replacement strategy for the building equipment that is economically viable for a customer.

Building equipment is typically maintained according to a maintenance strategy for the building equipment. One type of maintenance strategy is run-to-fail. The run-to-fail strategy allows the building equipment to run until a failure occurs. During this running period, only minor operational maintenance tasks (e.g., oil changes) are performed to maintain the building equipment.

Another type of maintenance strategy is preventative maintenance. The preventative maintenance strategy typically involves performing a set of preventative maintenance tasks recommended by the equipment manufactured. The preventative maintenance tasks are usually performed at regular intervals (e.g., every month, every year, etc.) which may be a function of the elapsed time of operation and/or the run hours of the building equipment.

However, these forms of maintenance may result in additional costs being incurred by a customer and may reduce an amount of business for a maintenance provider. As such, an alternative maintenance strategy that can reduce costs while providing additional business for the maintenance provider may be preferable.

SUMMARY

One implementation of the present disclosure is a model predictive maintenance system for building equipment, according to some embodiments. The system includes one or more processing circuits including one or more processors and memory storing instructions that, when executed by the one or more processors, cause the one or more processors to perform operations, according to some embodiments. The operations include obtaining an objective function that defines a cost of operating the building equipment and performing maintenance on the building equipment as a function of operating decisions and maintenance decisions for the building equipment for time steps within a time period of a life cycle horizon, according to some embodiments. The operations include performing a first computation of the objective function under a first scenario in which maintenance is performed on the building equipment during the time period, according to some embodiments. A result of the first computation indicates a first cost of operating and performing maintenance on the building equipment over the time period, according to some embodiments. The operations include performing a second computation of the objective function under a second scenario in which maintenance is not performed on the building equipment during the time period, according to some embodiments. A result of the second computation indicates a second cost of operating the building equipment over the time period, according to some embodiments. The operations include initiating an automated action to perform maintenance on the building equipment during the time period in accordance with operating decisions and maintenance decisions defined by the first scenario in response to a determination that the first cost is less than or equal to the second cost, according to some embodiments.

In some embodiments, the first computation and the second computation are performed using a model that defines evolution of building equipment degradation over time and an effect of the building equipment degradation on performance of the building equipment.

In some embodiments, the objective function further defines a cost of replacing the building equipment as a function of replacement decisions for the building equipment for the time steps within the time period.

In some embodiments, the operations include, in response to a determination that the first cost is greater than the second cost, shifting the time period forward in time and repeating the first computation and the second computation until the first cost is less than or equal to the second cost.

In some embodiments, the operations include repeating the shifting, the first computation, and the second computation until an end of the time period is equal to or exceeds an end of the life cycle horizon such that a maintenance schedule is generated for an entirety of the life cycle horizon.

In some embodiments, the objective function defines an interest rate. The interest rate indicates a value of money at a future time step, according to some embodiments. The first computation and the second computation are performed subject to the interest rate, according to some embodiments.

In some embodiments, the operations include determining a set of operating states for the building equipment over the time period by performing at least one of an optimization or an analysis based on historical operating states. The first computation and the second computation are performed based on the set of operating states to determine operational costs under the first scenario and second scenario, according to some embodiments.

Another implementation of the present disclosure is a method for performing model predictive maintenance of building equipment, according to some embodiments. The method includes obtaining an objective function that defines a cost of operating the building equipment and performing maintenance on the building equipment as a function of operating decisions and maintenance decisions for the building equipment for time steps within a time period of a life cycle horizon, according to some embodiments. The method includes performing a first computation of the objective function under a first scenario in which maintenance is performed on the building equipment during the time period, according to some embodiments. A result of the first computation indicating a first cost of operating and performing maintenance on the building equipment over the time period, according to some embodiments. The method includes performing a second computation of the objective function under a second scenario in which maintenance is not performed on the building equipment during the time period, according to some embodiments. A result of the second computation indicates a second cost of operating the building equipment over the time period, according to some embodiments. The method includes initiating an automated action to perform maintenance on the building equipment during the time period in accordance with operating decisions and maintenance decisions defined by the first scenario in response to a determination that the first cost is less than or equal to the second cost, according to some embodiments.

In some embodiments, the first computation and the second computation are performed using a model that defines evolution of building equipment degradation over time and an effect of the building equipment degradation on performance of the building equipment.

In some embodiments, the objective function further defines a cost of replacing the building equipment as a function of replacement decisions for the building equipment for the time steps within the time period.

In some embodiments, the method includes, in response to a determination that the first cost is greater than the second cost, shifting the time period forward in time and repeating the first computation and the second computation until the first cost is less than or equal to the second cost.

In some embodiments, the method includes repeating the shifting, the first computation, and the second computation until an end of the time period is equal to or exceeds an end of the life cycle horizon such that a maintenance schedule is generated for an entirety of the life cycle horizon.

In some embodiments, the objective function defines an interest rate. The interest rates indicates a value of money at a future time step, according to some embodiments. The first computation and the second computation are performed subject to the interest rate, according to some embodiments.

In some embodiments, the method includes determining a set of operating states for the building equipment over the time period by performing at least one of an optimization or an analysis based on historical operating states. The first computation and the second computation are performed based on the set of operating states to determine operational costs under the first scenario and second scenario, according to some embodiments.

Another implementation of the present disclosure is a controller for performing model predictive maintenance of building equipment, according to some embodiments. The controller includes one or more processors, according to some embodiments. The controller includes one or more non-transitory computer-readable media storing instructions that, when executed by the one or more processors, cause the one or more processors to perform operations, according to some embodiments. The operations include obtaining an objective function that defines a cost of operating the building equipment and performing maintenance on the building equipment as a function of operating decisions and maintenance decisions for the building equipment for time steps within a time period of a life cycle horizon, according to some embodiments. The operations include performing a first computation of the objective function under a first scenario in which maintenance is performed on the building equipment during the time period, according to some embodiments. A result of the first computation indicates a first cost of operating and performing maintenance on the building equipment over the time period, according to some embodiments. The operations include performing a second computation of the objective function under a second scenario in which maintenance is not performed on the building equipment during the time period, according to some embodiments. A result of the second computation indicates a second cost of operating the building equipment over the time period, according to some embodiments. The operations include initiating an automated action to perform maintenance on the building equipment during the time period in accordance with operating decisions and maintenance decisions defined by the first scenario in response to a determination that the first cost is less than or equal to the second cost, according to some embodiments.

In some embodiments, the first computation and the second computation are performed using a model that defines evolution of building equipment degradation over time and an effect of the building equipment degradation on performance of the building equipment.

In some embodiments, the objective function further defines a cost of replacing the building equipment as a function of replacement decisions for the building equipment for the time steps within the time period.

In some embodiments, the operations include, in response to a determination that the first cost is greater than the second cost, shifting the time period forward in time and repeating the first computation and the second computation until the first cost is less than or equal to the second cost.

In some embodiments, the operations include repeating the shifting, the first computation, and the second computation until an end of the time period is equal to or exceeds an end of the life cycle horizon such that a maintenance schedule is generated for an entirety of the life cycle horizon.

In some embodiments, the objective function defines an interest rate. The interest rate indicates a value of money at a future time step, according to some embodiments. The first computation and the second computation are performed subject to the interest rate, according to some embodiments.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
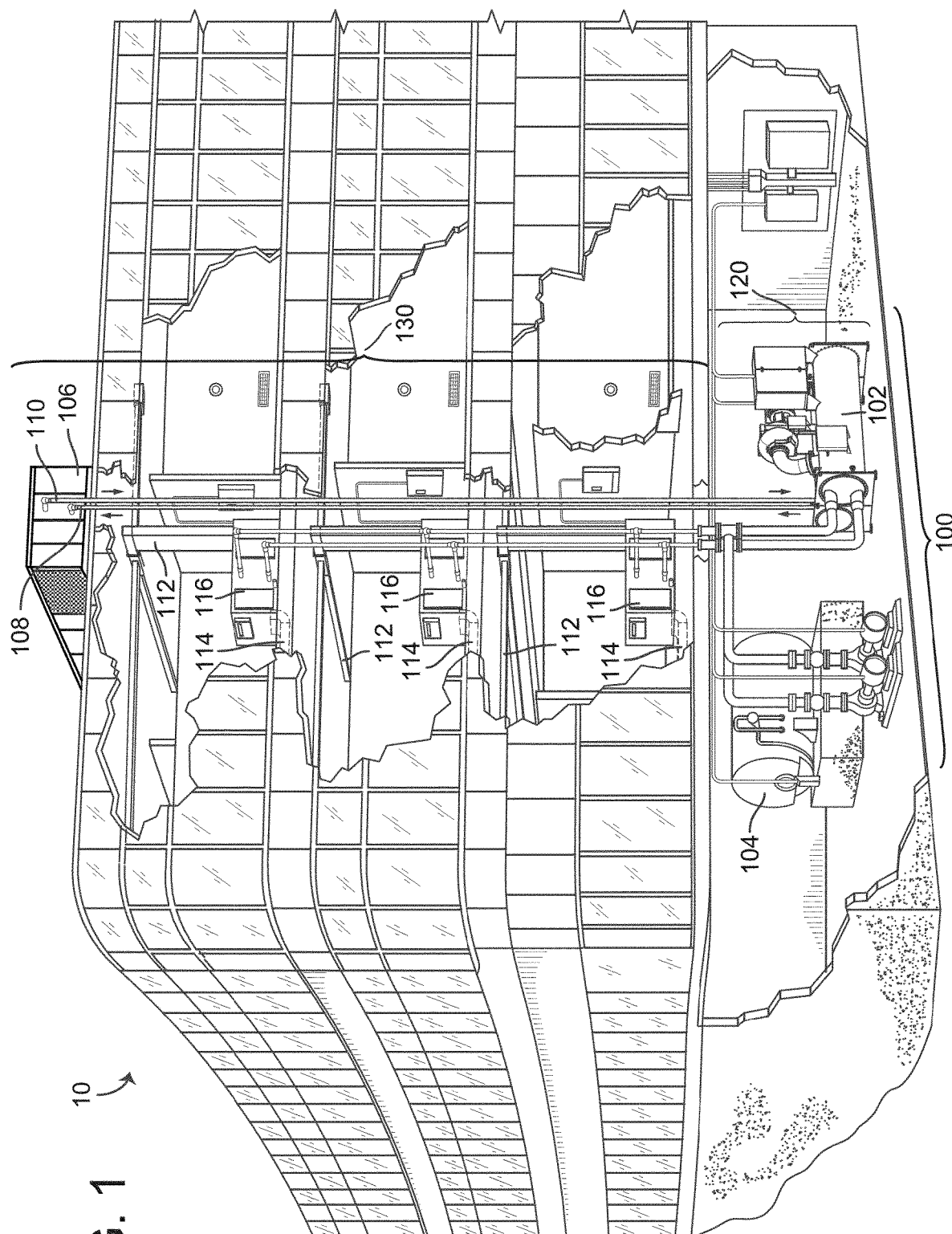
FIG. 1 is a drawing of a building equipped with a HVAC system, according to some embodiments.

Referring generally to the FIGURES, a model predictive maintenance (MPM) system and components thereof are shown, according to various exemplary embodiments. The MPM system can be configured to determine a maintenance and replacement strategy for building equipment. In some embodiments, the maintenance and replacement strategy is a set of decisions that define what/when maintenance and/or replacement of building equipment should be performed. As described herein, "maintenance and/or replacement" and "maintenance/replacement" may be used interchangeably. In some embodiments, maintenance/replacement decisions are predefined for a particular scenario as described in greater detail below. In some embodiments, the maintenance/replacement decisions are not predefined and are instead defined by being generated by performing optimizations and/or other calculations for generating maintenance/replacement decisions. In some embodiments, maintenance/replacement decisions are included in the maintenance and replacement strategy if determined to be economically viable for a customer. As described herein, economic viability of performing maintenance/replacement may exist if an estimated cost of performing maintenance on the building equipment and/or replacing the building equipment is offset (i.e., paid back) by a reduction in operational cost incurred over a predetermined payback period. Accordingly, the earliest time at which performing maintenance and/or replacement of building equipment is economically viable can refer to a time at which an estimated cost of (A) performing maintenance/replacement at the beginning of a payback period and then operating the building equipment over the duration of the payback period is less than or equal to (B) an estimated cost of strictly operating the building equipment over the payback period without performing maintenance/replacement. As such, economic viability can indicate a situation where performing maintenance/replacement is not economically disadvantageous in comparison to not performing the maintenance/replacement To generate a maintenance and replacement strategy for building equipment, the MPM system can obtain a payback period defining a maximum amount of time (e.g., 6 months, 2 years, 10 years, etc.) a user desires to wait before costs of maintenance/replacement activities are paid back. In other words, the payback period can define the maximum amount of time as an amount of time before costs of the maintenance/replacement activities are offset by savings in operational costs. The payback period can be obtained from a variety of methods such as, for example, the user manually inputting the payback period, determining the payback period based on how the user pays bills, etc.

To determine the maintenance and replacement strategy, the MPM system can generate two scenarios and run an optimization process on each scenario. A first scenario can be defined as where maintenance/replacement is performed immediately on building equipment, and the building equipment is operated for the remainder of the payback period. In some embodiments, the first scenario is defined as performing maintenance/replacement at a time step k which identifies the beginning of the payback period where time step k may or may not be a current time. A total cost for the first scenario can be determined based on a calculation process (e.g., an optimization process) performed by the MPM system. A second scenario can be defined as where maintenance/replacement is not performed on the building equipment during the payback period, and rather, the building equipment is operated over payback period as normal (i.e., with no maintenance/replacement performed). A total cost of the second scenario can also be determined based on a calculation process (e.g., an optimization process) performed by the MPM system. The MPM system can compare the total cost of each scenario to determine the maintenance and replacement strategy. Particularly, if the total cost of the first scenario is larger than the total cost of the second scenario, the MPM system may determine that the maintenance/replacement activities are not paid back and thus can generate the maintenance and replacement strategy based on the second scenario. If the total cost of the first scenario is less than or equal to the total cost of the second scenario, the MPM system may determine that the maintenance/replacement activities are paid back, and as such, maintenance/replacement should be performed immediately and/or at time step k.

One example of an objective function which can be searched by the MPM system for combinations of decision variables is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} P_{cap,i}$$

where $C_{op,i}$ is the cost per unit of energy (e.g., $/kWh) consumed by the building equipment at time step i of a time horizon, $P_{op,i}$ is the power consumption (e.g., kW) of the building equipment at time step i, $\Delta t$ is the duration of each time step i, $C_{main,i}$ is the cost of maintenance performed on the building equipment at time step i, $B_{main,i}$ is a binary variable that indicates whether the maintenance is performed, $C_{cap,i}$ is the capital cost of purchasing a new device of the building equipment at time step i, $B_{cap,i}$ is a binary variable that indicates whether the new device is purchased, and h is the duration of the time horizon over which the search is performed.

The first term in the objective function J represents the operating cost of the building equipment over the duration of the time horizon. In some embodiments, the time horizon is referred to as an optimization period and/or as a life cycle horizon. In some embodiments, the cost per unit of energy $C_{op,i}$ is received from a utility as energy pricing data. The cost $C_{op,i}$ may be a time-varying cost that depends on the time of day, the day of the week (e.g., weekday vs. weekend), the current season (e.g., summer vs. winter), or other time-based factors. For example, the cost $C_{op,i}$ may be higher during peak energy consumption periods and lower during off-peak or partial-peak energy consumption periods.

In some embodiments, the power consumption $P_{op,i}$ is based on the heating or cooling load of the building. The heating or cooling load can be predicted by the MPM system as a function of building occupancy, the time of day, the day of the week, the current season, or other factors that can affect the heating or cooling load. In some embodiments, the MPM system uses weather forecasts from a weather service to predict the heating or cooling load. The power consumption $P_{op,i}$ may also depend on the efficiency $\eta_i$ of the building equipment. For example, building equipment that operates at a high efficiency may consume less power $P_{op,i}$ to satisfy the same heating or cooling load relative to building equipment that operates at a low efficiency.

Advantageously, the MPM system can model the efficiency $\eta_i$ of the building equipment at each time step i as a function of the maintenance decisions and the equipment purchase decisions $B_{cap,i}$. For example, the efficiency $\eta_i$ for a particular device may start at an initial value $\eta_0$ when the device is purchased and may degrade over time such that the efficiency $\eta_i$ decreases with each successive time step i. Performing maintenance on a device may reset the efficiency to a higher value immediately after the maintenance is performed. Similarly, purchasing a new device to replace an existing device may reset the efficiency $\eta_i$ to a higher value immediately after the new device is purchased. After being reset, the efficiency $\eta_i$ may continue to degrade over time until the next time at which maintenance is performed or a new device is purchased.

Performing maintenance or purchasing a new device may result in a relatively lower power consumption $P_{op,i}$ during operation and therefore a lower operating cost at each time step i after the maintenance is performed or the new device is purchased. In other words, performing maintenance or purchasing a new device may decrease the operating cost represented by the first term of the objective function J. However, performing maintenance may increase the second term of the objective function J and purchasing a new device may increase the third term of the objective function J. The objective function J captures each of these costs and can be optimized by the MPM system to determine the set of maintenance and equipment purchase decisions (i.e., values for the binary decision variables $B_{main,i}$ and $B_{cap,i}$) that are economically viable for a customer and reduce an amount of time before maintenance/replacement activities occur.

In some embodiments, the MPM system uses equipment performance information received as a feedback from the building equipment to estimate the efficiency and/or the reliability of the building equipment. The efficiency may indicate a relationship between the heating or cooling load on the building equipment and the power consumption of the building equipment. The MPM system can use the efficiency to calculate the corresponding value of $P_{op,i}$. The reliability may be a statistical measure of the likelihood that the building equipment will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since the building equipment last received maintenance and/or an amount of time that has elapsed since the building equipment was purchased or installed.

In some embodiments, the MPM system generates and provides equipment purchase and maintenance recommendations. The equipment purchase and maintenance recommendations may be based on the values for the binary decision variables $B_{main,i}$ and $B_{cap,i}$ determined by searching combinations related to the objective function J. For example, a value of $B_{main,25}=1$ for a particular device of the building equipment may indicate that maintenance should be performed on that device at the $25^{th}$ time step of the time horizon, whereas a value of $B_{main,25}=0$ may indicate that the maintenance should not be performed at that time step. Similarly, a value of $B_{cap,25}=1$ may indicate that a new device of the building equipment should be purchased at the $25^{th}$ time step of the time horizon, whereas a value of $B_{cap,25}=0$ may indicate that the new device should not be purchased at that time step.

In some embodiments, the equipment purchase and maintenance recommendations generated by the MPM system are predictive recommendations based on the actual operating conditions and actual performance of the building equipment. The search performed by the MPM system weighs the cost of performing maintenance and the cost of purchasing new equipment against the decrease in operating cost resulting from such maintenance or purchase decisions in order to determine economically viable solutions. The equipment-specific recommendations may result in a lower overall cost J relative to generic preventative maintenance recommendations provided by an equipment manufacturer (e.g., service equipment every year) which may be sub-optimal for some groups of building equipment and/or some operating conditions. In some embodiments, however, the equipment purchase and maintenance recommendations are generated based on sets of predefined operating decisions and maintenance/replacement decisions. In this case, the equipment purchase and maintenance decisions may be generated based on a scenario that results in a lowest overall cost as compared to performing an optimization (or other calculation) to generate the equipment purchase and maintenance recommendations.

Determining equipment purchase and maintenance recommendations that are economically viable for a customer and reduce an amount of time before maintenance/replacement of building equipment occurs can lead to additional business for providers of maintenance and/or replacement services at no additional cost to customers as compared to operating with existing equipment over a time period (e.g., a payback period) of a life cycle horizon. Further, the customer can obtain new and/or updated equipment which may be preferable for customers. Further yet, performing maintenance/replacement on the building equipment can reduce a degradation state of the building equipment, the building equipment may consume fewer resources (e.g., electricity, water, etc.), thereby positively impacting the environment.

Building HVAC Systems and Building Management Systems

Figure 2:
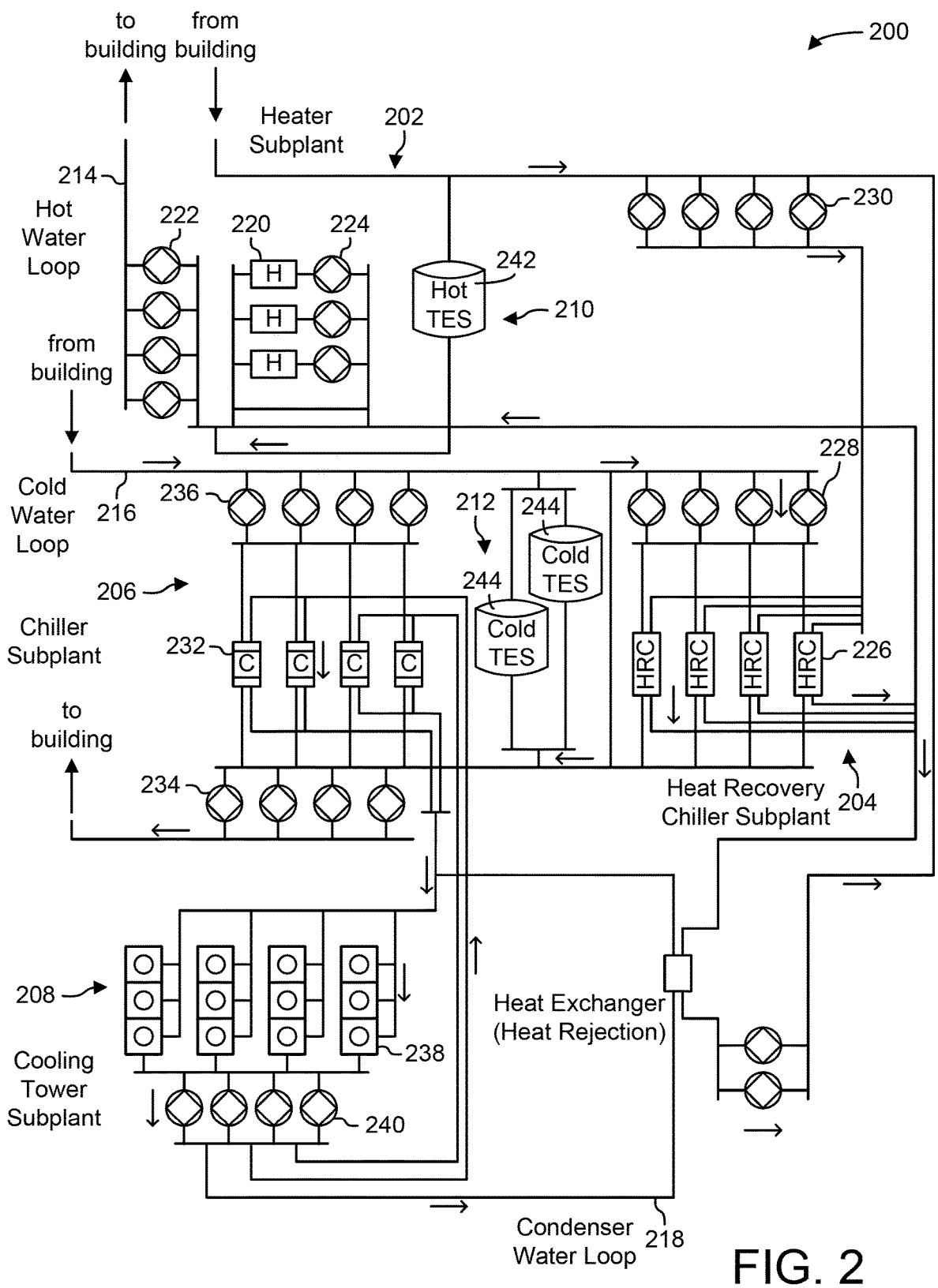
FIG. 2 is a block diagram of a waterside system which can be used to serve the heating or cooling loads of the building of FIG. 1, according to some embodiments.
Figure 3:
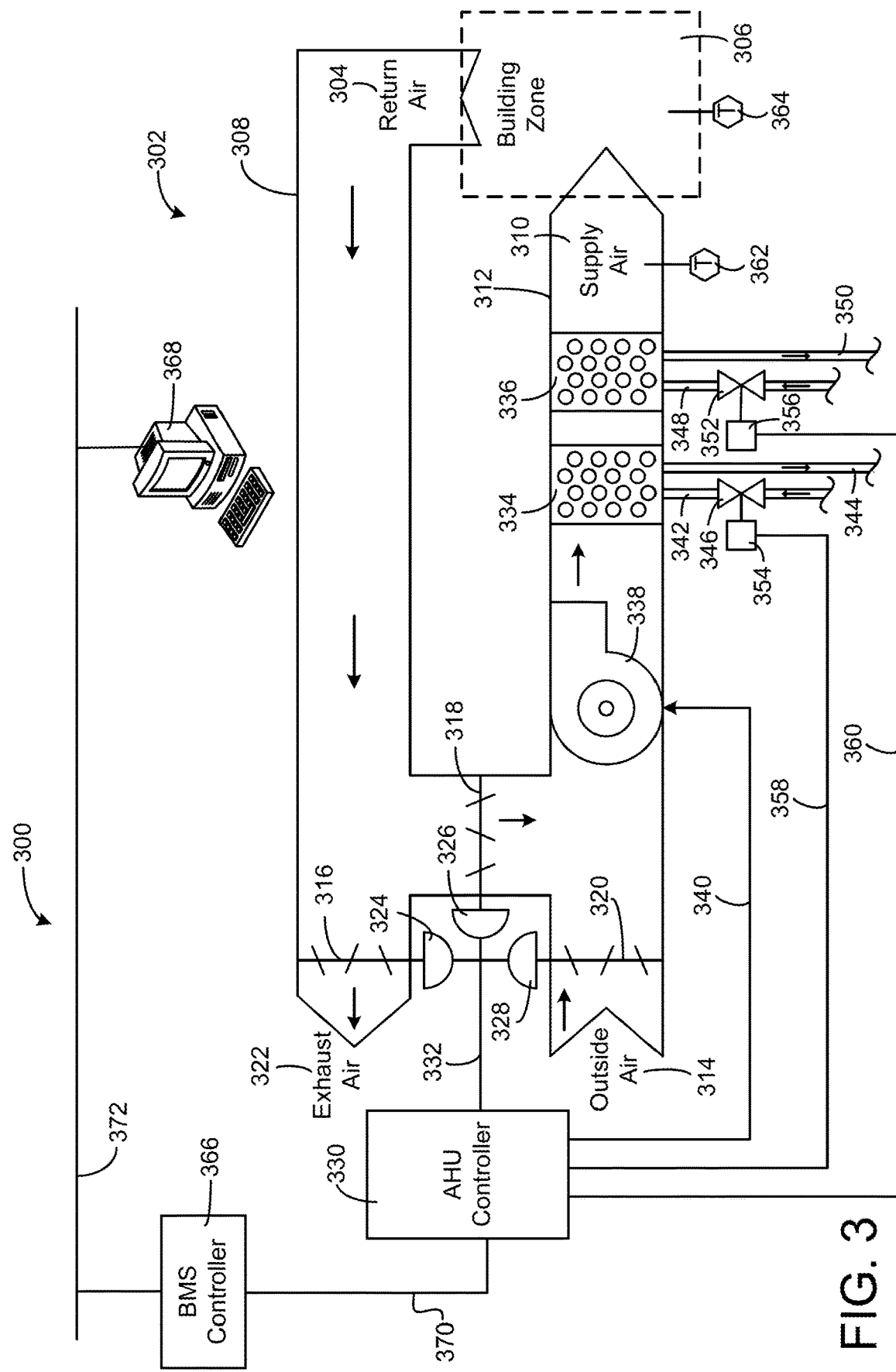
FIG. 3 is a block diagram of an airside system which can be used to serve the heating or cooling loads of the building of FIG. 1, according to some embodiments.
Figure 4:
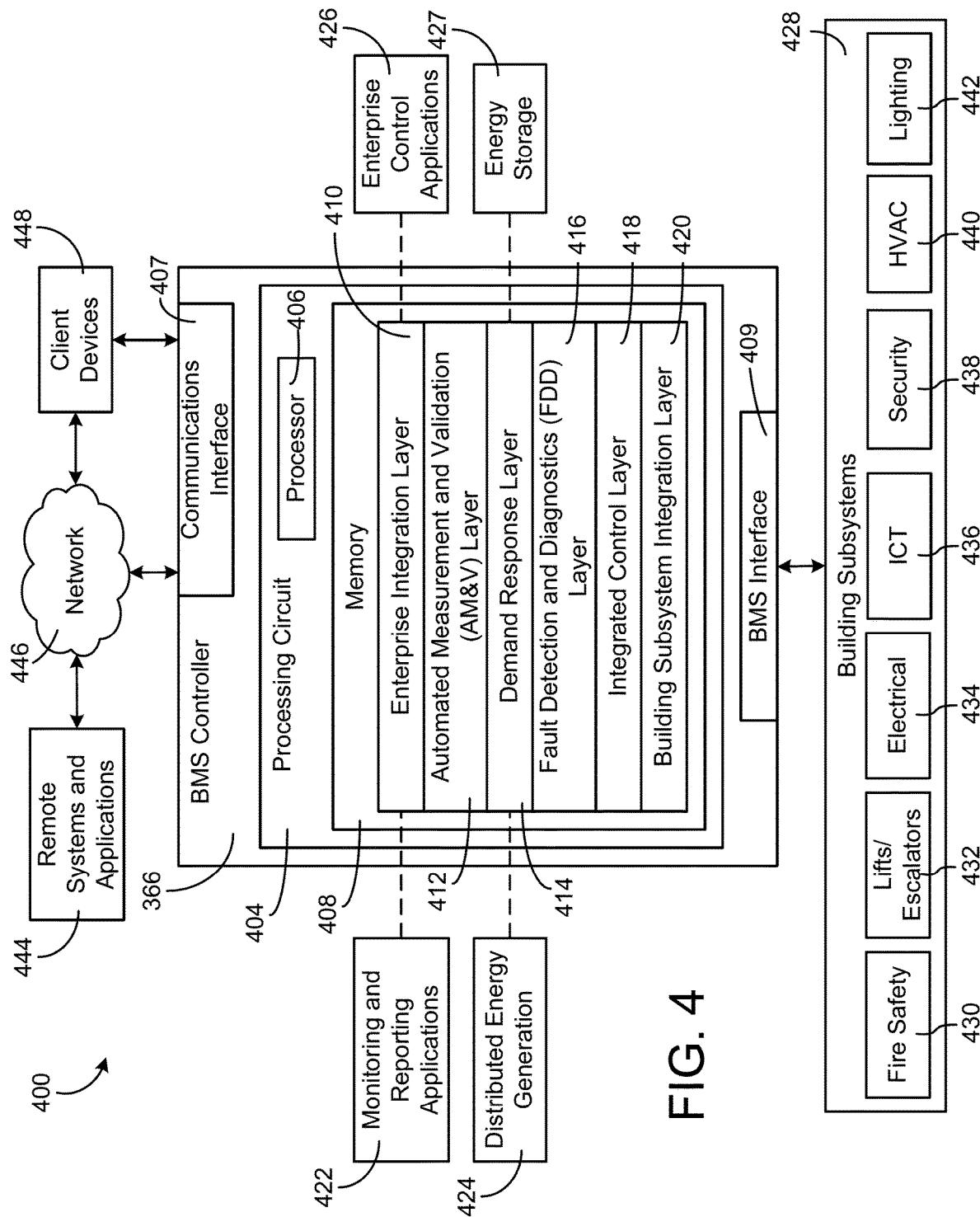
FIG. 4 is a block diagram of a building management system (BMS) which can be used to monitor and control the building of FIG. 1, according to some embodiments.
Figure 5:
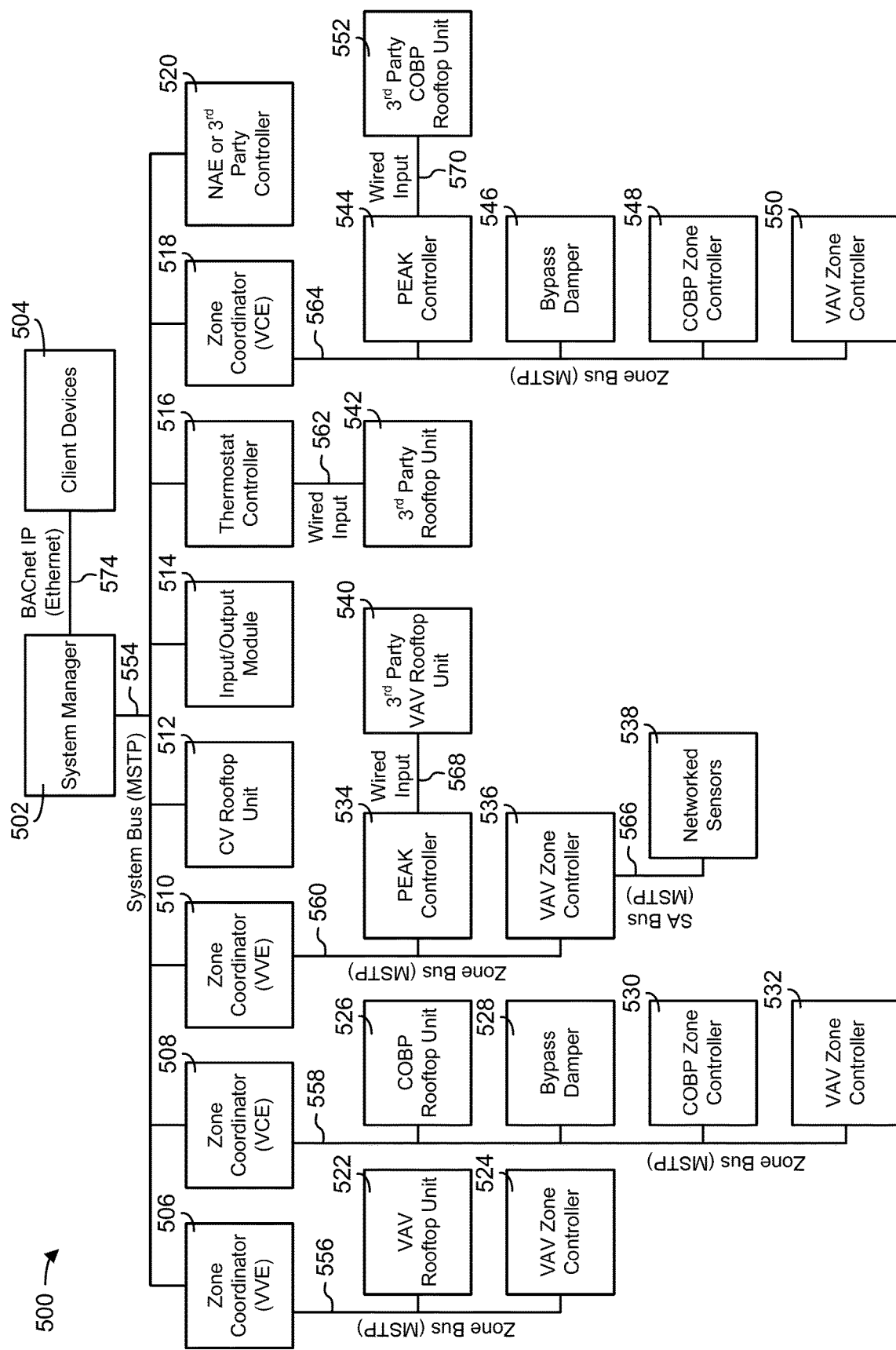
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Model Predictive Maintenance System

Figure 6:
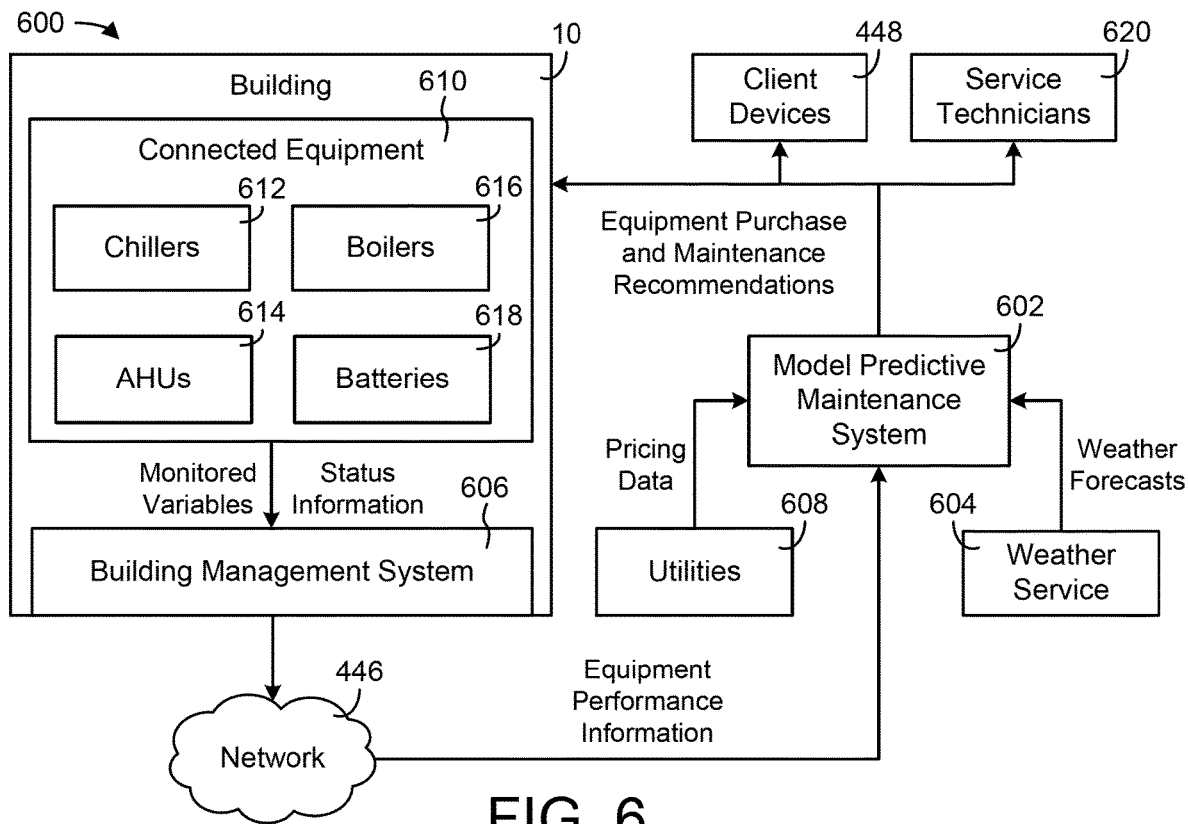
FIG. 6 is a block diagram of a building system including a model predictive maintenance (MPM) system that monitors equipment performance information from connected equipment installed in the building, according to some embodiments.

Referring now to FIG. 6, a block diagram of a building system 600 is shown, according to an exemplary embodiment. System 600 may include many of the same components as BMS 400 and BMS 500 as described with reference to FIGS. 4-5. For example, system 600 is shown to include building 10, network 446, and client devices 448. Building 10 is shown to include connected equipment 610, which can include any type of equipment used to monitor and/or control building 10. Connected equipment 610 can include connected chillers 612, connected AHUs 614, connected boilers 616, connected batteries 618, or any other type of equipment in a building system (e.g., heaters, economizers, valves, actuators, dampers, cooling towers, fans, pumps, etc.) or building management system (e.g., lighting equipment, security equipment, refrigeration equipment, etc.). Connected equipment 610 can include any of the equipment of HVAC system 100, waterside system 200, airside system 300, BMS 400, and/or BMS 500, as described with reference to FIGS. 1-5.

Figure 7:
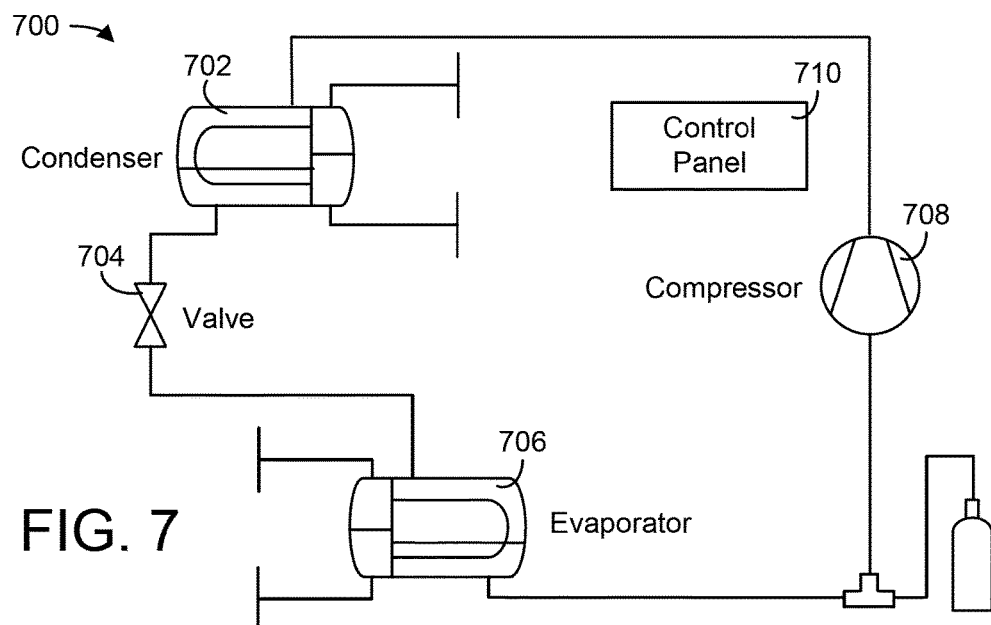
FIG. 7 is a schematic diagram of a chiller which may be a type of connected equipment that provides equipment performance information to the MPM system of FIG. 6, according to some embodiments.

Connected equipment 610 can be outfitted with sensors to monitor various conditions of the connected equipment 610 (e.g., power consumption, on/off states, operating efficiency, etc.). For example, chillers 612 can include sensors configured to monitor chiller variables such as chilled water temperature, condensing water temperature, and refrigerant properties (e.g., refrigerant pressure, refrigerant temperature, etc.) at various locations in the refrigeration circuit. An example of a chiller 700 which can be used as one of chillers 612 is shown in FIG. 7. Chiller 700 is shown to include a refrigeration circuit having a condenser 702, an expansion valve 704, an evaporator 706, a compressor 708, and a control panel 710. In some embodiments, chiller 700 includes sensors that measure a set of monitored variables at various locations along the refrigeration circuit. Similarly, AHUs 614 can be outfitted with sensors to monitor AHU variables such as supply air temperature and humidity, outside air temperature and humidity, return air temperature and humidity, chilled fluid temperature, heated fluid temperature, damper position, etc. In general, connected equipment 610 can monitor and report variables that characterize the performance of the connected equipment 610. Each monitored variable can be forwarded to building management system 606 as a data point including a point ID and a point value.

Monitored variables can include any measured or calculated values indicating the performance of connected equipment 610 and/or the components thereof. For example, monitored variables can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing. Monitored variables can be received from connected equipment 610 and/or from various components thereof. For example, monitored variables can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices.

Connected equipment 610 can also report equipment status information. Equipment status information can include, for example, the operational status of the equipment, an operating mode (e.g., low load, medium load, high load, etc.), an indication of whether the equipment is running under normal or abnormal conditions, the hours during which the equipment is running, a safety fault code, or any other information that indicates the current status of connected equipment 610. In some embodiments, each device of connected equipment 610 includes a control panel (e.g., control panel 710 shown in FIG. 7). Control panel 710 can be configured to collect monitored variables and equipment status information from connected equipment 610 and provide the collected data to BMS 606. For example, control panel 710 can compare the sensor data (or a value derived from the sensor data) to predetermined thresholds. If the sensor data or calculated value crosses a safety threshold, control panel 710 can shut down the device. Control panel 710 can generate a data point when a safety shut down occurs. The data point can include a safety fault code which indicates the reason or condition that triggered the shutdown.

Connected equipment 610 can provide monitored variables and equipment status information to BMS 606. BMS 606 can include a building controller (e.g., BMS controller 366), a system manager (e.g., system manager 503), a network automation engine (e.g., NAE 520), or any other system or device of building 10 configured to communicate with connected equipment 610. BMS 606 may include some or all of the components of BMS 400 or BMS 500, as described with reference to FIGS. 4-5. In some embodiments, the monitored variables and the equipment status information are provided to BMS 606 as data points. Each data point can include a point ID and a point value. The point ID can identify the type of data point or a variable measured by the data point (e.g., condenser pressure, refrigerant temperature, power consumption, etc.). Monitored variables can be identified by name or by an alphanumeric code (e.g., Chilled_Water_Temp, 7694, etc.). The point value can include an alphanumeric value indicating the current value of the data point.

BMS 606 can broadcast the monitored variables and the equipment status information to a model predictive maintenance system 602. In some embodiments, model predictive maintenance system 602 is a component of BMS 606. For example, model predictive maintenance system 602 can be implemented as part of a METASYS® brand building automation system, as sold by Johnson Controls Inc. In other embodiments, model predictive maintenance system 602 can be a component of a remote computing system or cloud-based computing system configured to receive and process data from one or more building management systems via network 446. For example, model predictive maintenance system 602 can be implemented as part of a PANOPTIX® brand building efficiency platform, as sold by Johnson Controls Inc. In other embodiments, model predictive maintenance system 602 can be a component of a subsystem level controller (e.g., a HVAC controller), a subplant controller, a device controller (e.g., AHU controller 330, a chiller controller, etc.), a field controller, a computer workstation, a client device, or any other system or device that receives and processes monitored variables from connected equipment 610.

Model predictive maintenance (MPM) system 602 may use the monitored variables and/or the equipment status information to identify a current operating state of connected equipment 610. The current operating state can be examined by MPM system 602 to expose when connected equipment 610 begins to degrade in performance and/or to predict when faults will occur. In some embodiments, MPM system 602 uses the information collected from connected equipment 610 to estimate the reliability of connected equipment 610. For example, MPM system 602 can estimate a likelihood of various types of failures that could potentially occur based on the current operating conditions of connected equipment 610 and an amount of time that has elapsed since connected equipment 610 has been installed and/or since maintenance was last performed. In some embodiments, MPM system 602 estimates an amount of time until each failure is predicted to occur and identifies a financial cost associated with each failure (e.g., maintenance cost, increased operating cost, replacement cost, etc.). MPM system 602 can use the reliability information and the likelihood of potential failures to predict when maintenance will be needed and to estimate the cost of performing such maintenance over a predetermined time period.

MPM system 602 can be configured to determine an optimal maintenance strategy for connected equipment 610. In some embodiments, the optimal maintenance strategy is a set of decisions which optimizes the total cost associated with purchasing, maintaining, and operating connected equipment 610 over the duration of an optimization period (e.g., 30 weeks, 52 weeks, 10 years, 30 years, etc.). The decisions can include, for example, equipment purchase decisions, equipment maintenance decisions, and equipment operating decisions. MPM system 602 can use a model predictive control technique to formulate an objective function which expresses the total cost as a function of these decisions, which can be included as decision variables in the objective function. MPM system 602 can optimize (i.e., minimize) the objective function using any of a variety of optimization techniques to identify the optimal values for each of the decision variables.

One example of an objective function which can be optimized by MPM system 602 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} B_{cap,i}$$

where $C_{op,i}$ is the cost per unit of energy (e.g., \$/kWh) consumed by connected equipment 610 at time step i of the optimization period, $P_{op,i}$ is the power consumption (e.g., kW) of connected equipment 610 at time step i, $\Delta t$ is the duration of each time step i, $C_{main,i}$ is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

The first term in the objective function J represents the operating cost of connected equipment 610 over the duration of the optimization period. In some embodiments, the cost per unit of energy $C_{op,i}$ is received from a utility 608 as energy pricing data. The cost $C_{op,i}$ may be a time-varying cost that depends on the time of day, the day of the week (e.g., weekday vs. weekend), the current season (e.g., summer vs. winter), or other time-based factors. For example, the cost $C_{op,i}$ may be higher during peak energy consumption periods and lower during off-peak or partial-peak energy consumption periods.

In some embodiments, the power consumption $P_{op,i}$ is based on the heating or cooling load of building 10. The heating or cooling load can be predicted by MPM system 602 as a function of building occupancy, the time of day, the day of the week, the current season, or other factors that can affect the heating or cooling load. In some embodiments, MPM system 602 uses weather forecasts from a weather service 604 to predict the heating or cooling load. The power consumption $P_{op,i}$ may also depend on the efficiency $\eta_i$ of connected equipment 610. For example, connected equipment 610 that operate at a high efficiency may consume less power $P_{op,i}$ to satisfy the same heating or cooling load relative to connected equipment 610 that operate at a low efficiency. In general, the power consumption $P_{op,i}$ of a particular device of connected equipment 610 can be modeled using the following equations:

$$P_{op,i} = \frac{P_{ideal,i}}{\eta_i}$$

$$P_{ideal,i} = f(Load_i)$$

where $Load_i$ is the heating or cooling load on the device at time step i (e.g., tons cooling, kW heating, etc.), $P_{ideal,i}$ is the value of the equipment performance curve (e.g., tons cooling, kW heating, etc.) for the device at the corresponding load point $Load_i$, and $\eta_i$ is the operating efficiency of the device at time step i (e.g., $0 \leq \eta_i \leq 1$). The function $f(Load_i)$ may be defined by the equipment performance curve for the device or set of devices represented by the performance curve.

In some embodiments, the equipment performance curve is based on manufacturer specifications for the device under ideal operating conditions. For example, the equipment performance curve may define the relationship between power consumption and heating/cooling load for each device of connected equipment 610. However, the actual performance of the device may vary as a function of the actual operating conditions. MPM system 602 can analyze the equipment performance information provided by connected equipment 610 to determine the operating efficiency $\eta_i$ for each device of connected equipment 610. In some embodiments, MPM system 602 uses the equipment performance information from connected equipment 610 to determine the actual operating efficiency $\eta_i$ for each device of connected equipment 610. MPM system 602 can use the operating efficiency $\eta_i$ as an input to the objective function J and/or to calculate the corresponding value of $P_{op,i}$.

Advantageously, MPM system 602 can model the efficiency $\eta_i$ of connected equipment 610 at each time step i as a function of the maintenance decisions $B_{main,i}$ and the equipment purchase decisions $B_{cap,i}$. For example, the efficiency $\eta_i$ for a particular device may start at an initial value $\eta_0$ when the device is purchased and may degrade over time such that the efficiency $\eta_i$ decreases with each successive time step i. Performing maintenance on a device may reset the efficiency $\eta_i$ to a higher value immediately after the maintenance is performed. Similarly, purchasing a new device to replace an existing device may reset the efficiency $\eta_i$ to a higher value immediately after the new device is purchased. After being reset, the efficiency may continue to degrade over time until the next time at which maintenance is performed or a new device is purchased.

Performing maintenance or purchasing a new device may result in a relatively lower power consumption $P_{op,i}$ during operation and therefore a lower operating cost at each time step i after the maintenance is performed or the new device is purchased. In other words, performing maintenance or purchasing a new device may decrease the operating cost represented by the first term of the objective function J. However, performing maintenance may increase the second term of the objective function J and purchasing a new device may increase the third term of the objective function J. The objective function J captures each of these costs and can be optimized by MPM system 602 to determine the optimal set of maintenance and equipment purchase decisions (i.e., optimal values for the binary decision variables $B_{main,i}$ and $B_{cap,i}$) over the duration of the optimization period.

In some embodiments, MPM system 602 uses the equipment performance information from connected equipment 610 to estimate the reliability of connected equipment 610. The reliability may be a statistical measure of the likelihood that connected equipment 610 will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since connected equipment 610 last received maintenance.

MPM system 602 may receive operating data from a plurality of devices of connected equipment 610 distributed across multiple buildings and can use the set of operating data (e.g., operating conditions, fault indications, failure times, etc.) to develop a reliability model for each type of equipment. The reliability models can be used by MPM system 602 to estimate the reliability of any given device of connected equipment 610 as a function of its current operating conditions and/or other extraneous factors (e.g., time since maintenance was last performed, geographic location, water quality, etc.). In some embodiments, MPM system 602 uses the estimated reliability of each device of connected equipment 610 to determine the probability that the device will require maintenance and/or replacement at each time step of the optimization period. MPM system 602 can use these probabilities to determine the optimal set of maintenance and equipment purchase decisions (i.e., optimal values for the binary decision variables $B_{main,i}$ and $B_{cap,i}$) over the duration of the optimization period.

In some embodiments, MPM system 602 generates and provides equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of connected equipment 610 may indicate that maintenance should be performed on that device at the $25^{th}$ time step of the optimization period, whereas a value of $B_{main,25}=0$ may indicate that the maintenance should not be performed at that time step. Similarly, a value of $B_{cap,25}=1$ may indicate that a new device of connected equipment 610 should be purchased at the $25^{th}$ time step of the optimization period, whereas a value of $B_{cap,25}=0$ may indicate that the new device should not be purchased at that time step.

Advantageously, the equipment purchase and maintenance recommendations generated by MPM system 602 are predictive recommendations based on the actual operating conditions and actual performance of connected equipment 610. The optimization performed by MPM system 602 weighs the cost of performing maintenance and the cost of purchasing new equipment against the decrease in operating cost resulting from such maintenance or purchase decisions in order to determine the optimal maintenance strategy that minimizes the total combined cost J. In this way, the equipment purchase and maintenance recommendations generated by MPM system 602 may be specific to each group of connected equipment 610 in order to achieve the optimal cost J for that specific group of connected equipment 610. The equipment-specific recommendations may result in a lower overall cost J relative to generic preventative maintenance recommendations provided by an equipment manufacturer (e.g., service equipment every year) which may be sub-optimal for some groups of connected equipment 610 and/or some operating conditions.

In some embodiments, the equipment purchase and maintenance recommendations are provided to building 10 (e.g., to BMS 606) and/or to client devices 448. An operator or building owner can use the equipment purchase and maintenance recommendations to assess the costs and benefits of performing maintenance and purchasing new devices. In some embodiments, the equipment purchase and maintenance recommendations are provided to service technicians 620. Service technicians 620 can use the equipment purchase and maintenance recommendations to determine when customers should be contacted to perform service or replace equipment.

In some embodiments, MPM system 602 includes a data analytics and visualization platform. MPM system 602 may provide a web interface which can be accessed by service technicians 620, client devices 448, and other systems or devices. The web interface can be used to access the equipment performance information, view the results of the optimization, identify which equipment is in need of maintenance, and otherwise interact with MPM system 602. Service technicians 620 can access the web interface to view a list of equipment for which maintenance is recommended by MPM system 602. Service technicians 620 can use the equipment purchase and maintenance recommendations to proactively repair or replace connected equipment 610 in order to achieve the optimal cost predicted by the objective function J. These and other features of MPM system 602 are described in greater detail below.

Figure 8:
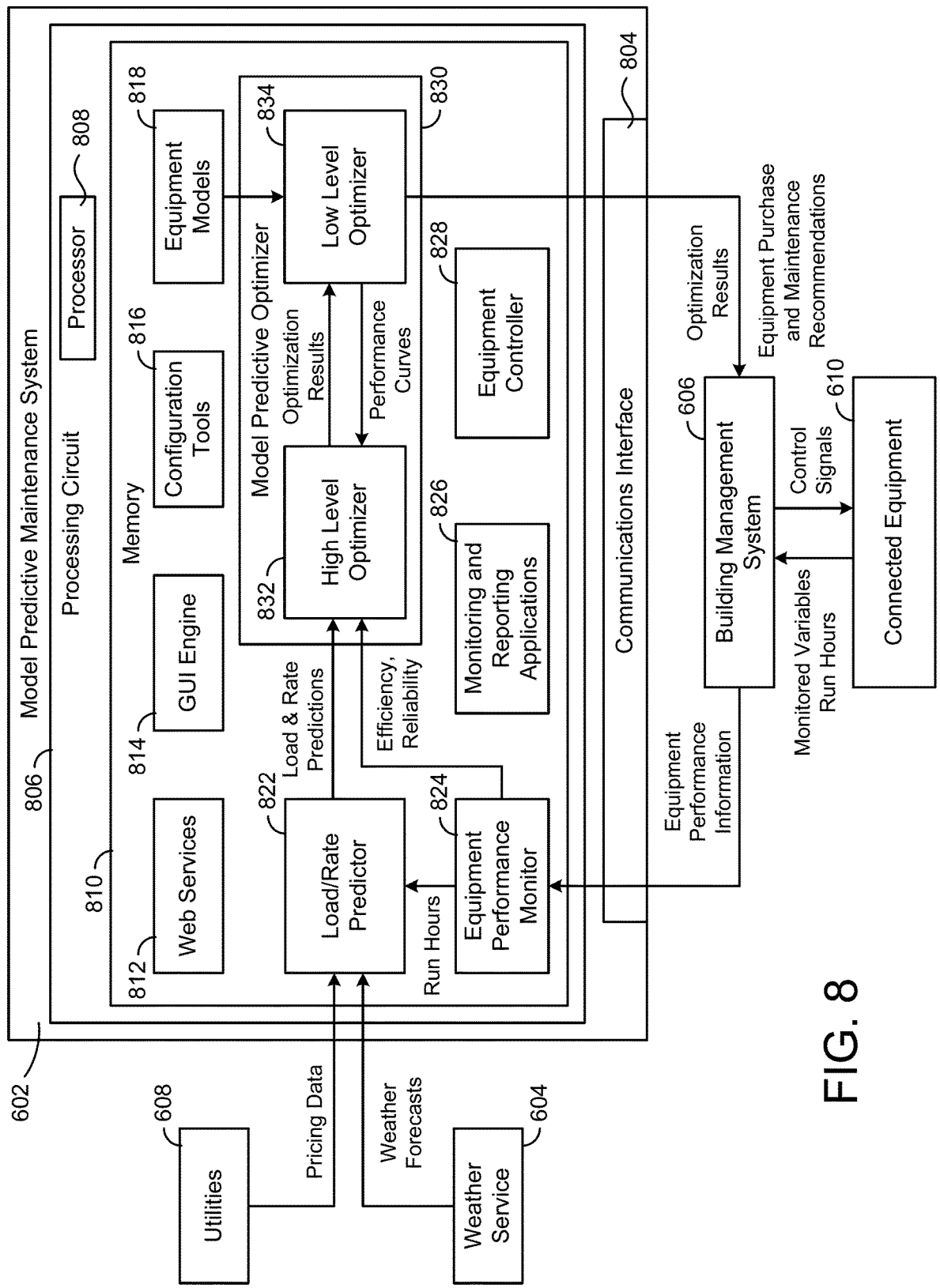
FIG. 8 is a block diagram illustrating the MPM system of FIG. 6 in greater detail, according to some embodiments.

Referring now to FIG. 8, a block diagram illustrating MPM system 602 in greater detail is shown, according to an exemplary embodiment. MPM system 602 is shown providing optimization results to a building management system (BMS) 606. BMS 606 can include some or all of the features of BMS 400 and/or BMS 500, as described with reference to FIGS. 4-5. The optimization results provided to BMS 606 may include the optimal values of the decision variables in the objective function J for each time step i in the optimization period. In some embodiments, the optimization results include equipment purchase and maintenance recommendations for each device of connected equipment 610.

BMS 606 may be configured to monitor the operation and performance of connected equipment 610. BMS 606 may receive monitored variables from connected equipment 610. Monitored variables can include any measured or calculated values indicating the performance of connected equipment 610 and/or the components thereof. For example, monitored variables can include one or more measured or calculated temperatures, pressures, flow rates, valve positions, resource consumptions (e.g., power consumption, water consumption, electricity consumption, etc.), control setpoints, model parameters (e.g., equipment model coefficients), or any other variables that provide information about how the corresponding system, device, or process is performing.

In some embodiments, the monitored variables indicate the operating efficiency $\eta_i$ of each device of connected equipment 610 or can be used to calculate the operating efficiency $\eta_i$. For example, the temperature and flow rate of chilled water output by a chiller can be used to calculate the cooling load (e.g., tons cooling) served by the chiller. The cooling load can be used in combination with the power consumption of the chiller to calculate the operating efficiency $\eta_i$ (e.g., tons cooling per kW of electricity consumed). BMS 606 may report the monitored variables to MPM system 602 for use in calculating the operating efficiency $\eta_i$ of each device of connected equipment 610.

In some embodiments, BMS 606 monitors the run hours of connected equipment 610. The run hours may indicate the number of hours within a given time period during which each device of connected equipment 610 is active. For example, the run hours for a chiller may indicate that the chiller is active for approximately eight hours per day. The run hours can be used in combination with the average power consumption of the chiller when active to estimate the total power consumption $P_{op,i}$ of connected equipment 610 at each time step i.

In some embodiments, BMS 606 monitors the equipment failures and fault indications reported by connected equipment 610. BMS 606 can record the times at which each failure or fault occurs and the operating conditions of connected equipment 610 under which the fault or failure occurred. The operating data collected from connected equipment 610 can be used by BMS 606 and/or MPM system 602 to develop a reliability model for each device of connected equipment 610. BMS 606 may provide the monitored variables, the equipment run hours, the operating conditions, and the equipment failures and fault indications to MPM system 602 as equipment performance information.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to MPM system 602. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate connected equipment 610 to affect the monitored conditions within the building and to serve the thermal energy loads of the building.

BMS 606 may provide control signals to connected equipment 610 specifying on/off states, charge/discharge rates, and/or setpoints for connected equipment 610. BMS 606 may control the equipment (e.g., via actuators, power relays, etc.) in accordance with the control signals to achieve setpoints for various building zones and/or devices of connected equipment 610. In various embodiments, BMS 606 may be combined with MPM system 602 or may be part of a separate building management system. According to an exemplary embodiment, BMS 606 is a METASYS® brand building management system, as sold by Johnson Controls, Inc.

MPM system 602 may monitor the performance of connected equipment 610 using information received from BMS 606. MPM system 602 may be configured to predict the thermal energy loads (e.g., heating loads, cooling loads, etc.) of the building for plurality of time steps in the optimization period (e.g., using weather forecasts from a weather service 604). MPM system 602 may also predict the cost of electricity or other resources (e.g., water, natural gas, etc.) using pricing data received from utilities 608. MPM system 602 may generate optimization results that optimize the economic value of operating, maintaining, and purchasing connected equipment 610 over the duration of the optimization period subject to constraints on the optimization process (e.g., load constraints, decision variable constraints, etc.). The optimization process performed by MPM system 602 is described in greater detail below.

According to an exemplary embodiment, MPM system 602 can be integrated within a single computer (e.g., one server, one housing, etc.). In various other exemplary embodiments, MPM system 602 can be distributed across multiple servers or computers (e.g., that can exist in distributed locations). In another exemplary embodiment, MPM system 602 may integrated with a smart building manager that manages multiple building systems and/or combined with BMS 606.

MPM system 602 is shown to include a communications interface 804 and a processing circuit 806. Communications interface 804 may include wired or wireless interfaces (e.g., jacks, antennas, transmitters, receivers, transceivers, wire terminals, etc.) for conducting data communications with various systems, devices, or networks. For example, communications interface 804 may include an Ethernet card and port for sending and receiving data via an Ethernet-based communications network and/or a WiFi transceiver for communicating via a wireless communications network. Communications interface 804 may be configured to communicate via local area networks or wide area networks (e.g., the Internet, a building WAN, etc.) and may use a variety of communications protocols (e.g., BACnet, IP, LON, etc.).

Communications interface 804 may be a network interface configured to facilitate electronic data communications between MPM system 602 and various external systems or devices (e.g., BMS 606, connected equipment 610, utilities 510, etc.). For example, MPM system 602 may receive information from BMS 606 indicating one or more measured states of the controlled building (e.g., temperature, humidity, electric loads, etc.) and equipment performance information for connected equipment 610 (e.g., run hours, power consumption, operating efficiency, etc.). Communications interface 804 may receive inputs from BMS 606 and/or connected equipment 610 and may provide optimization results to BMS 606 and/or other external systems or devices. The optimization results may cause BMS 606 to activate, deactivate, or adjust a setpoint for connected equipment 610 in order to achieve the optimal values of the decision variables specified in the optimization results.

Still referring to FIG. 8, processing circuit 806 is shown to include a processor 808 and memory 810. Processor 808 may be a general purpose or specific purpose processor, an application specific integrated circuit (ASIC), one or more field programmable gate arrays (FPGAs), a group of processing components, or other suitable processing components. Processor 808 may be configured to execute computer code or instructions stored in memory 810 or received from other computer readable media (e.g., CDROM, network storage, a remote server, etc.).

Memory 810 may include one or more devices (e.g., memory units, memory devices, storage devices, etc.) for storing data and/or computer code for completing and/or facilitating the various processes described in the present disclosure. Memory 810 may include random access memory (RAM), read-only memory (ROM), hard drive storage, temporary storage, non-volatile memory, flash memory, optical memory, or any other suitable memory for storing software objects and/or computer instructions. Memory 810 may include database components, object code components, script components, or any other type of information structure for supporting the various activities and information structures described in the present disclosure. Memory 810 may be communicably connected to processor 808 via processing circuit 806 and may include computer code for executing (e.g., by processor 808) one or more processes described herein.

MPM system 602 is shown to include an equipment performance monitor 824. Equipment performance monitor 824 can receive equipment performance information from BMS 606 and/or connected equipment 610. The equipment performance information can include samples of monitored variables (e.g., measured temperature, measured pressure, measured flow rate, power consumption, etc.), current operating conditions (e.g., heating or cooling load, current operating state, etc.), fault indications, or other types of information that characterize the performance of connected equipment 610. In some embodiments, equipment performance monitor 824 uses the equipment performance information to calculate the current efficiency $\eta_i$ and reliability of each device of connected equipment 610. Equipment performance monitor 824 can provide the efficiency $\eta_i$ and reliability values to model predictive optimizer 830 for use in optimizing the objective function J.

Still referring to FIG. 8, MPM system 602 is shown to include a load/rate predictor 822. Load/rate predictor 822 may be configured to predict the energy loads ($Load_i$) (e.g., heating load, cooling load, electric load, etc.) of the building or campus for each time step i of the optimization period. Load/rate predictor 822 is shown receiving weather forecasts from a weather service 604. In some embodiments, load/rate predictor 822 predicts the energy loads $Load_i$ as a function of the weather forecasts. In some embodiments, load/rate predictor 822 uses feedback from BMS 606 to predict loads $Load_i$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 822 receives a measured electric load and/or previous measured load data from BMS 606 (e.g., via equipment performance monitor 824). Load/rate predictor 822 may predict loads $Load_i$ as a function of a given weather forecast ($\hat{\phi}_w$), a day type (day), the time of day (t), and previous measured load data ($Y_{i-1}$). Such a relationship is expressed in the following equation:

$$Load_i = f(\hat{\phi}_w, day, t | Y_{i-1})$$

In some embodiments, load/rate predictor 822 uses a deterministic plus stochastic model trained from historical load data to predict loads $Load_i$. Load/rate predictor 822 may use any of a variety of prediction methods to predict loads $Load_i$ (e.g., linear regression for the deterministic portion and an AR model for the stochastic portion). Load/rate predictor 822 may predict one or more different types of loads for the building or campus. For example, load/rate predictor 822 may predict a hot water load $Load_{Hot,i}$, a cold water load $Load_{Cold,i}$, and an electric load $Load_{Elec,i}$ for each time step i within the optimization period. The predicted load values $Load_i$ can include some or all of these types of loads. In some embodiments, load/rate predictor 822 makes load/rate predictions using the techniques described in U.S. patent application Ser. No. 14/717,593 filed May 20, 2015, the entire disclosure of which is incorporated by reference herein.

Load/rate predictor 822 is shown receiving utility rates from utilities 608. Utility rates may indicate a cost or price per unit of a resource (e.g., electricity, natural gas, water, etc.) provided by utilities 608 at each time step i in the optimization period. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 608 or predicted utility rates estimated by load/rate predictor 822.

In some embodiments, the utility rates include demand charges for one or more resources provided by utilities 608. A demand charge may define a separate cost imposed by utilities 608 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Model predictive optimizer 830 may be configured to account for demand charges in the high level optimization process performed by high level optimizer 832. Utilities 608 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period.

Load/rate predictor 822 may store the predicted loads $Load_i$ and the utility rates in memory 810 and/or provide the predicted loads $Load_i$ and the utility rates to model predictive optimizer 830.

Still referring to FIG. 8, MPM system 602 is shown to include a model predictive optimizer 830. Model predictive optimizer 830 can be configured to perform a multi-level optimization process to optimize the total cost associated with purchasing, maintaining, and operating connected equipment 610. In some embodiments, model predictive optimizer 830 includes a high level optimizer 832 and a low level optimizer 834. High level optimizer 832 may optimize the objective function J for an entire set of connected equipment 610 (e.g., all of the devices within a building) or for a subset of connected equipment 610 (e.g., a single device, all of the devices of a subplant or building subsystem, etc.) to determine the optimal values for each of the decision variables (e.g., $P_{op,i}$, $B_{main,i}$, and $B_{cap,i}$) in the objective function J. The optimization performed by high level optimizer 832 is described in greater detail with reference to FIG. 9.

In some embodiments, low level optimizer 834 receives the optimization results from high level optimizer 832. The optimization results may include optimal power consumption values $P_{op,i}$ and/or load values $Load_i$ for each device or set of devices of connected equipment at each time step i in the optimization period. Low level optimizer 834 may determine how to best run each device or set of devices at the load values determined by high level optimizer 832. For example, low level optimizer 834 may determine on/off states and/or operating setpoints for various devices of connected equipment 610 in order to optimize (e.g., minimize) the power consumption of connected equipment 610 meeting the corresponding load value $Load_i$.

Low level optimizer 834 may be configured to generate equipment performance curves for each device or set of devices of connected equipment 610. Each performance curve may indicate an amount of resource consumption (e.g., electricity use measured in kW, water use measured in L/s, etc.) by a particular device or set of devices of connected equipment 610 as a function of the load on the device or set of devices. In some embodiments, low level optimizer 834 generates the performance curves by performing a low level optimization process at various combinations of load points (e.g., various values of $Load_i$) and weather conditions to generate multiple data points. The low level optimization may be used to determine the minimum amount of resource consumption required to satisfy the corresponding heating or cooling load. An example of a low level optimization process which can be performed by low level optimizer 834 is described in detail in U.S. patent application Ser. No. 14/634,615 titled "Low Level Central Plant Optimization" and filed Feb. 27, 2015, the entire disclosure of which is incorporated by reference herein. Low level optimizer 834 may fit a curve to the data points to generate the performance curves.

In some embodiments, low level optimizer 834 generates equipment performance curves for a set of connected equipment 610 (e.g., a chiller subplant, a heater subplant, etc.) by combining efficiency curves for individual devices of connected equipment 610. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 818. For some devices, the device efficiency curves may indicate that resource consumption is a U-shaped function of load. Accordingly, when multiple device efficiency curves are combined into a performance curve for multiple devices, the resultant performance curve may be a wavy curve. The waves are caused by a single device loading up before it is more efficient to turn on another device to satisfy the subplant load. Low level optimizer 834 may provide the equipment performance curves to high level optimizer 832 for use in the high level optimization process.

Still referring to FIG. 8, MPM system 602 is shown to include an equipment controller 828. Equipment controller 828 can be configured to control connected equipment 610 to affect a variable state or condition in building 10 (e.g., temperature, humidity, etc.). In some embodiments, equipment controller 828 controls connected equipment 610 based on the results of the optimization performed by model predictive optimizer 830. In some embodiments, equipment controller 828 generates control signals which can be provided to connected equipment 610 via communications interface 804 and/or BMS 606. The control signals may be based on the optimal values of the decision variables in the objective function J. For example, equipment controller 828 may generate control signals which cause connected equipment 610 to achieve the optimal power consumption values $P_{op,i}$ for each time step i in the optimization period.

Data and processing results from model predictive optimizer 830, equipment controller 828, or other modules of MPM system 602 may be accessed by (or pushed to) monitoring and reporting applications 826. Monitoring and reporting applications 826 may be configured to generate real time "system health" dashboards that can be viewed and navigated by a user (e.g., a system engineer). For example, monitoring and reporting applications 826 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across building management systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the building system.

Still referring to FIG. 8, MPM system 602 may include one or more GUI servers, web services 812, or GUI engines 814 to support monitoring and reporting applications 826. In various embodiments, applications 826, web services 812, and GUI engine 814 may be provided as separate components outside of MPM system 602 (e.g., as part of a smart building manager). MPM system 602 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. MPM system 602 may be configured to provide the results of any such processing to other databases, tables, XML files, or other data structures for further querying, calculation, or access by, for example, external monitoring and reporting applications.

MPM system 602 is shown to include configuration tools 816. Configuration tools 816 can allow a user to define (e.g., via graphical user interfaces, via prompt-driven "wizards," etc.) how MPM system 602 should react to changing conditions in BMS 606 and/or connected equipment 610. In an exemplary embodiment, configuration tools 816 allow a user to build and store condition-response scenarios that can cross multiple devices of connected equipment 610, multiple building systems, and multiple enterprise control applications (e.g., work order management system applications, entity resource planning applications, etc.). For example, configuration tools 816 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 816 can present user interfaces for building such conditional logic. The user interfaces may allow users to define policies and responses graphically. In some embodiments, the user interfaces may allow a user to select a pre-stored or pre-constructed policy and adapt it or enable it for use with their system.

High Level Optimizer

Figure 9:
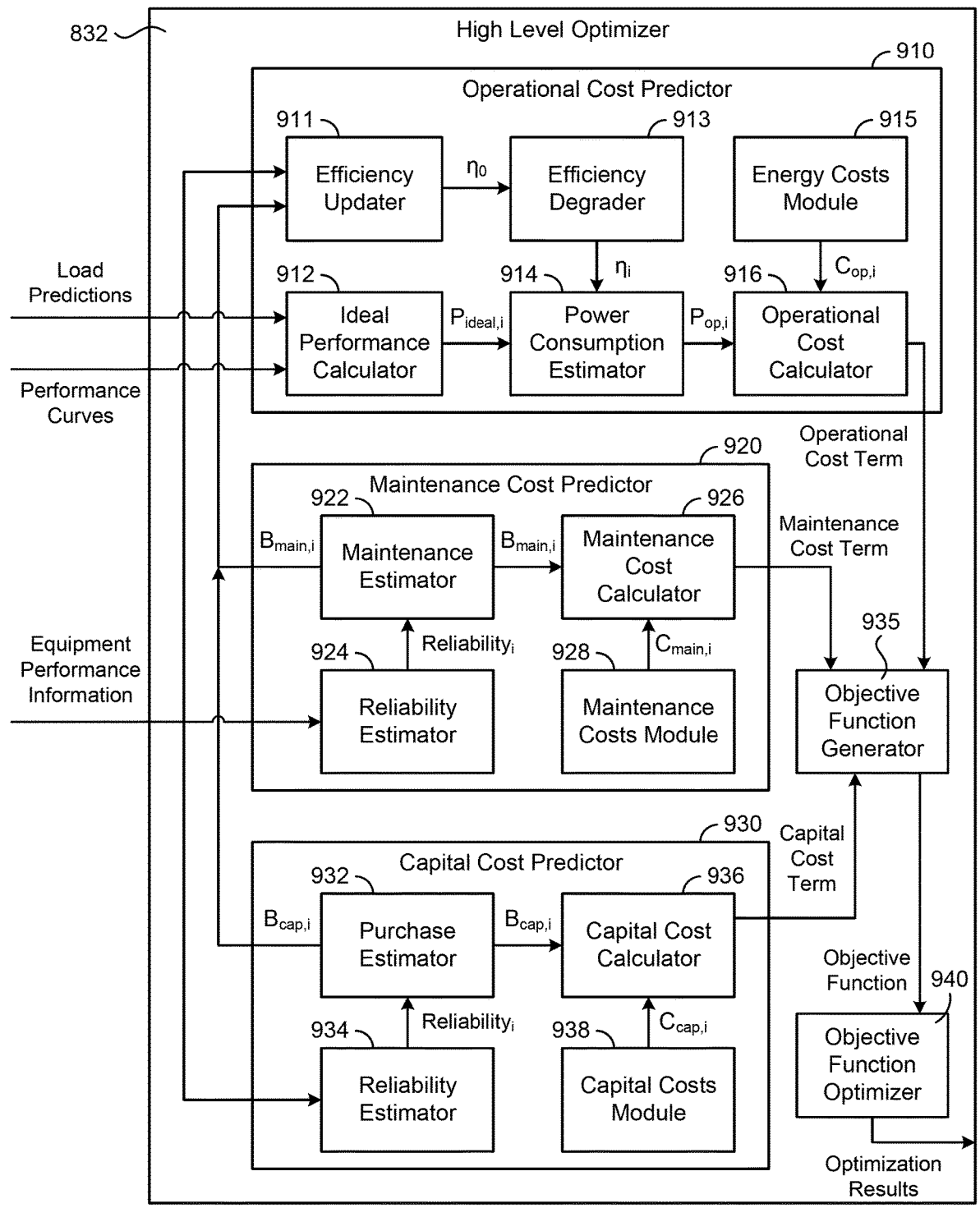
FIG. 9 is a block diagram illustrating a high level optimizer of the MPM system of FIG. 6 in greater detail, according to some embodiments.

Referring now to FIG. 9, a block diagram illustrating high level optimizer 832 in greater detail is shown, according to an exemplary embodiment. High level optimizer 832 can be configured to determine an optimal maintenance strategy for connected equipment 610. In some embodiments, the optimal maintenance strategy is a set of decisions which optimizes the total cost associated with purchasing, maintaining, and operating connected equipment 610 over the duration of an optimization period (e.g., 30 weeks, 52 weeks, 10 years, 30 years, etc.). The decisions can include, for example, equipment purchase decisions, equipment maintenance decisions, and equipment operating decisions.

High level optimizer 832 is shown to include an operational cost predictor 910, a maintenance cost predictor 920, a capital cost predictor 930, an objective function generator 935, and an objective function optimizer 940. Cost predictors 910, 920, and 930 can use a model predictive control technique to formulate an objective function which expresses the total cost as a function of several decision variables (e.g., maintenance decisions, equipment purchase decisions, etc.) and input parameters (e.g., energy cost, device efficiency, device reliability). Operational cost predictor 910 can be configured to formulate an operational cost term in the objective function. Similarly, maintenance cost predictor 920 can be configured to formulate a maintenance cost term in the objective function and capital cost predictor 930 can be configured to formulate a capital cost term in the objective function. Objective function optimizer 940 can optimize (i.e., minimize) the objective function using any of a variety of optimization techniques to identify the optimal values for each of the decision variables.

One example of an objective function which can be generated by high level optimizer 832 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} B_{cap,i}$$

where $C_{op,i}$ is the cost per unit of energy (e.g., \$/kWh) consumed by connected equipment 610 at time step i of the optimization period, $P_{op,i}$ is the power consumption (e.g., kW) of connected equipment 610 at time step i, $\Delta t$ is the duration of each time step i, $C_{main,i}$ is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

Operational Cost Predictor

Operational cost predictor 910 can be configured to formulate the first term in the objective function J. The first term in the objective function J represents the operating cost of connected equipment 610 over the duration of the optimization period and is shown to include three variables or parameters (i.e., $C_{op,i}$, $P_{op,i}$, and $\Delta t$). In some embodiments, the cost per unit of energy $C_{op,i}$ is determined by energy costs module 915. Energy costs module 915 can receive a set of energy prices from utility 608 as energy pricing data. In some embodiments, the energy prices are time-varying cost that depend on the time of day, the day of the week (e.g., weekday vs. weekend), the current season (e.g., summer vs. winter), or other time-based factors. For example, the cost of electricity may be higher during peak energy consumption periods and lower during off-peak or partial-peak energy consumption periods.

Energy costs module 915 can use the energy costs to define the value of $C_{op,i}$ for each time step i of the optimization period. In some embodiments, energy costs module 915 stores the energy costs as an array $C_{op}$ including a cost element for each of the h time steps in the optimization period. For example, energy costs module 915 can generate the following array:

$$C_{op} = [C_{op,1}, C_{op,2} \ldots C_{op,h}]$$

where the array $C_{op}$ has a size of 1×h and each element of the array $C_{op}$ includes an energy cost value $C_{op,i}$ for a particular time step i=1 . . . h of the optimization period.

Still referring to FIG. 9, operational cost predictor 910 is shown to include an ideal performance calculator 912. Ideal performance calculator 912 may receive load predictions $Load_i$ from load/rate predictor 822 and may receive performance curves from low level optimizer 834. As discussed above, the performance curves may define the ideal power consumption $P_{ideal}$ of a device or set of devices of connected equipment 610 as a function of the heating or cooling load on the device or set of devices. For example, the performance curve one or more devices of connected equipment 610 can be defined by the following equation:

$$P_{ideal,i} = f(Load_i)$$

where $P_{ideal,i}$ is the ideal power consumption (e.g., kW) of connected equipment 610 at time step i and $Load_i$ is the load (e.g., tons cooling, kW heating, etc.) on connected equipment 610 at time step i. The ideal power consumption $P_{ideal,i}$ may represent the power consumption of the one or more devices of connected equipment 610 assuming they operate at perfect efficiency.

Ideal performance calculator 912 can use the performance curve for a device or set of devices of connected equipment 610 to identify the value of $P_{ideal,i}$ that corresponds to the load point $Load_i$ for the device or set of devices at each time step of the optimization period. In some embodiments, ideal performance calculator 912 stores the ideal load values as an array $P_{ideal}$ including an element for each of the h time steps in the optimization period. For example, ideal performance calculator 912 can generate the following array:

$$P_{ideal} = [P_{ideal,1}, P_{ideal,2} \ldots P_{ideal,h}]^T$$

where the array $P_{ideal}$ has a size of h×1 and each element of the array $P_{ideal}$ includes an ideal power consumption value $P_{ideal,i}$ for a particular time step i=1 . . . h of the optimization period.

Still referring to FIG. 9, operational cost predictor 910 is shown to include an efficiency updater 911 and an efficiency degrader 913. Efficiency updater 911 can be configured to determine the efficiency η of connected equipment 610 under actual operating conditions. In some embodiments, the efficiency $\eta_i$ represents the ratio of the ideal power consumption $P_{ideal}$ of connected equipment to the actual power consumption $P_{actual}$ of connected equipment 610, as shown in the following equation:

$$\eta = \frac{P_{ideal}}{P_{actual}}$$

where $P_{ideal}$ is the ideal power consumption of connected equipment 610 as defined by the performance curve for connected equipment 610 and $P_{actual}$ is the actual power consumption of connected equipment 610. In some embodiments, efficiency updater 911 uses the equipment performance information collected from connected equipment 610 to identify the actual power consumption value $P_{actual}$. Efficiency updater 911 can use the actual power consumption $P_{actual}$ in combination with the ideal power consumption $P_{ideal}$ to calculate the efficiency η.

Efficiency updater 911 can be configured to periodically update the efficiency η to reflect the current operating efficiency η of connected equipment 610. For example, efficiency updater 911 can calculate the efficiency η of connected equipment 610 once per day, once per week, once per year, or at any other interval as may be suitable to capture changes in the efficiency η over time. Each value of the efficiency η may be based on corresponding values of $P_{ideal}$ and $P_{actual}$ at the time the efficiency η is calculated. In some embodiments, efficiency updater 911 updates the efficiency η each time the high level optimization process is performed (i.e., each time the objective function J is optimized). The efficiency value calculated by efficiency updater 911 may be stored in memory 810 as an initial efficiency value $\eta_0$, where the subscript 0 denotes the value of the efficiency η at or before the beginning of the optimization period (e.g., at time step 0).

In some embodiments, efficiency updater 911 updates the efficiency $\eta_i$ for one or more time steps during the optimization period to account for increases in the efficiency η of connected equipment 610 that will result from performing maintenance on connected equipment 610 or purchasing new equipment to replace or supplement one or more devices of connected equipment 610. The time steps i at which the efficiency $\eta_i$ is updated may correspond to the predicted time steps at which the maintenance will be performed or the equipment will replaced. The predicted time steps at which maintenance will be performed on connected equipment 610 may be defined by the values of the binary decision variables $B_{main,i}$ in the objective function J. Similarly, the predicted time steps at which the equipment will be replaced may be defined by the values of the binary decision variables $B_{cap,i}$ in the objective function J.

Efficiency updater 911 can be configured to reset the efficiency $\eta_i$ for a given time step i if the binary decision variables $B_{main,i}$ and $B_{cap,i}$ indicate that maintenance will be performed at that time step and/or new equipment will be purchased at that time step (i.e., $B_{main,i}=1$ and/or $B_{cap,i}=1$). For example, if $B_{main,i}=1$, efficiency updater 911 can be configured to reset the value of $\eta_i$ to $\eta_{main}$, where $\eta_{main}$ is the efficiency value that is expected to result from the maintenance performed at time step i. Similarly, if $B_{cap,i}=1$, efficiency updater 911 can be configured to reset the value of $\eta_i$ to $\eta_{cap}$, where $\eta_{cap}$ is the efficiency value that is expected to result from purchasing a new device to supplement or replace one or more devices of connected equipment 610 performed at time step i. Efficiency updater 911 can dynamically reset the efficiency $\eta_i$ for one or more time steps while the optimization is being performed (e.g., with each iteration of the optimization) based on the values of binary decision variables $B_{main,i}$ and $B_{cap,i}$.

Efficiency degrader 913 can be configured to predict the efficiency $\eta_i$ of connected equipment 610 at each time step i of the optimization period. The initial efficiency $\eta_0$ at the beginning of the optimization period may degrade over time as connected equipment 610 degrade in performance. For example, the efficiency of a chiller may degrade over time as a result of the chilled water tubes becoming dirty and reducing the heat transfer coefficient of the chiller. Similarly, the efficiency of a battery may decrease over time as a result of degradation in the physical or chemical components of the battery. Efficiency degrader 913 can be configured to account for such degradation by incrementally reducing the efficiency $\eta_i$ over the duration of the optimization period.

In some embodiments, the initial efficiency value $\eta_0$ is updated at the beginning of each optimization period. However, the efficiency η may degrade during the optimization period such that the initial efficiency value $\eta_0$ becomes increasingly inaccurate over the duration of the optimization period. To account for efficiency degradation during the optimization period, efficiency degrader 913 can decrease the efficiency η by a predetermined amount with each successive time step. For example, efficiency degrader 913 can define the efficiency at each time step i=1 . . . h as follows:

$$\eta_i = \eta_{i-1} - \Delta\eta$$

where $\eta_i$ is the efficiency at time step i, $\eta_{i-1}$ is the efficiency at time step i−1, and $\Delta\eta$ is the degradation in efficiency between consecutive time steps. In some embodiments, this definition of $\eta_i$ is applied to each time step for which $B_{main,i}=0$ and $B_{cap,i}=0$. However, if either $B_{main,i}=1$ or $B_{cap,i}=1$, the value of $\eta_i$ may be reset to either $\eta_{main}$ or $\eta_{cap}$ as previously described.

In some embodiments, the value of $\Delta\eta$ is based on a time series of efficiency values calculated by efficiency updater 911. For example, efficiency degrader 913 may record a time series of the initial efficiency values $\eta_0$ calculated by efficiency updater 911, where each of the initial efficiency values $\eta_0$ represents the empirically-calculated efficiency of connected equipment 610 at a particular time. Efficiency degrader 913 can examine the time series of initial efficiency values $\eta_0$ to determine the rate at which the efficiency degrades. For example, if the initial efficiency $\eta_0$ at time $\eta_1$ is $\eta_{0,1}$ and the initial efficiency at time $\eta_2$ is $\eta_{0,2}$, efficiency degrader 913 can calculate the rate of efficiency degradation as follows:

$$\frac{\Delta \eta}{\Delta t} = \frac{\eta_{0,2} - \eta_{0,1}}{t_2 - t_1} \text{ where } \frac{\Delta \eta}{\Delta t}$$

is the rate of efficiency degradation. Efficiency degrader 913 can multiply $$\frac{\Delta \eta}{\Delta t}$$

by the duration of each time step $\Delta t$ to calculate the value of $\Delta \eta$ $$\left( \text{i.e., } \Delta \eta = \frac{\Delta \eta}{\Delta t} * \Delta t \right).$$

In some embodiments, efficiency degrader 913 stores the efficiency values over the duration of the optimization period in an array $\eta$ including an element for each of the h time steps in the optimization period. For example, efficiency degrader 913 can generate the following array:

$$\eta = [\eta_1 \eta_2 \ldots \eta_h]$$

where the array has a size of 1×h and each element of the array $\eta$ includes an efficiency value $\eta_i$ for a particular time step i=1 . . . h of the optimization period. Each element i of the array $\eta$ may be calculated based on the value of the previous element and the value of $\Delta \eta$ (e.g., if $B_{main,i}=0$ and $B_{cap,i}=0$) or may be dynamically reset to either $\eta_{main}$ or $\eta_{cap}$ (e.g., if $B_{main,i}=1$ or $B_{cap,i}=1$.

The logic characterizing the efficiency updating and resetting operations performed by efficiency updater 911 and efficiency degrader 913 can be summarized in the following equations:

if $B_{main,i}=1 \rightarrow \eta_i = \eta_{main}$ if $B_{cap,i}=1 \Theta \eta_i + \eta_{cap}$ if $B_{main,i}=0$ and $B_{cap,i}=0 \rightarrow \eta_i = \eta_{i-1} - \Delta \eta$ which can be applied as constraints on the high level optimization performed by objective function optimizer 940.

Advantageously, efficiency updater 911 and efficiency degrader 913 can model the efficiency $\eta_i$ of connected equipment 610 at each time step i as a function of the maintenance decisions $B_{main,i}$ and the equipment purchase decisions $B_{cap,i}$. For example, the efficiency $\eta_i$ for a particular device may start at an initial value $\eta_0$ at the beginning of the optimization period and may degrade over time such that the efficiency $\eta_i$ decreases with each successive time step i. Performing maintenance on a device may reset the efficiency $\eta_i$ to a higher value immediately after the maintenance is performed. Similarly, purchasing a new device to replace an existing device may reset the efficiency $\eta_i$ to a higher value immediately after the new device is purchased. After being reset, the efficiency $\eta_i$ may continue to degrade over time until the next time at which maintenance is performed or a new device is purchased.

Still referring to FIG. 9, operational cost predictor 910 is shown to include a power consumption estimator 914 and an operational cost calculator 916. Power consumption estimator 914 can be configured to estimate the power consumption $P_{op,i}$ of connected equipment 610 at each time step i of the optimization period. In some embodiments, power consumption estimator 914 estimates the power consumption $P_{op,i}$ as a function of the ideal power consumption $P_{ideal,i}$ calculated by ideal performance calculator 912 and the efficiency $\eta_i$ determined by efficiency degrader 913 and/or efficiency updater 911. For example, power consumption estimator 914 can calculate the power consumption $P_{op,i}$ using the following equation:

$$P_{op,i} = \frac{P_{ideal,i}}{\eta_i}$$

where $P_{ideal,i}$ is the power consumption calculated by ideal performance calculator 912 based on the equipment performance curve for the device at the corresponding load point $Load_i$, and $\eta_i$ is the operating efficiency of the device at time step i.

In some embodiments, power consumption estimator 914 stores the power consumption values as an array $P_{op}$ including an element for each of the h time steps in the optimization period. For example, power consumption estimator 914 can generate the following array:

$$P_{op} = [P_{op,1} P_{op,2} \ldots P_{op,h}]^T$$

where the array $P_{op,i}$ has a size of h×1 and each element of the array $P_{op}$ includes a power consumption value $P_{op,i}$ for a particular time step i=1 . . . h of the optimization period.

Operational cost calculator 916 can be configured to estimate the operational cost of connected equipment 610 over the duration of the optimization period. In some embodiments, operational cost calculator 916 calculates the operational cost during each time step i using the following equation:

$$Cost_{op,i} = C_{op,i} P_{op,i} \Delta t$$

where $P_{op,i}$ is the predicted power consumption at time step i determined by power consumption estimator 914, $C_{op,i}$ is the cost per unit of energy at time step i determined by energy costs module 915, and $\Delta t$ is the duration of each time step. Operational cost calculator 916 can sum the operational costs over the duration of the optimization period as follows:

$$Cost_{op} = \sum_{i=1}^{h} Cost_{op,i}$$

where $Cost_{op}$ is the operational cost term of the objective function J.

In other embodiments, operational cost calculator 916 estimates the operational cost $Cost_{op}$ by multiplying the cost array $C_{op}$ by the power consumption array $P_{op}$ and the duration of each time step $\Delta t$ as shown in the following equations:

$$Cost_{op} = C_{op} P_{op} \Delta t$$

$$Cost_{op} = [C_{op,1} C_{op,2} \ldots C_{op,h}][P_{op,1} P_{op,2} \ldots P_{op,h}] \Delta t$$

Maintenance Cost Predictor

Maintenance cost predictor 920 can be configured to formulate the second term in the objective function J. The second term in the objective function J represents the cost of performing maintenance on connected equipment 610 over the duration of the optimization period and is shown to include two variables or parameters (i.e., $C_{main,i}$ and $B_{main,i}$).

Maintenance cost predictor 920 is shown to include a maintenance estimator 922, a reliability estimator 924, a maintenance cost calculator 926, and a maintenance costs module 928.

Reliability estimator 924 can be configured to estimate the reliability of connected equipment 610 based on the equipment performance information received from connected equipment 610. The reliability may be a statistical measure of the likelihood that connected equipment 610 will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since connected equipment 610 last received maintenance and/or an amount of time that has elapsed since connected equipment 610 was purchased or installed.

In some embodiments, reliability estimator 924 uses the equipment performance information to identify a current operating state of connected equipment 610. The current operating state can be examined by reliability estimator 924 to expose when connected equipment 610 begins to degrade in performance and/or to predict when faults will occur. In some embodiments, reliability estimator 924 estimates a likelihood of various types of failures that could potentially occur in connected equipment 610. The likelihood of each failure may be based on the current operating conditions of connected equipment 610, an amount of time that has elapsed since connected equipment 610 has been installed, and/or an amount of time that has elapsed since maintenance was last performed. In some embodiments, reliability estimator 924 identifies operating states and predicts the likelihood of various failures using the systems and methods described in U.S. patent application Ser. No. 15/188,824 titled "Building Management System With Predictive Diagnostics" and filed Jun. 21, 2016, the entire disclosure of which is incorporated by reference herein.

In some embodiments, reliability estimator 924 receives operating data from a plurality of devices of connected equipment 610 distributed across multiple buildings. The operating data can include, for example, current operating conditions, fault indications, failure times, or other data that characterize the operation and performance of connected equipment 610. Reliability estimator 924 can use the set of operating data to develop a reliability model for each type of equipment. The reliability models can be used by reliability estimator 924 to estimate the reliability of any given device of connected equipment 610 as a function of its current operating conditions and/or other extraneous factors (e.g., time since maintenance was last performed, time since installation or purchase, geographic location, water quality, etc.).

One example of a reliability model which can be used by reliability estimator 924 is shown in the following equation:

$$\text{Reliability}_i = f(\text{OpCond}_i, \Delta t_{main,i}, \Delta t_{cap,i})$$

where Reliability$_i$ is the reliability of connected equipment 610 at time step i, OpCond$_i$ are the operating conditions at time step i, $\Delta t_{main,i}$ is the amount of time that has elapsed between the time at which maintenance was last performed and time step i, and $\Delta \eta_{cap,i}$ is the amount of time that has elapsed between the time at which connected equipment 610 was purchased or installed and time step i. Reliability estimator 924 can be configured to identify the current operating conditions OpCond$_i$ based on the equipment performance information received as a feedback from connected equipment 610. Operating under more strenuous conditions (e.g., high load, extreme temperatures, etc.) may result in a lower reliability, whereas operating under less strenuous conditions (e.g., low load, moderate temperatures, etc.) may result in a higher reliability.

Reliability estimator 924 may determine the amount of time $\Delta t_{main,i}$ that has elapsed since maintenance was last performed on connected equipment 610 based on the values of the binary decision variables $B_{main,i}$. For each time step i, reliability estimator 924 can examine the corresponding values of $B_{main}$ at time step i and each previous time step (e.g., time steps i−1, i−2, . . . , 1). Reliability estimator 924 can calculate the value of $\Delta t_{main,i}$ by subtracting the time at which maintenance was last performed (i.e., the most recent time at which $B_{main,i}=1$) from the time associated with time step i. A long amount of time $\Delta t_{main,i}$ since maintenance was last performed may result in a lower reliability, whereas a short amount of time since maintenance was last performed may result in a higher reliability.

Similarly, reliability estimator 924 may determine the amount of time $\Delta t_{cap,i}$ that has elapsed since connected equipment 610 was purchased or installed based on the values of the binary decision variables $B_{cap,i}$. For each time step i, reliability estimator 924 can examine the corresponding values of $B_{cap}$ at time step i and each previous time step (e.g., time steps i−1, i−2, . . . , 1). Reliability estimator 924 can calculate the value of $\Delta t_{cap,i}$ by subtracting the time at which connected equipment 610 was purchased or installed (i.e., the most recent time at which $B_{cap,i}=1$) from the time associated with time step i. A long amount of time $\Delta t_{cap,i}$ since connected equipment 610 was purchased or installed may result in a lower reliability, whereas a short amount of time since connected equipment 610 was purchased or installed may result in a higher reliability.

Reliability estimator 924 can be configured to reset the reliability for a given time step i if the binary decision variables $B_{main,i}$ and $B_{cap,i}$ indicate that maintenance will be performed at that time step and/or new equipment will be purchased at that time step (i.e., $B_{main,i}=1$ and/or $B_{cap,i}=1$). For example, if $B_{main}=1$, reliability estimator 924 can be configured to reset the value of Reliability to Reliability$_{main}$, where Reliability$_{main}$ is the reliability value that is expected to result from the maintenance performed at time step i. Similarly, if $B_{cap,i}=1$, reliability estimator 924 can be configured to reset the value of Reliability to Reliability$_{cap}$, where Reliability$_{cap}$ is the reliability value that is expected to result from purchasing a new device to supplement or replace one or more devices of connected equipment 610 performed at time step i. Reliability estimator 924 can dynamically reset the reliability for one or more time steps while the optimization is being performed (e.g., with each iteration of the optimization) based on the values of binary decision variables $B_{main,i}$ and $B_{cap,i}$.

Maintenance estimator 922 can be configured to use the estimated reliability of connected equipment 610 over the duration of the optimization period to determine the probability that connected equipment 610 will require maintenance and/or replacement at each time step of the optimization period. In some embodiments, maintenance estimator 922 is configured to compare the probability that connected equipment 610 will require maintenance at a given time step to a critical value. Maintenance estimator 922 can be configured to set the value of $B_{main,i}=1$ in response to a determination that the probability that connected equipment 610 will require maintenance at time step i exceeds the critical value. Similarly, maintenance estimator 922 can be configured to compare the probability that connected equipment 610 will require replacement at a given time step to a critical value. Maintenance estimator 922 can be configured to set the value of $B_{cap,i}=1$ in response to a determination that the probability that connected equipment 610 will require replacement at time step i exceeds the critical value.

In some embodiments, a reciprocal relationship exists between the reliability of connected equipment 610 and the values of the binary decision variables $B_{main,i}$ and $B_{cap,i}$. In other words, the reliability of connected equipment 610 can affect the values of the binary decision variables $B_{main,i}$ and $B_{cap,i}$ selected in the optimization, and the values of the binary decision variables $B_{main,i}$ and $B_{cap,i}$ can affect the reliability of connected equipment 610. Advantageously, the optimization performed by objective function optimizer 940 can identify the optimal values of the binary decision variables $B_{main,i}$ and $B_{cap,i}$ while accounting for the reciprocal relationship between the binary decision variables $B_{main,i}$ and $B_{cap,i}$ and the reliability of connected equipment 610.

In some embodiments, maintenance estimator 922 generates a matrix $B_{main}$ of the binary maintenance decision variables. The matrix $B_{main}$ may include a binary decision variable for each of the different maintenance activities that can be performed at each time step of the optimization period. For example, maintenance estimator 922 can generate the following matrix:

$$B_{main} = \begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix}$$

where the matrix $B_{main}$ has a size of m×h and each element of the matrix $B_{main}$ includes a binary decision variable for a particular maintenance activity at a particular time step of the optimization period. For example, the value of the binary decision variable $B_{main,j,i}$ indicates whether the jth maintenance activity will be performed during the ith time step of the optimization period.

Still referring to FIG. 9, maintenance cost predictor 920 is shown to include a maintenance costs module 928 and a maintenance costs calculator 926. Maintenance costs module 928 can be configured to determine costs $C_{main,i}$ associated with performing various types of maintenance on connected equipment 610. Maintenance costs module 928 can receive a set of maintenance costs from an external system or device (e.g., a database, a user device, etc.). In some embodiments, the maintenance costs define the economic cost (e.g., $) of performing various types of maintenance. Each type of maintenance activity may have a different economic cost associated therewith. For example, the maintenance activity of changing the oil in a chiller compressor may incur a relatively small economic cost, whereas the maintenance activity of completely disassembling the chiller and cleaning all of the chilled water tubes may incur a significantly larger economic cost.

Maintenance costs module 928 can use the maintenance costs to define the values of $C_{main,i}$ in objective function J. In some embodiments, maintenance costs module 928 stores the maintenance costs as an array $C_{main}$ including a cost element for each of the maintenance activities that can be performed. For example, maintenance costs module 928 can generate the following array:

$$C_{main} = [C_{main,1} C_{main,2} \cdots C_{main,m}]$$

where the array $C_{main}$ has a size of 1×m and each element of the array $C_{main}$ includes a maintenance cost value $C_{main,j}$ for a particular maintenance activity j=1 . . . m.

Some maintenance activities may be more expensive than other. However, different types of maintenance activities may result in different levels of improvement to the efficiency η and/or the reliability of connected equipment 610. For example, merely changing the oil in a chiller may result in a minor improvement in efficiency η and/or a minor improvement in reliability, whereas completely disassembling the chiller and cleaning all of the chilled water tubes may result in a significantly greater improvement to the efficiency η and/or the reliability of connected equipment 610. Accordingly, multiple different levels of post-maintenance efficiency (i.e., $\eta_{main}$) and post-maintenance reliability (i.e., $Reliability_{main}$) may exist. Each level of $\eta_{main}$ and $Reliability_{main}$ may correspond to a different type of maintenance activity.

In some embodiments, maintenance estimator 922 stores each of the different levels of $\eta_{main}$ and $Reliability_{main}$ in a corresponding array. For example, the parameter $\eta_{main}$ can be defined as an array $\eta_{main}$ with an element for each of the m different types of maintenance activities. Similarly, the parameter $Reliability_{main}$ can be defined as an array $Reliability_{main}$ with an element for each of the m different types of maintenance activities. Examples of these arrays are shown in the following equations:

$$\eta_{main} = [\eta_{main,1} \eta_{main,2} \cdots \eta_{main,m}]$$

$$Reliability_{main} = [Reliability_{main,1} Reliability_{main,2} \cdots Reliability_{main,m}]$$

where the array $\eta_{main}$ has a size of 1×m and each element of the array $\eta_{main}$ includes a post-maintenance efficiency value $\eta_{main,j}$ for a particular maintenance activity. Similarly, the array $Reliability_{main}$ has a size of 1×m and each element of the array $Reliability_{main}$ includes a post-maintenance reliability value $Reliability_{main,j}$ for a particular maintenance activity.

In some embodiments, efficiency updater 911 identifies the maintenance activity associated with each binary decision variable $B_{main,i}$ and resets the efficiency η to the corresponding post-maintenance efficiency level $\eta_{main,j}$ if $B_{main,j,i}=1$. Similarly, reliability estimator 924 can identify the maintenance activity associated with each binary decision variable $B_{main,j,i}$ and can reset the reliability to the corresponding post-maintenance reliability level $Reliability_{main,j}$ if $B_{main,j,i}=1$.

Maintenance cost calculator 926 can be configured to estimate the maintenance cost of connected equipment 610 over the duration of the optimization period. In some embodiments, maintenance cost calculator 926 calculates the maintenance cost during each time step i using the following equation:

$$Cost_{main,i} = C_{main,i} B_{main,i}$$

where $C_{main,i}$ is an array of maintenance costs including an element for each of the m different types of maintenance activities that can be performed at time step i and $B_{main,i}$ is an array of binary decision variables indicating whether each of the m maintenance activities will be performed at time step i. Maintenance cost calculator 926 can sum the maintenance costs over the duration of the optimization period as follows:

$$\text{Cost}_{main} = \sum_{i=1}^{h} \text{Cost}_{main,i}$$

where $\text{Cost}_{main}$ is the maintenance cost term of the objective function J.

In other embodiments, maintenance cost calculator 926 estimates the maintenance cost $\text{Cost}_{main}$ by multiplying the maintenance cost array $C_{main}$ by the matrix of binary decision variables $B_{main}$ as shown in the following equations:

$$\text{Cost}_{main} = C_{main} B_{main}$$

$$\text{Cost}_{main} = [\,C_{main,1} \quad C_{main,2} \quad \ldots \quad C_{main,m}\,]$$

$$\begin{bmatrix} B_{main,1,1} & B_{main,1,2} & \ldots & B_{main,1,h} \\ B_{main,2,1} & B_{main,2,2} & \ldots & B_{main,2,h} \\ \vdots & \vdots & \ddots & \vdots \\ B_{main,m,1} & B_{main,m,2} & \ldots & B_{main,m,h} \end{bmatrix}$$

Capital Cost Predictor

Capital cost predictor 930 can be configured to formulate the third term in the objective function J. The third term in the objective function J represents the cost of purchasing new devices of connected equipment 610 over the duration of the optimization period and is shown to include two variables or parameters (i.e., $C_{cap,i}$ and $B_{cap,i}$). Capital cost predictor 930 is shown to include a purchase estimator 932, a reliability estimator 934, a capital cost calculator 936, and a capital costs module 938.

Reliability estimator 934 can include some or all of the features of reliability estimator 924, as described with reference to maintenance cost predictor 920. For example, reliability estimator 934 can be configured to estimate the reliability of connected equipment 610 based on the equipment performance information received from connected equipment 610. The reliability may be a statistical measure of the likelihood that connected equipment 610 will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since connected equipment 610 last received maintenance and/or an amount of time that has elapsed since connected equipment 610 was purchased or installed. Reliability estimator 934 can include some or all of the features and/or functionality of reliability estimator 924, as previously described.

Purchase estimator 932 can be configured to use the estimated reliability of connected equipment 610 over the duration of the optimization period to determine the probability that new devices of connected equipment 610 will be purchased at each time step of the optimization period. In some embodiments, purchase estimator 932 is configured to compare the probability that new devices of connected equipment 610 will be purchased at a given time step to a critical value. Purchase estimator 932 can be configured to set the value of $B_{cap,i}=1$ in response to a determination that the probability that connected equipment 610 will be purchased at time step i exceeds the critical value.

In some embodiments, purchase estimator 932 generates a matrix $B_{cap}$ of the binary capital decision variables. The matrix $B_{cap}$ may include a binary decision variable for each of the different capital purchases that can be made at each time step of the optimization period. For example, purchase estimator 932 can generate the following matrix:

$$B_{cap} = \begin{bmatrix} B_{cap,1,1} & B_{cap,1,2} & \ldots & B_{cap,1,h} \\ B_{cap,2,1} & B_{cap,2,2} & \ldots & B_{cap,2,h} \\ \vdots & \vdots & \ddots & \vdots \\ B_{cap,p,1} & B_{cap,p,2} & \ldots & B_{cap,p,h} \end{bmatrix}$$

where the matrix $B_{cap}$ has a size of p×h and each element of the matrix $B_{cap}$ includes a binary decision variable for a particular capital purchase at a particular time step of the optimization period. For example, the value of the binary decision variable $B_{cap,k,i}$ indicates whether the kth capital purchase will be made during the ith time step of the optimization period.

Still referring to FIG. 9, capital cost predictor 930 is shown to include a capital costs module 938 and a capital cost calculator 936. Capital costs module 938 can be configured to determine costs $C_{cap,i}$ associated with various capital purchases (i.e., purchasing one or more new devices of connected equipment 610). Capital costs module 938 can receive a set of capital costs from an external system or device (e.g., a database, a user device, etc.). In some embodiments, the capital costs define the economic cost (e.g., $) of making various capital purchases. Each type of capital purchase may have a different economic cost associated therewith. For example, purchasing a new temperature sensor may incur a relatively small economic cost, whereas purchasing a new chiller may incur a significantly larger economic cost.

Capital costs module 938 can use the purchase costs to define the values of $C_{cap,i}$ in objective function J. In some embodiments, capital costs module 938 stores the capital costs as an array $C_{cap}$ including a cost element for each of the capital purchases that can be made. For example, capital costs module 938 can generate the following array:

$$C_{cap} = [\,C_{cap,1}\, C_{cap,2} \ldots C_{cap,p}\,]$$

where the array $C_{cap}$ has a size of 1×p and each element of the array $C_{cap}$ includes a cost value $C_{cap,k}$ for a particular capital purchase k=1 . . . p.

Some capital purchases may be more expensive than other. However, different types of capital purchases may result in different levels of improvement to the efficiency η and/or the reliability of connected equipment 610. For example, purchasing a new sensor to replace an existing sensor may result in a minor improvement in efficiency η and/or a minor improvement in reliability, whereas purchasing a new chiller and control system may result in a significantly greater improvement to the efficiency η and/or the reliability of connected equipment 610. Accordingly, multiple different levels of post-purchase efficiency (i.e., $\eta_{cap}$) and post-purchase reliability (i.e., $\text{Reliability}_{cap}$) may exist. Each level of $\eta_{cap}$ and $\text{Reliability}_{cap}$ may correspond to a different type of capital purchase.

In some embodiments, purchase estimator 932 stores each of the different levels of $\eta_{cap}$ and $\text{Reliability}_{cap}$ in a corresponding array. For example, the parameter $\eta_{cap}$ can be defined as an array $\eta_{cap}$ with an element for each of the p different types of capital purchases which can be made. Similarly, the parameter $\text{Reliability}_{cap}$ can be defined as an array $\text{Reliability}_{cap}$ with an element for each of the p different types of capital purchases that can be made. Examples of these arrays are shown in the following equations:

$$\eta_{cap} = [\eta_{cap,1} \eta_{cap,2} \cdots \eta_{cap,p}]$$

$$\text{Reliability}_{cap} = [\text{Reliability}_{cap,1} \text{Reliability}_{cap,2} \cdots \text{Reliability}_{cap,p}]$$

where the array $\eta_{cap}$ has a size of 1×p and each element of the array $\eta_{cap}$ includes a post-purchase efficiency value $\eta_{cap,k}$ for a particular capital purchase k. Similarly, the array Reliability$_{cap}$ has a size of 1×p and each element of the array Reliability$_{cap}$ includes a post-purchase reliability value Reliability$_{cap,k}$ for a particular capital purchase k.

In some embodiments, efficiency updater 911 identifies the capital purchase associated with each binary decision variable $B_{main,k,i}$ and resets the efficiency $\eta$ to the corresponding post-purchase efficiency level $\eta_{cap,k}$ if $B_{cap,k,i}=1$. Similarly, reliability estimator 924 can identify the capital purchase associated with each binary decision variable $B_{cap,k,i}$ and can reset the reliability to the corresponding post-purchase reliability level Reliability$_{cap,k}$ if $B_{main,k,i}=1$.

Capital cost calculator 936 can be configured to estimate the capital cost of connected equipment 610 over the duration of the optimization period. In some embodiments, capital cost calculator 936 calculates the capital cost during each time step i using the following equation:

$$\text{Cost}_{cap,i} = C_{cap,i} B_{cap,i}$$

where $C_{cap,i}$ is an array of capital purchase costs including an element for each of the p different capital purchases that can be made at time step i and $B_{cap,i}$ is an array of binary decision variables indicating whether each of the p capital purchases will be made at time step i. Capital cost calculator 936 can sum the capital costs over the duration of the optimization period as follows:

$$\text{Cost}_{cap} = \sum_{i=1}^{h} \text{Cost}_{cap,i}$$

where Cost$_{cap}$ is the capital cost term of the objective function J.

In other embodiments, capital cost calculator 936 estimates the capital cost Cost$_{cap}$ by multiplying the capital cost array $C_{cap}$ by the matrix of binary decision variables $B_{cap}$ as shown in the following equations:

$$\text{Cost}_{cap} = C_{cap} B_{cap}$$

$$\text{Cost}_{cap} = [C_{cap,1} \quad C_{cap,2} \quad \cdots \quad C_{cap,p}] \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{cap,p,h} \end{bmatrix}$$

Objective Function Optimizer

Still referring to FIG. 9, high level optimizer 832 is shown to include an objective function generator 935 and an objective function optimizer 940. Objective function generator 935 can be configured to generate the objective function J by summing the operational cost term, the maintenance cost term, and the capital cost term formulated by cost predictors 910, 920, and 930. One example of an objective function which can be generated by objective function generator 935 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} B_{cap,i}$$

where $C_{op,i}$ is the cost per unit of energy (e.g., $/kWh) consumed by connected equipment 610 at time step i of the optimization period, $P_{op,i}$ is the power consumption (e.g., kW) of connected equipment 610 at time step i, $\Delta t$ is the duration of each time step i, is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

Another example of an objective function which can be generated by objective function generator 935 is shown in the following equation:

$$J = C_{op} P_{op} \Delta t + C_{main} B_{main} + C_{cap} B_{cap}$$

$$J = [C_{op,1} \quad C_{op,2} \quad \cdots \quad C_{op,h}][P_{op,1} \quad P_{op,2} \quad \cdots \quad P_{op,h}]^T \Delta t +$$

$$[C_{main,1} \quad C_{main,2} \quad \cdots \quad C_{main,m}] \begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix} +$$

$$[C_{cap,1} \quad C_{cap,2} \quad \cdots \quad C_{cap,p}] \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{cap,p,h} \end{bmatrix}$$

where the array $C_{op}$ includes an energy cost value $C_{op,i}$ for a particular time step i=1 ... h of the optimization period, the array $P_{op}$ includes a power consumption value $P_{op,i}$ for a particular time step i=1 ... h of the optimization period, each element of the array $C_{main}$ includes a maintenance cost value $C_{main,j}$ for a particular maintenance activity j=1 ... m, each element of the matrix $B_{main}$ includes a binary decision variable for a particular maintenance activity j=1 ... m at a particular time step i=1 ... h of the optimization period, each element of the array $C_{cap}$ includes a capital cost value $C_{cap,k}$ for a particular capital purchase k=1 ... p, and each element of the matrix $B_{cap}$ includes a binary decision variable for a particular capital purchase k=1 ... p at a particular time step i=1 ... h of the optimization period.

Objective function generator 935 can be configured to impose constraints on one or more variables or parameters in the objective function J. The constraints can include any of the equations or relationships described with reference to operational cost predictor 910, maintenance cost predictor 920, and capital cost predictor 930. For example, objective function generator 935 can impose a constraint which defines the power consumption values $P_{op,i}$ for one or more devices of connected equipment 610 as a function of the ideal power consumption $P_{ideal,i}$ and the efficiency $\eta_i$ (e.g., $P_{op,i} = P_{ideal,i} \eta_i$). Objective function generator 935 can impose a constraint which defines the efficiency $\eta_i$ as a function of the binary decision variables $B_{main,i}$ and $B_{cap,i}$, as described with reference to efficiency updater 911 and efficiency degrader 913. Objective function generator 935 can impose a constraint which constrains the binary decision variables $B_{main,i}$ and $B_{cap,i}$ to a value of either zero or one and defines the binary decision variables $B_{main,i}$ and $B_{cap,i}$ as a function of the reliability Reliability$_i$ of connected equipment 610, as described with reference to maintenance estimator 922 and purchase estimator 932. Objective function generator 935 can impose a constraint which defines the reliability Reliability$_i$ of connected equipment 610 as a function of the equipment performance information (e.g., operating conditions, run hours, etc.) as described with reference to reliability estimators 924 and 934.

Objective function optimizer 940 can optimize the objective function J to determine the optimal values of the binary decision variables $B_{main,i}$ and $B_{cap,i}$ over the duration of the optimization period. Objective function optimizer 940 can use any of a variety of optimization techniques to formulate and optimize the objective function J. For example, objective function optimizer 940 can use integer programming, mixed integer linear programming, stochastic optimization, convex programming, dynamic programming, or any other optimization technique to formulate the objective function J, define the constraints, and perform the optimization. These and other optimization techniques are known in the art and will not be described in detail here.

In some embodiments, objective function optimizer 940 uses mixed integer stochastic optimization to optimize the objective function J. In mixed integer stochastic optimization, some of the variables in the objective function J can be defined as functions of random variables or probabilistic variables. For example, the decision variables $B_{main,i}$ and $B_{cap,i}$ can be defined as binary variables that have probabilistic values based on the reliability of connected equipment 610. Low reliability values may increase the probability that the binary decision variables $B_{main,i}$ and $B_{cap,i}$ will have a value of one (e.g., $B_{main,i}=1$ and $B_{cap,i}=1$), whereas high reliability values may increase the probability that the binary decision variables $B_{main,i}$ and $B_{cap,i}$ will have a value of zero (e.g., $B_{main,i}=0$ and $B_{cap,i}=0$). In some embodiments, maintenance estimator 922 and purchase estimator 932 use a mixed integer stochastic technique to define the values of the binary decision variables $B_{main,i}$ and $B_{cap,i}$ as a probabilistic function of the reliability of connected equipment 610.

As discussed above, the objective function J may represent the predicted cost of operating, maintaining, and purchasing one or more devices of connected equipment 610 over the duration of the optimization period. In some embodiments, objective function optimizer 940 is configured to project these costs back to a particular point in time (e.g., the current time) to determine the net present value (NPV) of the one or more devices of connected equipment 610 at a particular point in time. For example, objective function optimizer 940 can project each of the costs in objective function J back to the current time using the following equation:

$$NPV_{cost} = \sum_{i=1}^{h} \frac{Cost_i}{(1+r)^i}$$

where r is the interest rate, $Cost_i$ is the cost incurred during time step i of the optimization period, and $NPV_{cost}$ is the net present value (i.e., the present cost) of the total costs incurred over the duration of the optimization period. In some embodiments, objective function optimizer 940 optimizes the net present value $NPV_{cost}$ to determine the NPV of one or more devices of connected equipment 610 at a particular point in time.

As discussed above, one or more variables or parameters in the objective function J can be updated dynamically based on closed-loop feedback from connected equipment 610. For example, the equipment performance information received from connected equipment 610 can be used to update the reliability and/or the efficiency of connected equipment 610. Objective function optimizer 940 can be configured to optimize the objective function/periodically (e.g., once per day, once per week, once per month, etc.) to dynamically update the predicted cost and/or the net present value $NPV_{cost}$ based on the closed-loop feedback from connected equipment 610.

In some embodiments, objective function optimizer 940 generates optimization results. The optimization results may include the optimal values of the decision variables in the objective function J for each time step i in the optimization period. The optimization results include operating decisions, equipment maintenance decisions, and/or equipment purchase decisions for each device of connected equipment 610. In some embodiments, the optimization results optimize the economic value of operating, maintaining, and purchasing connected equipment 610 over the duration of the optimization period. In some embodiments, the optimization results optimize the net present value of one or more devices of connected equipment 610 at a particular point in time. The optimization results may cause BMS 606 to activate, deactivate, or adjust a setpoint for connected equipment 610 in order to achieve the optimal values of the decision variables specified in the optimization results.

In some embodiments, MPM system 602 uses the optimization results to generate equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of connected equipment 610 may indicate that maintenance should be performed on that device at the 25$^{th}$ time step of the optimization period, whereas a value of $B_{main,25}=0$ may indicate that the maintenance should not be performed at that time step. Similarly, a value of $B_{cap,25}=1$ may indicate that a new device of connected equipment 610 should be purchased at the 25$^{th}$ time step of the optimization period, whereas a value of $B_{cap,25}=0$ may indicate that the new device should not be purchased at that time step.

In some embodiments, the equipment purchase and maintenance recommendations are provided to building 10 (e.g., to BMS 606) and/or to client devices 448. An operator or building owner can use the equipment purchase and maintenance recommendations to assess the costs and benefits of performing maintenance and purchasing new devices. In some embodiments, the equipment purchase and maintenance recommendations are provided to service technicians 620. Service technicians 620 can use the equipment purchase and maintenance recommendations to determine when customers should be contacted to perform service or replace equipment.

Model Predictive Maintenance Process

Figure 10:
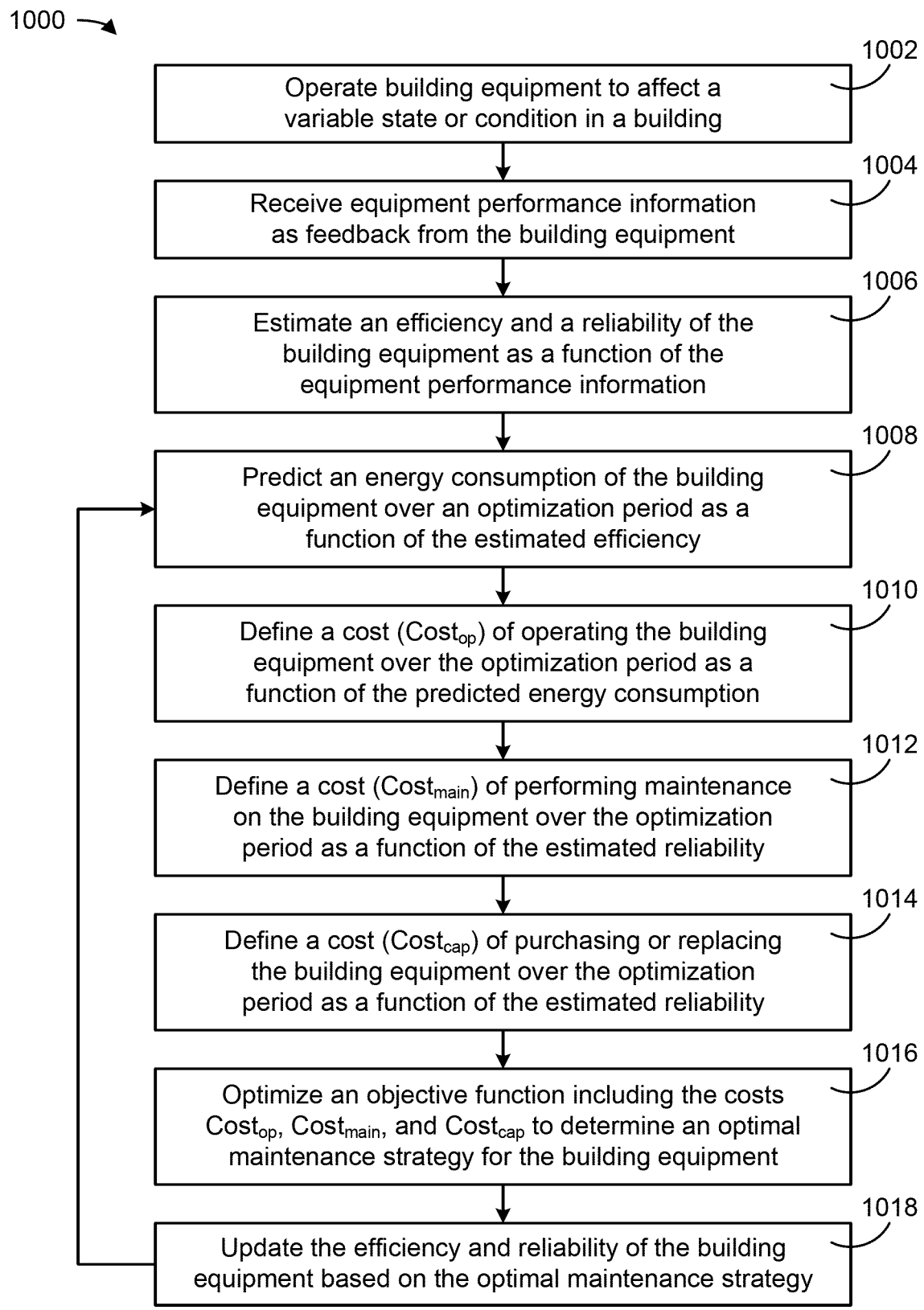
FIG. 10 is a flowchart of a process for operating the MPM system of FIG. 6, according to some embodiments.

Referring now to FIG. 10, a flowchart of a model predictive maintenance process 1000 is shown, according to an exemplary embodiment. Process 1000 can be performed by one or more components of building system 600. In some embodiments, process 1000 is performed by MPM system 602, as described with reference to FIGS. 6-9.

Process 1000 is shown to include operating building equipment to affect a variable state or condition of a building (step 1002) and receiving equipment performance information as feedback from the building equipment (step 1004). The building equipment can include type of equipment which can be used to monitor and/or control a building (e.g., connected equipment 610). For example, the building equipment can include chillers, AHUs, boilers, batteries, heaters, economizers, valves, actuators, dampers, cooling towers, fans, pumps, lighting equipment, security equipment, refrigeration equipment, or any other type of equipment in a building system or building management system. The building equipment can include any of the equipment of HVAC system 100, waterside system 200, airside system 300, BMS 400, and/or BMS 500, as described with reference to FIGS. 1-5. The equipment performance information can include samples of monitored variables (e.g., measured temperature, measured pressure, measured flow rate, power consumption, etc.), current operating conditions (e.g., heating or cooling load, current operating state, etc.), fault indications, or other types of information that characterize the performance of the building equipment.

Process 1000 is shown to include estimating an efficiency and reliability of the building equipment as a function of the equipment performance information (step 1006). In some embodiments, step 1006 is performed by efficiency updater 911 and reliability estimators 924, 926 as described with reference to FIG. 9. Step 1006 can include using the equipment performance information to determine the efficiency $\eta$ of the building equipment under actual operating conditions. In some embodiments, the efficiency $\eta_i$ represents the ratio of the ideal power consumption $P_{ideal}$ of the building equipment to the actual power consumption $P_{actual}$ of the building equipment, as shown in the following equation:

$$\eta = \frac{P_{ideal}}{P_{actual}}$$

where $P_{ideal}$ is the ideal power consumption of the building equipment as defined by the performance curve for the building equipment and $P_{actual}$ is the actual power consumption of the building equipment. In some embodiments, step 1006 includes using the equipment performance information collected in step 1002 to identify the actual power consumption value $P_{actual}$. Step 1006 can include using the actual power consumption $P_{actual}$ in combination with the ideal power consumption $P_{ideal}$ to calculate the efficiency $\eta$.

Step 1006 can include periodically updating the efficiency $\eta$ to reflect the current operating efficiency of the building equipment. For example, step 1006 can include calculating the efficiency $\eta$ of the building equipment once per day, once per week, once per year, or at any other interval as may be suitable to capture changes in the efficiency $\eta$ over time. Each value of the efficiency $\eta$ may be based on corresponding values of $P_{ideal}$ and $P_{actual}$ at the time the efficiency $\eta$ is calculated. In some embodiments, step 1006 includes updating the efficiency $\eta$ each time the high level optimization process is performed (i.e., each time the objective function J is optimized). The efficiency value calculated in step 1006 may be stored in memory 810 as an initial efficiency value $\eta_0$, where the subscript 0 denotes the value of the efficiency $\eta$ at or before the beginning of the optimization period (e.g., at time step $\alpha$).

Step 1006 can include predicting the efficiency $\eta_i$ of the building equipment at each time step i of the optimization period. The initial efficiency $\eta_0$ at the beginning of the optimization period may degrade over time as the building equipment degrade in performance. For example, the efficiency of a chiller may degrade over time as a result of the chilled water tubes becoming dirty and reducing the heat transfer coefficient of the chiller. Similarly, the efficiency of a battery may decrease over time as a result of degradation in the physical or chemical components of the battery. Step 1006 can account for such degradation by incrementally reducing the efficiency $\eta_i$ over the duration of the optimization period.

In some embodiments, the initial efficiency value $\eta_0$ is updated at the beginning of each optimization period. However, the efficiency $\eta$ may degrade during the optimization period such that the initial efficiency value $\eta_0$ becomes increasingly inaccurate over the duration of the optimization period. To account for efficiency degradation during the optimization period, step 1006 can include decreasing the efficiency $\eta$ by a predetermined amount with each successive time step. For example, step 1006 can include defining the efficiency at each time step i=1 . . . h as follows:

$$\eta_i = \eta_{i-1} - \Delta\eta$$

where $\eta_i$ is the efficiency at time step i, $\eta_{i-1}$ is the efficiency at time step i−1, and $\Delta\eta$ is the degradation in efficiency between consecutive time steps. In some embodiments, this definition of $\eta_i$ is applied to each time step for which $B_{main,i}=0$ and $B_{cap,i}=0$. However, if either $B_{main,i}=1$ or $B_{cap,i}=1$, the value of $\eta_i$ may be reset to either $\eta_{main}$ or $\eta_{cap}$ in step 1018.

In some embodiments, the value of $\Delta\eta$ is based on a time series of efficiency values. For example, step 1006 may include recording a time series of the initial efficiency values $\eta_0$, where each of the initial efficiency values $\eta_0$ represents the empirically-calculated efficiency of the building equipment at a particular time. Step 1006 can include examining the time series of initial efficiency values $\eta_0$ to determine the rate at which the efficiency degrades. For example, if the initial efficiency $\eta_0$ at time $t_1$ is $\eta_{0,1}$ and the initial efficiency at time $\eta_2$ is $\eta_{0,2}$, the rate of efficiency degradation can be calculated as follows:

$$\frac{\Delta\eta}{\Delta t} = \frac{\eta_{0,2} - \eta_{0,1}}{t_2 - t_1} \text{ where } \frac{\Delta\eta}{\Delta t}$$

is the rate of efficiency degradation. Step 1006 can include multiplying $$\frac{\Delta\eta}{\Delta t}$$

by the duration of each time step $\Delta t$ to calculate the value of $\Delta\eta$ $$\left(\text{i.e., } \Delta\eta = \frac{\Delta\eta}{\Delta t} * \Delta t\right).$$

Step 1006 can include estimating the reliability of the building equipment based on the equipment performance information received in step 1004. The reliability may be a statistical measure of the likelihood that the building equipment will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since the building equipment last received maintenance and/or an amount of time that has elapsed since the building equipment were purchased or installed.

In some embodiments, step 1006 includes using the equipment performance information to identify a current operating state of the building equipment. The current operating state can be examined to expose when the building equipment begin to degrade in performance and/or to predict when faults will occur. In some embodiments, step 1006 includes estimating a likelihood of various types of failures that could potentially occur the building equipment. The likelihood of each failure may be based on the current operating conditions of the building equipment, an amount of time that has elapsed since the building equipment have been installed, and/or an amount of time that has elapsed since maintenance was last performed. In some embodiments, step 1006 includes identifying operating states and predicts the likelihood of various failures using the systems and methods described in U.S. patent application Ser. No. 15/188,824 titled "Building Management System With Predictive Diagnostics" and filed Jun. 21, 2016, the entire disclosure of which is incorporated by reference herein.

In some embodiments, step 1006 includes receiving operating data from building equipment distributed across multiple buildings. The operating data can include, for example, current operating conditions, fault indications, failure times, or other data that characterize the operation and performance of the building equipment. Step 1006 can include using the set of operating data to develop a reliability model for each type of equipment. The reliability models can be used in step 1006 to estimate the reliability of any given device of the building equipment as a function of its current operating conditions and/or other extraneous factors (e.g., time since maintenance was last performed, time since installation or purchase, geographic location, water quality, etc.).

One example of a reliability model which can be used in step 1006 is shown in the following equation:

$$\text{Reliability}_i = f(\text{OpCond}_i, \Delta t_{main,i}, \Delta t_{cap,i})$$

where $\text{Reliability}_i$ is the reliability of the building equipment at time step i, $\text{OpCond}_i$ are the operating conditions at time step i, $\Delta t_{main,i}$ is the amount of time that has elapsed between the time at which maintenance was last performed and time step i, and $\Delta t_{cap,i}$ is the amount of time that has elapsed between the time at which the building equipment were purchased or installed and time step i. Step 1006 can include identifying the current operating conditions $\text{OpCond}_i$ based on the equipment performance information received as a feedback from the building equipment. Operating under more strenuous conditions (e.g., high load, extreme temperatures, etc.) may result in a lower reliability, whereas operating under less strenuous conditions (e.g., low load, moderate temperatures, etc.) may result in a higher reliability.

Still referring to FIG. 10, process 1000 is shown to include predicting an energy consumption of the building equipment over an optimization period as a function of the estimated efficiency (step 1008). In some embodiments, step 1008 is performed by ideal performance calculator 912 and/or power consumption estimator, as described with reference to FIG. 9. Step 1008 can include receiving load predictions $\text{Load}_i$ from load/rate predictor 822 and performance curves from low level optimizer 834. As discussed above, the performance curves may define the ideal power consumption $P_{ideal}$ of the building equipment a function of the heating or cooling load on the device or set of devices. For example, the performance curve for the building equipment can be defined by the following equation:

$$P_{ideal,i} = f(\text{Load}_i)$$

where $P_{ideal,i}$ is the ideal power consumption (e.g., kW) of the building equipment at time step i and $\text{Load}_i$ is the load (e.g., tons cooling, kW heating, etc.) on the building equipment at time step i. The ideal power consumption $P_{ideal,i}$ may represent the power consumption of the building equipment assuming they operate at perfect efficiency. Step 1008 can include using the performance curve for the building equipment to identify the value of $P_{ideal,i}$ that corresponds to the load point $\text{Load}_i$ for the building equipment at each time step of the optimization period.

In some embodiments, step 1008 includes estimating the power consumption $P_{op,i}$ as a function of the ideal power consumption $P_{ideal,i}$ and the efficiency $\eta_i$ of the building equipment. For example, step 1008 can include calculating the power consumption $P_{op,i}$ using the following equation:

$$P_{op,i} = \frac{P_{ideal,i}}{\eta_i}$$

where $P_{ideal,i}$ is the power consumption based on the equipment performance curve for the building equipment at the corresponding load point $\text{Load}_i$, and $\eta_i$ is the operating efficiency of the building equipment at time step i.

Still referring to FIG. 10, process 1000 is shown to include defining a cost $\text{Cost}_{op}$ of operating the building equipment over the optimization period as a function of the predicted energy consumption (step 1010). In some embodiments, step 1010 is performed by operational cost calculator 916, as described with reference to FIG. 9. Step 1010 can include calculating the operational cost during each time step i using the following equation:

$$\text{Cost}_{op,i} = C_{op,i} P_{op,i} \Delta t$$

where $P_{op,i}$ is the predicted power consumption at time step i determined in step 1008, $C_{op,i}$ is the cost per unit of energy at time step i, and $\Delta t$ is the duration of each time step. Step 1010 can include summing the operational costs over the duration of the optimization period as follows:

$$\text{Cost}_{op} = \sum_{i=1}^{h} \text{Cost}_{op,i}$$

where $\text{Cost}_{op}$ is the operational cost term of the objective function J.

In other embodiments, step 1010 can include calculating the operational cost $\text{Cost}_{op}$ by multiplying the cost array $C_{op}$ by the power consumption array $P_{op}$ and the duration of each time step $\Delta t$ as shown in the following equations:

$$\text{Cost}_{op} = C_{op} P_{op} \Delta t$$

$$\text{Cost}_{op} = [C_{op,1} C_{op,2} \ldots C_{op,h}][P_{op,1} P_{op,2} \ldots P_{op,h}]^T \Delta t$$

where the array $C_{op}$ includes an energy cost value $C_{op,i}$ for a particular time step $i=1 \ldots h$ of the optimization period, the array $P_{op}$ includes a power consumption value $P_{op,i}$ for a particular time step $i=1 \ldots h$ of the optimization period.

Still referring to FIG. 10, process 1000 is shown to include defining a cost of performing maintenance on the building equipment over the optimization period as a function of the estimated reliability (step 1012). Step 1012 can be performed by maintenance cost predictor 920, as described with reference to FIG. 9. Step 1012 can include using the estimated reliability of the building equipment over the duration of the optimization period to determine the probability that the building equipment will require maintenance and/or replacement at each time step of the optimization period. In some embodiments, step 1012 includes comparing the probability that the building equipment will require maintenance at a given time step to a critical value. Step 1012 can include setting the value of $B_{main,i}=1$ in response to a determination that the probability that the building equipment will require maintenance at time step i exceeds the critical value. Similarly, step 1012 can include comparing the probability that the building equipment will require replacement at a given time step to a critical value. Step 1012 can include setting the value of $B_{cap,i}=1$ in response to a determination that the probability that the building equipment will require replacement at time step i exceeds the critical value.

Step 1012 can include determining the costs $C_{main,i}$ associated with performing various types of maintenance on the building equipment. Step 1012 can include receiving a set of maintenance costs from an external system or device (e.g., a database, a user device, etc.). In some embodiments, the maintenance costs define the economic cost (e.g., $) of performing various types of maintenance. Each type of maintenance activity may have a different economic cost associated therewith. For example, the maintenance activity of changing the oil in a chiller compressor may incur a relatively small economic cost, whereas the maintenance activity of completely disassembling the chiller and cleaning all of the chilled water tubes may incur a significantly larger economic cost. Step 1012 can include using the maintenance costs to define the values of $C_{main,i}$ in objective function J.

Step 1012 can include estimating the maintenance cost of the building equipment over the duration of the optimization period. In some embodiments, step 1012 includes calculating the maintenance cost during each time step i using the following equation:

$$\text{Cost}_{main,i} = C_{main,i} B_{main,i}$$

where $C_{main,i}$ is an array of maintenance costs including an element for each of the m different types of maintenance activities that can be performed at time step i and $B_{main,i}$ is an array of binary decision variables indicating whether each of the m maintenance activities will be performed at time step i. Step 1012 can include summing the maintenance costs over the duration of the optimization period as follows:

$$\text{Cost}_{main} = \sum_{i=1}^{h} \text{Cost}_{main,i}$$

where $\text{Cost}_{main}$ is the maintenance cost term of the objective function J.

In other embodiments, step 1012 includes estimating the maintenance cost $\text{Cost}_{main}$ by multiplying the maintenance cost array $C_{main}$ by the matrix of binary decision variables $B_{main}$ as shown in the following equations:

$$\text{Cost}_{main} = C_{main} B_{main}$$

$$\text{Cost}_{main} = [C_{main,1} \quad C_{main,2} \quad \ldots \quad C_{main,m}]$$

$$\begin{bmatrix} B_{main,1,1} & B_{main,1,2} & \ldots & B_{main,1,h} \\ B_{main,2,1} & B_{main,2,2} & \ldots & B_{main,2,h} \\ \vdots & \vdots & \ddots & \vdots \\ B_{main,m,1} & B_{main,m,2} & \ldots & B_{main,m,h} \end{bmatrix}$$

where each element of the array $C_{main}$ includes a maintenance cost value $C_{main,j}$ for a particular maintenance activity $j=1 \ldots m$ and each element of the matrix $B_{main}$ includes a binary decision variable for a particular maintenance activity $j=1 \ldots m$ at a particular time step $i=1 \ldots h$ of the optimization period.

Still referring to FIG. 10, process 1000 is shown to include defining a cost $\text{Cost}_{cap}$ of purchasing or replacing the building equipment over the optimization period as a function of the estimated reliability (step 1014). Step 1014 can be performed by capital cost predictor 930, as described with reference to FIG. 9. In some embodiments, step 1014 includes using the estimated reliability of the building equipment over the duration of the optimization period to determine the probability that new devices of the building equipment will be purchased at each time step of the optimization period. In some embodiments, step 1014 includes comparing the probability that new devices of the building equipment will be purchased at a given time step to a critical value. Step 1014 can include setting the value of $B_{cap,i}=1$ in response to a determination that the probability that the building equipment will be purchased at time step i exceeds the critical value.

Step 1014 can include determining the costs $C_{cap,i}$ associated with various capital purchases (i.e., purchasing one or more new devices of the building equipment). Step 1014 can include receiving a set of capital costs from an external system or device (e.g., a database, a user device, etc.). In some embodiments, the capital costs define the economic cost (e.g., $) of making various capital purchases. Each type of capital purchase may have a different economic cost associated therewith. For example, purchasing a new temperature sensor may incur a relatively small economic cost, whereas purchasing a new chiller may incur a significantly larger economic cost. Step 1014 can include using the purchase costs to define the values of $C_{cap,i}$ in objective function J.

Some capital purchases may be more expensive than other. However, different types of capital purchases may result in different levels of improvement to the efficiency $\eta$ and/or the reliability of the building equipment. For example, purchasing a new sensor to replace an existing sensor may result in a minor improvement in efficiency $\eta$ and/or a minor improvement in reliability, whereas purchasing a new chiller and control system may result in a significantly greater improvement to the efficiency $\eta$ and/or the reliability of the building equipment. Accordingly, multiple different levels of post-purchase efficiency (i.e., $\eta_{cap}$) and post-purchase reliability (i.e., $\text{Reliability}_{cap}$) may exist.

Each level of $\eta_{cap}$ and Reliability$_{cap}$ may correspond to a different type of capital purchase.

Step 1014 can include estimating the capital cost of the building equipment over the duration of the optimization period. In some embodiments, step 1014 includes calculating the capital cost during each time step i using the following equation:

$$\text{Cost}_{cap,i} = C_{cap,i} B_{cap,i}$$

where $C_{cap,i}$ is an array of capital purchase costs including an element for each of the p different capital purchases that can be made at time step i and $B_{cap,i}$ is an array of binary decision variables indicating whether each of the p capital purchases will be made at time step i. Step 1014 can include summing the capital costs over the duration of the optimization period as follows:

$$\text{Cost}_{cap} = \sum_{i=1}^{h} \text{Cost}_{cap,i}$$

where Cost$_{cap}$ is the capital cost term of the objective function J.

In other embodiments, step 1014 includes estimating the capital cost Cost$_{cap}$ by multiplying the capital cost array $C_{cap}$ by the matrix of binary decision variables $B_{cap}$ as shown in the following equations:

$$\text{Cost}_{cap} = C_{cap} B_{cap}$$

$$\text{Cost}_{cap} = [\, C_{cap,1} \quad C_{cap,2} \quad \ldots \quad C_{cap,p} \,] \begin{bmatrix} B_{cap,1,1} & B_{cap,1,2} & \ldots & B_{cap,1,h} \\ B_{cap,2,1} & B_{cap,2,2} & \ldots & B_{cap,2,h} \\ \vdots & \vdots & \ddots & \vdots \\ B_{cap,p,1} & B_{cap,p,2} & \ldots & B_{cap,p,h} \end{bmatrix}$$

where each element of the array $C_{cap}$ includes a capital cost value $C_{cap,k}$ for a particular capital purchase k=1 . . . p and each element of the matrix $B_{cap}$ includes a binary decision variable for a particular capital purchase k=1 . . . p at a particular time step i=1 . . . h of the optimization period.

Still referring to FIG. 10, process 1000 is shown to include optimizing an objective function including the costs Cost$_{op}$, Cost$_{main}$, and Cost$_{cap}$ to determine an optimal maintenance strategy for the building equipment (step 1016). Step 1016 can include generating the objective function J by summing the operational cost term, the maintenance cost term, and the capital cost term formulated in steps 1010-1014. One example of an objective function which can be generated in step 1016 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} B_{cap,i}$$

where $C_{op,i}$ is the cost per unit of energy (e.g., \$/kWh) consumed by connected equipment 610 at time step i of the optimization period, $P_{op,i}$ is the power consumption (e.g., kW) of connected equipment 610 at time step i, $\Delta t$ is the duration of each time step i, $C_{main,i}$ is the cost of maintenance performed on connected equipment 610 at time step i, $B_{main,i}$ is a binary variable that indicates whether maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

Another example of an objective function which can be generated in step 1016 is shown in the following equation:

$$J = C_{op} P_{op} \Delta t + C_{main} B_{main} + C_{cap} B_{cap}$$

$$J = [\, C_{op,1} \quad C_{op,2} \quad \ldots \quad C_{op,h} \,][\, P_{op,1} \quad P_{op,2} \quad \ldots \quad P_{op,h} \,]^T \Delta t +$$

$$[\, C_{main,1} \quad C_{main,2} \quad \ldots \quad C_{main,m} \,] \begin{bmatrix} B_{main,1,1} & B_{main,1,2} & \ldots & B_{main,1,h} \\ B_{main,2,1} & B_{main,2,2} & \ldots & B_{main,2,h} \\ \vdots & \vdots & \ddots & \vdots \\ B_{main,m,1} & B_{main,m,2} & \ldots & B_{main,m,h} \end{bmatrix} +$$

$$[\, C_{cap,1} \quad C_{cap,2} \quad \ldots \quad C_{cap,p} \,] \begin{bmatrix} B_{cap,1,1} & B_{cap,1,2} & \ldots & B_{cap,1,h} \\ B_{cap,2,1} & B_{cap,2,2} & \ldots & B_{cap,2,h} \\ \vdots & \vdots & \ddots & \vdots \\ B_{cap,p,1} & B_{cap,p,2} & \ldots & B_{cap,p,h} \end{bmatrix}$$

where the array $C_{op}$ includes an energy cost value $C_{op,i}$ for a particular time step i=1 . . . h of the optimization period, the array $P_{op}$ includes a power consumption value $P_{op,i}$ for a particular time step i=1 . . . h of the optimization period, each element of the array $C_{main}$ includes a maintenance cost value $C_{main,j}$ for a particular maintenance activity j=1 . . . m, each element of the matrix $B_{main}$ includes a binary decision variable for a particular maintenance activity j=1 . . . m at a particular time step i=1 . . . h of the optimization period, each element of the array $C_{cap}$ includes a capital cost value $C_{cap,k}$ for a particular capital purchase k=1 . . . p, and each element of the matrix $B_{cap}$ includes a binary decision variable for a particular capital purchase k=1 . . . p at a particular time step i=1 . . . h of the optimization period.

Step 1016 can include imposing constraints on one or more variables or parameters in the objective function J. The constraints can include any of the equations or relationships described with reference to operational cost predictor 910, maintenance cost predictor 920, and capital cost predictor 930. For example, step 1016 can include imposing a constraint which defines the power consumption values $P_{op,i}$ for one or more devices of the building equipment as a function of the ideal power consumption $P_{ideal,i}$ and the efficiency $\eta_i$ (e.g., $P_{op,i} = P_{ideal,i}/\eta_i$). Step 1016 can include imposing a constraint which defines the efficiency $\eta_i$ as a function of the binary decision variables $B_{main,i}$ and $B_{cap,i}$, as described with reference to efficiency updater 911 and efficiency degrader 913. Step 1016 can include imposing a constraint which constrains the binary decision variables $B_{main,i}$ and $B_{cap,i}$ to a value of either zero or one and defines the binary decision variables $B_{main,i}$ and $B_{cap,i}$ as a function of the reliability Reliability$_i$ of connected equipment 610, as described with reference to maintenance estimator 922 and purchase estimator 932. Step 1016 can include imposing a constraint which defines the reliability Reliability$_i$ of connected equipment 610 as a function of the equipment performance information (e.g., operating conditions, run hours, etc.) as described with reference to reliability estimators 924 and 934.

Step 1016 can include optimizing the objective function J to determine the optimal values of the binary decision variables $B_{main,i}$ and $B_{cap,i}$ over the duration of the optimization period. Step 1016 can include using any of a variety of optimization techniques to formulate and optimize the objective function J. For example, step 1016 can include using integer programming, mixed integer linear programming, stochastic optimization, convex programming, dynamic programming, or any other optimization technique to formulate the objective function J, define the constraints, and perform the optimization. These and other optimization techniques are known in the art and will not be described in detail here.

In some embodiments, step 1016 includes using mixed integer stochastic optimization to optimize the objective function J. In mixed integer stochastic optimization, some of the variables in the objective function J can be defined as functions of random variables or probabilistic variables. For example, the decision variables $B_{main,i}$ and $B_{cap,i}$ can be defined as binary variables that have probabilistic values based on the reliability of the building equipment. Low reliability values may increase the probability that the binary decision variables $B_{main,i}$ and $B_{cap,i}$ will have a value of one (e.g., $B_{main,i}=1$ and $B_{cap,i}=1$), whereas high reliability values may increase the probability that the binary decision variables $B_{main,i}$ and $B_{cap,i}$ will have a value of zero (e.g., $B_{main,i}=0$ and $B_{cap,i}=0$). In some embodiments, step 1016 includes using a mixed integer stochastic technique to define the values of the binary decision variables $B_{main,i}$ and $B_{cap,i}$ as a probabilistic function of the reliability of the building equipment.

As discussed above, the objective function J may represent the predicted cost of operating, maintaining, and purchasing one or more devices of the building equipment over the duration of the optimization period. In some embodiments, step 1016 includes projecting these costs back to a particular point in time (e.g., the current time) to determine the net present value (NPV) of the one or more devices of the building equipment at a particular point in time. For example, step 1016 can include projecting each of the costs in objective function J back to the current time using the following equation:

$$NPV_{cost} = \sum_{i=1}^{h} \frac{\text{Cost}_i}{(1+r)^i}$$

where r is the interest rate, $\text{Cost}_i$ is the cost incurred during time step i of the optimization period, and $NPV_{cost}$ is the net present value (i.e., the present cost) of the total costs incurred over the duration of the optimization period. In some embodiments, step 1016 includes optimizing the net present value $NPV_{cost}$ to determine the NPV of the building equipment at a particular point in time.

As discussed above, one or more variables or parameters in the objective function J can be updated dynamically based on closed-loop feedback from the building equipment. For example, the equipment performance information received from the building equipment can be used to update the reliability and/or the efficiency of the building equipment. Step 1016 can include optimizing the objective function J periodically (e.g., once per day, once per week, once per month, etc.) to dynamically update the predicted cost and/or the net present value $NPV_{cost}$ based on the closed-loop feedback from the building equipment.

In some embodiments, step 1016 include generating optimization results. The optimization results may include the optimal values of the decision variables in the objective function J for each time step i in the optimization period. The optimization results include operating decisions, equipment maintenance decisions, and/or equipment purchase decisions for each device of the building equipment. In some embodiments, the optimization results optimize the economic value of operating, maintaining, and purchasing the building equipment over the duration of the optimization period. In some embodiments, the optimization results optimize the net present value of one or more devices of the building equipment at a particular point in time. The optimization results may cause BMS 606 to activate, deactivate, or adjust a setpoint for the building equipment in order to achieve the optimal values of the decision variables specified in the optimization results.

In some embodiments, process 1000 includes using the optimization results to generate equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of the building equipment may indicate that maintenance should be performed on that device at the 25$^{th}$ time step of the optimization period, whereas a value of $B_{main,25}=0$ may indicate that the maintenance should not be performed at that time step. Similarly, a value of $B_{cap,25}=1$ may indicate that a new device of the building equipment should be purchased at the 25$^{th}$ time step of the optimization period, whereas a value of $B_{cap,25}=0$ may indicate that the new device should not be purchased at that time step.

In some embodiments, the equipment purchase and maintenance recommendations are provided to building 10 (e.g., to BMS 606) and/or to client devices 448. An operator or building owner can use the equipment purchase and maintenance recommendations to assess the costs and benefits of performing maintenance and purchasing new devices. In some embodiments, the equipment purchase and maintenance recommendations are provided to service technicians 620. Service technicians 620 can use the equipment purchase and maintenance recommendations to determine when customers should be contacted to perform service or replace equipment.

Still referring to FIG. 10, process 1000 is shown to include updating the efficiency and the reliability of the building equipment based on the optimal maintenance strategy (step 1018). In some embodiments, step 1018 includes updating the efficiency $\eta_i$ for one or more time steps during the optimization period to account for increases in the efficiency $\eta$ of the building equipment that will result from performing maintenance on the building equipment or purchasing new equipment to replace or supplement one or more devices of the building equipment. The time steps i at which the efficiency $\eta_i$ is updated may correspond to the predicted time steps at which the maintenance will be performed or the equipment will replaced. The predicted time steps at which maintenance will be performed on the building equipment may be defined by the values of the binary decision variables $B_{main,i}$ in the objective function J. Similarly, the predicted time steps at which the building equipment will be replaced may be defined by the values of the binary decision variables $B_{cap,i}$ in the objective function J.

Step 1018 can include resetting the efficiency $\eta_i$ for a given time step i if the binary decision variables $B_{main,i}$ and $B_{cap,i}$ indicate that maintenance will be performed at that time step and/or new equipment will be purchased at that time step (i.e., $B_{main,i}=1$ and/or $B_{cap,i}=1$). For example, if $B_{main,i}=1$, step 1018 can include resetting the value of $\eta_i$ to $\eta_{main}$, where $\eta_{main}$ is the efficiency value that is expected to result from the maintenance performed at time step i. Similarly, if $B_{cap,i}=1$, step 1018 can include resetting the value of $\eta_i$ to $\eta_{cap}$, where $\eta_{cap}$ is the efficiency value that is expected to result from purchasing a new device to supplement or replace one or more devices of the building equipment performed at time step i. Step 1018 can include resetting the efficiency $\eta_i$ for one or more time steps while the optimization is being performed (e.g., with each iteration of the optimization) based on the values of binary decision variables $B_{main,i}$ and $B_{cap,i}$.

Step 1018 may include determining the amount of time $\Delta t_{main,i}$ that has elapsed since maintenance was last performed on the building equipment based on the values of the binary decision variables $B_{main,i}$. For each time step i, step 1018 can examine the corresponding values of $B_{main}$ at time step i and each previous time step (e.g., time steps i−1, i−2, ..., 1. Step 1018 can include calculating the value of $\Delta t_{main,i}$ by subtracting the time at which maintenance was last performed (i.e., the most recent time at which $B_{main,i}=1$) from the time associated with time step i. A long amount of time $\Delta t_{main,i}$ since maintenance was last performed may result in a lower reliability, whereas a short amount of time since maintenance was last performed may result in a higher reliability.

Similarly, step 1018 may include determining the amount of time $\Delta t_{cap,i}$ that has elapsed since the building equipment were purchased or installed based on the values of the binary decision variables $B_{cap,i}$. For each time step i, step 1018 can examine the corresponding values of $B_{cap}$ at time step i and each previous time step (e.g., time steps i−1, i−2, ..., 1. Step 1018 can include calculating the value of $\Delta t_{cap,i}$ by subtracting the time at which the building equipment were purchased or installed (i.e., the most recent time at which $B_{cap,i}=1$) from the time associated with time step i. A long amount of time $\Delta t_{cap,i}$ since the building equipment were purchased or installed may result in a lower reliability, whereas a short amount of time since the building equipment were purchased or installed may result in a higher reliability Some maintenance activities may be more expensive than other. However, different types of maintenance activities may result in different levels of improvement to the efficiency $\eta$ and/or the reliability of the building equipment. For example, merely changing the oil in a chiller may result in a minor improvement in efficiency $\eta$ and/or a minor improvement in reliability, whereas completely disassembling the chiller and cleaning all of the chilled water tubes may result in a significantly greater improvement to the efficiency $\eta$ and/or the reliability of the building equipment. Accordingly, multiple different levels of post-maintenance efficiency (i.e., $\eta_{main}$) and post-maintenance reliability (i.e., Reliability$_{main}$) may exist. Each level of $\eta_{main}$ and Reliability$_{main}$ may correspond to a different type of maintenance activity.

In some embodiments, step 1018 includes identifying the maintenance activity associated with each binary decision variable $B_{main,j,i}$ and resets the efficiency $\eta$ to the corresponding post-maintenance efficiency level $\eta_{main,j}$ if $B_{main,j,i}=1$. Similarly, step 1018 may include identifying the maintenance activity associated with each binary decision variable $B_{main,j,i}$ and can reset the reliability to the corresponding post-maintenance reliability level Reliability$_{main,j}$ if $B_{main,j,i}=1$.

Some capital purchases may be more expensive than other. However, different types of capital purchases may result in different levels of improvement to the efficiency $\eta$ and/or the reliability of the building equipment. For example, purchasing a new sensor to replace an existing sensor may result in a minor improvement in efficiency $\eta$ and/or a minor improvement in reliability, whereas purchasing a new chiller and control system may result in a significantly greater improvement to the efficiency $\eta$ and/or the reliability of the building equipment. Accordingly, multiple different levels of post-purchase efficiency (i.e., $\eta_{cap}$) and post-purchase reliability (i.e., Reliability$_{cap}$) may exist. Each level of $\eta_{cap}$ and Reliability$_{cap}$ may correspond to a different type of capital purchase.

In some embodiments, step 1018 includes identifying the capital purchase associated with each binary decision variable $B_{main,k,i}$ and resetting the efficiency $\eta$ to the corresponding post-purchase efficiency level $\eta_{cap,k}$ if $B_{cap,k,i}=1$. Similarly, step 1018 may include identifying the capital purchase associated with each binary decision variable $B_{cap,k,i}$ and can resetting the reliability to the corresponding post-purchase reliability level Reliability$_{cap,k}$ if $B_{main,k,i}=1$.

Performing Maintenance as Soon as Economically Viable Overview

Referring generally to FIGS. 11-15, systems and methods for performing maintenance and/or replacement of building equipment as soon as economically viable are shown, according to some embodiments. As described herein, economic viability of performing maintenance/replacement may exist if an estimated cost of performing maintenance on the building equipment and/or replacing the building equipment is offset (i.e., paid back) by a reduction in operational cost incurred over a predetermined payback period within a life cycle horizon. Accordingly, the earliest time at which performing maintenance and/or replacement of building equipment is economically viable can refer to a time at which an estimated cost of (A) performing maintenance/replacement at the beginning of a payback period and then operating the building equipment over the duration of the payback period is less than or equal to (B) an estimated cost of strictly operating the building equipment over the payback period without performing maintenance/replacement. As such, economic viability can indicate a situation where performing maintenance/replacement is not economically disadvantageous in comparison to not performing the maintenance/replacement.

Performing maintenance/replacement if/when economically viable results in several advantages. For example, the total cost incurred by a building owner who bears the cost of operating, performing maintenance, and replacing the equipment will be less than or equal to the cost of not performing maintenance/replacement at the end of the payback period. Performing maintenance/replacement as soon as economically viable also results in more efficient equipment operation, reduced energy consumption/costs, and improved equipment reliability. The environmental impact of reduced energy consumption is another advantage. Additionally, shifting the cost incurred by the building owner from energy consumption (i.e., operational cost) to maintenance/replacement costs results in economic gains for maintenance/replacement providers at no additional cost to the building owner over continuing normal operation of existing building equipment.

Over time, degradation of building equipment (e.g., as measured by reductions in efficiency and/or reliability) can result in additional operational costs over a life cycle horizon (which can include one or more payback periods). As building equipment degrades, the building equipment may consume more electrical power, have less impact in environmental conditions of a building (e.g., building 10), etc. As such, as building equipment degrades, costs for an entity (e.g., a customer, a building owner, etc.) managing the building equipment may increase as well. By performing maintenance/replacement at points of economic viability, the entity can receive new and/or updated building equipment at no additional cost as compared to continuing operation with existing building equipment without maintenance/replacement being performed. Further, performing maintenance/replacement at points of economic viability can result in additional business for a provider of maintenance and/or replacement services. Further yet, performing maintenance/replacement at economically viable points can reduce overall resource consumption of the building as new and/or recently repaired building equipment may consume fewer resources than building equipment in a high state of degradation.

In some embodiments, economic viability regarding maintenance/replacement of building equipment is determined based on a comparison performed between calculations (e.g., optimizations) of scenarios where maintenance/replacement is and is not immediately performed. Said comparison can illustrate whether immediately performing maintenance/replacement and/or performing maintenance/replacement at a time step k is economically advantageous for an entity over a payback period. Determination of economic viability is described in greater detail below with reference to FIGS. 11-15.

Systems for Performing Maintenance as Soon as Economically Viable

Figure 11:
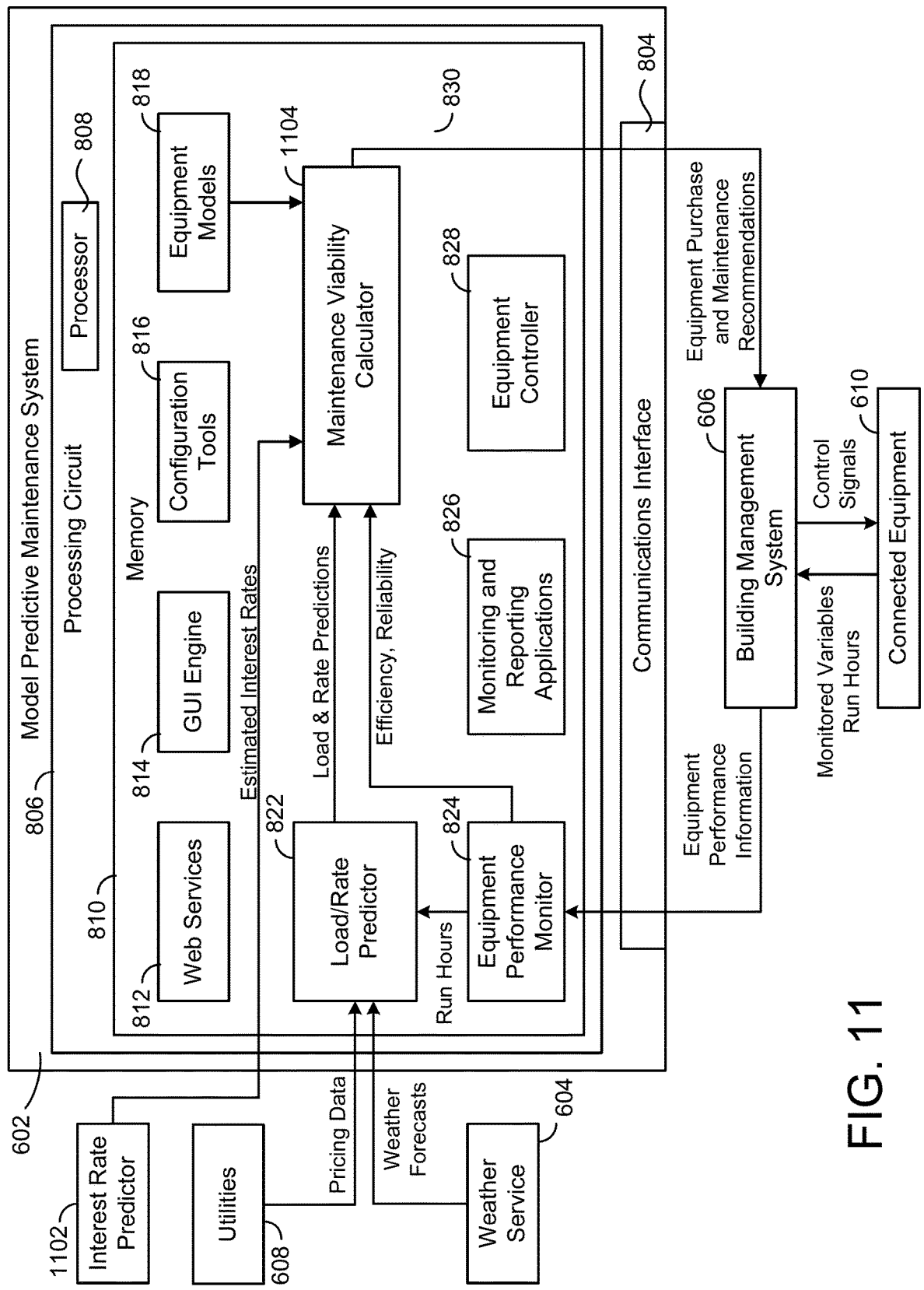
FIG. 11 is a block diagram of the MPM system of FIG. 8 including a maintenance viability generator, according to some embodiments.

Referring now to FIG. 11, MPM system 602 of FIG. 8 is shown in greater detail, according to some embodiments. In some embodiments, MPM system 602 is used to generate equipment purchase and maintenance recommendations (e.g., as defined by a maintenance and replacement strategy) that are determined such that maintenance/replacement of building equipment (e.g., connected equipment 610) is performed as soon as is economically viable for BMS 606. In some embodiments, model predictive maintenance system 602 is a component of BMS 606. In other embodiments, model predictive maintenance system 602 is a component of a remote computing system or cloud-based computing system configured to receive and process data from one or more building management systems via a network. In other embodiments, MPM system 602 is a component of a subsystem level controller (e.g., a HVAC controller), a subplant controller, a device controller (e.g., AHU controller 330, a chiller controller, etc.), a different type of controller, a field controller, a computer workstation, a client device, or any other system or device that receives and processes monitored variables from connected equipment 610.

MPM system 602 is shown to include a maintenance viability calculator 1104. In some embodiments, maintenance viability calculator 1104 is similar to high level optimizer 832 as described with reference to FIG. 8. Maintenance viability calculator 1104 is shown to receive estimated interest rates from an interest rate predictor 1102. Interest rate predictor 1102 may be any type of system/service that can provide estimated interest rates. For example, interest rate predictor 1102 may be an online website, a mobile application, a financial institution, a person manually entering estimated interest rates, etc. The estimated interest rates can be used by maintenance viability calculator 1104 to determine a future value of costs (e.g., $) for determining economic viability of maintenance/replacement decisions. For example, the estimated interest rates can account for inflation that can reduce a value of money over time. If not accounted for, the inflation can result in inaccurate decisions regarding economic viability as a future value of money may not be the same as a present value of money. Interest rates and a time value of money is described in U.S. patent Ser. No. 10/359,748 granted Jul. 23, 2019 and U.S. patent application Ser. No. 16/518,548 filed Jul. 22, 2019, the entire disclosures of which are incorporated by reference herein. In some embodiments, interest rate predictor 1102 is a component of memory 810 of MPM system 602.

In some embodiments, the estimated interest rates provided by interest rate predictor 1102 are time varying. If the estimated interest rates are time varying, an amount of value lost or gained over a first payback period may be different than the amount lost or gained over a second payback period. The time varying nature of interest rates can be particularly helpful for maintenance viability calculator 1104 in determining economic viability, as a change in the value of money may not be constant over time.

Based on the estimated interest rates, maintenance viability calculator 1104 can determine at what point (if any) performing a maintenance/replacement activity becomes economically viable for a customer (e.g., BMS 606) as compared to not performing any maintenance/replacement on the existing building equipment. To determine if maintenance/replacement is economically viable, maintenance viability calculator 1104 can generate two scenarios for operating, maintaining, and replacing the building equipment over a payback period starting at a time step k of a payback period. As described above, a first scenario can include performing maintenance/replacement at time step k and operating the building equipment for the duration of the payback period, whereas a second scenario may not include performing maintenance/replacement and only involves operating the building equipment over the duration of the payback period. If economic viability is identified (i.e., a total cost of the first scenario is identified as less than or equal to a total cost of the second scenario), maintenance/replacement can be scheduled to be performed at time step k. If, however, maintenance/replacement is not economically viable, maintenance viability calculator 1104 can advance to time step k+1 and repeat the scenario comparison with the payback period shifted forward in time by one time step. Said process of advancing forward one time step and performing the scenario comparison can be repeated by maintenance viability calculator 1104 until economic viability is identified (or until an end of the life cycle horizon). By shifting forward enough time steps, operational costs may continue to increase over time due to further degradation of building equipment until operational costs become high enough that maintenance/replacement is economically viable. Identification of economic viability by maintenance viability calculator 1104 is described in greater detail below with reference to FIGS. 12 and 15.

In some embodiments, maintenance viability calculator 1104 includes some and/or all of the functionality of model predictive optimizer 830. In particular, maintenance viability calculator 1104 can include some and/or all of the functionality of high level optimizer 832 and/or low level optimizer 834. In this way, maintenance viability calculator 1104 can generate an objective function and calculate a solution to the objective function where maintenance/replacement is performed when/if economically viable for a customer. As described above, maintenance viability calculator 1104 can perform a scenario comparison of solutions to the objective function to determine an earliest point when maintenance/replacement can be performed. In some embodiments, calculating the solution to the objective function, as performed by maintenance viability calculator 1104, is considered a type of optimization such that an "optimal"

solution can be defined as a solution that results in maintenance/replacement being performed at an earliest or nearly earliest economically viable point.

It should be noted, however, that optimizations of the objective function are described herein for purposes of example of a calculation of the objective function. Maintenance viability calculator 1104 can perform any calculations to determine a solution to the objective function. In some embodiments, the calculations performed by maintenance viability calculator 1104 can be considered a heuristic optimization procedure such that a solution to the objective function may or may not be an ideal solution (i.e., a solution that results in a lowest possible cost). In other words, optimizations and/or other calculations of the objective function performed by maintenance viability calculator 1104 may not require that an ideal solution to the objective function be generated. Rather, optimizations and/or other calculations performed by maintenance viability calculator 1104 may result in generation of a solution that may or may not be ideal. In some embodiments, calculations performed by maintenance viability calculator 1104 include operations such as summing all costs resulting from a set of predefined operating decisions and maintenance/replacement decisions. In this case, operating decisions and maintenance/replacement decisions can be predefined for particular scenarios and maintenance viability calculator 1104 can determine which scenario results in economic viability of maintenance/replacement at an earliest time.

Maintenance viability calculator 1104 can initiate an automated action to perform maintenance/replacement on the building equipment during the payback period in accordance with operating decisions and maintenance decisions defined by results of an optimization (or other calculation) and/or predefined for particular scenarios. The automated action can result in MPM system 602 performing various operations to have maintenance/replacement performed on the building equipment. For example, the automated action can include generating equipment purchase and maintenance recommendations (i.e., the maintenance and replacement strategy), automatically scheduling maintenance/replacement, etc. The equipment purchase and maintenance recommendations can define when/if BMS 606 should schedule maintenance/replacement of building equipment (e.g., connected equipment 610). Advantageously, the automated action can ensure maintenance/replacement is automatically performed and can reduce and/or eliminate user actions, thereby improving efficiency of a building. Likewise, the automated actions can ensure users do not accidentally and/or purposefully skip maintenance/replacement activities which may jeopardize costs. In this way, BMS 606 can have maintenance/replacement scheduled to occur if/when economically viable, thereby reducing costs for BMS 606 while providing additional business to a provider of maintenance and/or replacement services. The building equipment can also be operated based on results of the optimization and/or predefined decisions for the scenarios. Maintenance viability calculator 1104 is described in greater detail below with reference to FIG. 12.

Figure 12:
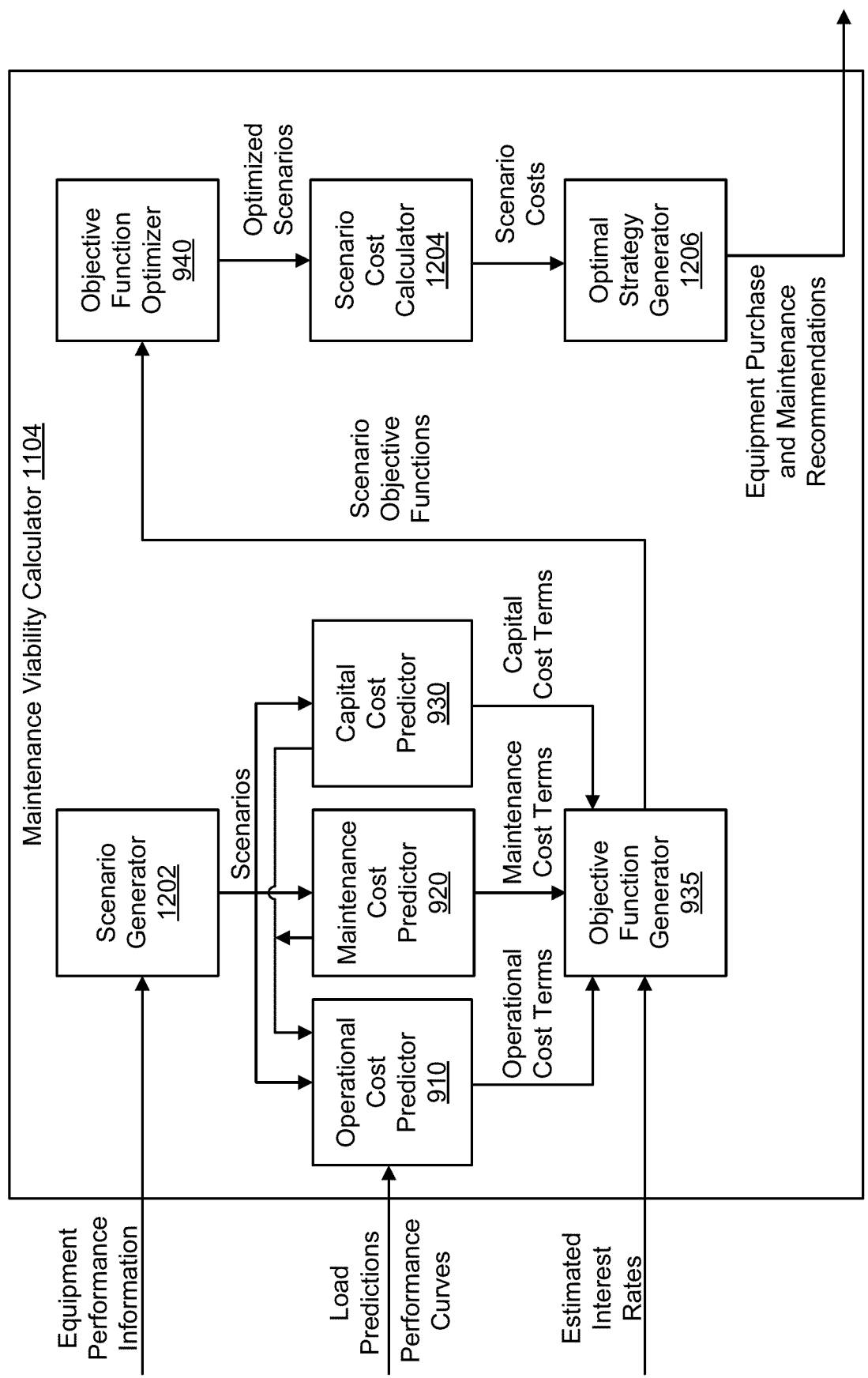
FIG. 12 is a block diagram of the maintenance viability calculator of FIG. 11 in greater detail, according to some embodiments.

Referring now to FIG. 12, maintenance viability calculator 1104 of FIG. 11 is shown in greater detail, according to some embodiments. As described above with reference to FIG. 11, maintenance viability calculator 1104 can include some and/or all of the functionality of high level optimizer 832 and/or low level optimizer 834. As such, maintenance viability calculator 1104 is shown to include operational cost predictor 910, maintenance cost predictor 920, capital cost predictor 930, objective function generator 935, and objective function optimizer 940, each of which is described in greater detail above with reference to FIG. 9. In some embodiments, one or more components of maintenance viability calculator 1104 are part of a single component. However, each component of maintenance viability calculator 1104 is shown individually for ease of explanation.

Maintenance viability calculator 1104 is shown to include a scenario generator 1202. Scenario generator 1202 can be configured to generate scenarios used to determine a maintenance and replacement strategy for building equipment that is economically viable for an entity associated with the building equipment. Scenario generator 1202 is shown to receive equipment performance information. The equipment performance information can be communicated to predictors 910-930 via the scenarios generated by scenario generator 1202. In some embodiments, the equipment performance information is provided directly to predictors 910-930.

The scenarios generated by scenario generator 1202 can represent different strategies in which the building equipment can be operated, maintained, and replaced. In some embodiments, a first scenario generated by scenario generator 1202 illustrates a strategy where maintenance/replacement of building equipment is performed at a time step k at the beginning of a payback period within a life cycle horizon and is then operated over a duration of the payback period. By performing maintenance/replacement time step k (e.g., immediately), an initial cost is incurred at the start of the payback period. Advantageously, performing maintenance/replacement of the building equipment immediately can reduce operational costs over the duration of the payback period as a degradation state of the building equipment can be improved (e.g., lowered). A second scenario generated by scenario generator 1202 can illustrate a strategy where maintenance/replacement is not immediately performed on the building equipment at time step k, and the building equipment is instead operated normally over the payback period. In the second scenario, the initial cost of maintenance/replacement is not incurred, however, operational costs over the payback period may be higher as the building equipment may operate at a higher state of degradation.

In some embodiments, scenario generator 1202 predefines certain decisions (e.g., maintenance decisions, replacement decisions, operating decisions) for the generated scenarios. In this case, the scenarios may be compared by other components of maintenance viability calculator 1104 to determine which scenario results in economic viability at an earliest time. However, if decisions are generated (defined) by performing optimizations (or other types of calculations), scenario generator 1202 may skip predefining decisions for the scenarios.

Scenario generator 1202 can provide the generated scenarios to predictors 910-930. Based on the generated scenarios, each of predictors 910-930 can generate a cost term related to each of the generated scenarios. In particular, operational cost predictor 910 can generate operational cost terms for the first and second scenario, maintenance cost predictor 920 can generate maintenance cost terms for the first and second scenario, and capital cost predictor 930 can generate capital cost terms for the first and second scenario. In this way, objective function generator 935 can generate objective functions for each scenario for optimization (or other calculation).

In addition to each of the cost terms received from operational cost predictor 910, maintenance cost predictor 920, and capital cost predictor 930, objective function generator 935 is also shown to receive estimated interest rates. As described in greater detail above with reference to FIG. 11, the estimated interest rates can be used to account for how a value of costs change over time. The estimated interest rates can be applied by objective function generator 935 to each of the cost terms in the objective function for each scenario such that a cost related to each activity (e.g., maintenance, replacement, or operation of building equipment) is adjusted over time based on the estimated interest rates. For example, the objective function J generated by objective function generator 935 and adjusted to account for estimated interest rates can be represented by the following:

$$J = \sum_{i=1}^{h} r_i(C_{op,i}P_{op,i}\Delta t) + \sum_{i=1}^{h} r_i(C_{main,i}B_{main,i}) + \sum_{i=1}^{h} r_i(C_{cap,i}B_{cap,i})$$

where $r_i$ is an interest rate at a time step i of a payback period where $r_i>0$, $C_{op,i}$ is the cost per unit of energy (e.g., $/kWh) consumed by building equipment (e.g., connected equipment 610) at time step i of the payback period, $P_{op,i}$ is the power consumption (e.g., kW) of the building equipment at time step i, $\Delta t$ is the duration of each time step i, $C_{main,i}$ is the cost of maintenance performed on the building equipment at time step i, $B_{main,i}$ is a binary variable that indicates whether the maintenance is performed, $C_{cap,i}$ is the capital cost of purchasing a new device of the building equipment at time step i, $B_{cap,i}$ is a binary variable that indicates whether the new device is purchased, and h is a duration of the payback period. In general, $r_i=1.0$ can indicate a value of money (or some other measure of cost) is the same at time step i as compared to a current time, $0<r_i<1.0$ can indicate that the value of money is lower at time step i as compared to the current time, and $r_i>1.0$ can indicate that the value of money is higher at time step i as compared to the current time.

Objective function generator 935 can provide the objective functions (e.g., the objective function J) for each scenario to objective function optimizer 940. Based on the objective functions, objective function optimizer 940 can perform a calculation (e.g., optimization) process to identify values of decision variables for each scenario. The decision variables can indicate when/how to operate, maintain, and replace the building equipment over the payback period. Objective function optimizer 940 can calculate solutions for each objective function separately to generate two sets of results. In terms of the first scenario, objective function optimizer 940 can determine a solution that includes maintenance/replacement being performed at time step k. In terms of the second scenario, objective function optimizer 940 can determine a solution that does not include maintenance/replacement occurring during the payback period and strictly includes operation of the building equipment.

In some embodiments, objective function optimizer 940 specifically determines operational costs for operating the building equipment based on usages of the building equipment (i.e., operating states) during a time period, utility rates, and a power consumption model. The usages may be determined by performing some analysis on historical data and/or can be generated by performing an asset allocation optimization that identifies optimal operating states for the building equipment. The operating states for the building equipment can be used in defining operating costs for the building equipment under each scenario. In some embodiments, multiple optimizations and/or analyses are performed such that an independent optimization/analysis is performed for each scenario to generate operating decisions for the building equipment. However, a single optimization/analysis can be performed for all scenarios such that operating states for the building equipment can be defined for all scenarios. In this case, operating costs can be determined for specific scenarios by applying (e.g., multiplying, dividing, etc. as dependent on implementation) efficiency values of the building equipment to the operating states.

Objective function optimizer 940 can provide results of each calculation (i.e., the optimized scenarios shown in FIG. 12) to a scenario cost calculator 1204. It should be noted that, if decisions are predefined (e.g., by scenario generator 1202), objective function generator 935 may instead provide the scenario objective functions directly to scenario cost generator 1204. In this case, objective function optimizer 940 may or may not be utilized/included in maintenance viability calculator 1104. Specifically, if decisions are predefined, objective function optimizer 940 may not be needed to generate decisions (e.g., operating decisions, maintenance/replacement decisions) by performing an optimization (or other calculation) as they are already predefined. If decision variables are predefined for scenarios, a cost of the scenarios can be directly computed.

Based on the received scenarios, scenario cost calculator 1204 can calculate a total cost associated with the first and second scenarios. In some embodiments, the total cost of each scenario is defined as a total of operational, maintenance, and capital costs during the payback period for the particular scenario. Scenario cost calculator 1204 can determine the total cost of a scenario by multiplying each decision variable (e.g., as predefined by scenario generator 1202 or as generated by objective function optimizer 94) at each time step by an associated cost with performing the respective activity (e.g., maintenance, operational, or capital activity) at a given time step. In some embodiments, total costs of each scenario are directly indicated by the scenarios provided by objective function optimizer 940.

Scenario cost calculator 1204 can provide the total costs of each scenario to an optimal strategy generator 1206. Based on the total costs of each scenario, optimal strategy generator 1206 can generate a maintenance and replacement strategy for building equipment (i.e., indicated by equipment purchase and maintenance recommendations). Optimal strategy generator 1206 can determine which of the scenarios optimized by objective function optimizer 940 or predefined by scenario generator 1202 is optimal for an entity (e.g., a customer).

In some embodiments, optimal strategy generator 1206 initiates an automated action(s) as described in greater detail above with reference to FIG. 11. In this sense, optimal strategy generator 1206 can determine an optimal scenario and initiate the automated actions based on the optimal scenario. For example, optimal strategy generator 1206 can generate the maintenance and replacement strategy based on the optimal scenario and can automatically schedule maintenance/replacement activities to be performed in accordance with the maintenance and replacement strategy. In some embodiments, optimal strategy generator 1206 can delegate other components of MPM system 602 to perform actions to ensure maintenance/replacement is performed for the building equipment.

To determine an optimal scenario, optimal strategy generator 1206 can compare the scenario costs provided by scenario cost calculator 1204 to determine if the total cost of the first scenario (i.e., the scenario where maintenance/replacement of building equipment is immediately performed) is less than or equal to a total cost of the second scenario (i.e., the scenario where maintenance/replacement is not performed and the building equipment is only operated over the payback period). If the total cost of the first scenario is less than or equal to the total cost of the second scenario, the first scenario may be economically viable. In this case, optimal strategy generator 1206 can generate a maintenance and replacement strategy for the building equipment that indicates maintenance/replacement of the building equipment should occur immediately at time step k of the payback period where k is a current time step. Alternatively, if the total cost of the first scenario is greater than the total cost of the second scenario, optimal strategy generator 1206 may generate the maintenance and replacement strategy based on the second scenario. In other words, the maintenance and replacement strategy can be generated such that maintenance/replacement of the building equipment is not immediately performed and the building equipment is operated as determined by objective function optimizer 940 or as predefined by scenario generator 1202.

If optimal strategy generator 1206 determines that the second scenario is the optimal scenario, maintenance viability calculator 1104 can repeat the scenario comparison for a next time step of the payback period. In particular, maintenance viability calculator 1104 can perform the computation process one time step into the future (i.e., at time step k+1). At time step k+1, new objective functions for each scenario can be generated, optimized (if decisions are not predefined), and compared to determine if performing maintenance/replacement of the building equipment immediately at time step k+1 is economically viable. If so, the maintenance and replacement strategy can be generated such that maintenance/replacement is immediately performed at time step k+1. If not, the scenario comparison can be performed again at time step at time step k+2 and so on.

Maintenance viability calculator 1104 can continue repeating the scenario comparison for each time step into the future until performing the maintenance/replacement is determined to be economically viable. As time progresses, the degradation state of the building equipment may continue to increase, thereby resulting in higher operational costs estimated at each time step if no maintenance/replacement is performed. As such, at some time step k+n where n≥0, maintenance/replacement of the building equipment may be determined to be economically viable due to a degradation state of the building equipment resulting in high operational costs that exceed a cost of performing maintenance/replacement on and operating the building equipment.

In some embodiments, maintenance viability calculator 1104 continues to step forward in time by one time step until the end of a life cycle horizon. For example, consider a situation where the end of the life cycle horizon is Jan. 1, 2022, and the payback period is set to 2 years. Past Jan. 1, 2020, the payback period may begin to inherently shorten as the payback period cannot extend beyond the end of the life cycle horizon. For example, on Jan. 1, 2021, the payback period may be reduced to 1 year as to not extend beyond Jan. 1, 2022. In this way, the payback period may shorten if an amount of time between a current time step and the end of the payback period is greater than an amount of time between the current time step and the end of the life cycle horizon. The life cycle horizon can be utilized to put an end to optimizations performed by MPM system 602. Ending optimizations (at least in a current form) may be due to various situations such as, for example, a contract between MPM system 602 and BMS 606 expiring, known inaccuracies in predictions after operating MPM system 602 for a certain amount of time, etc. For example, if the life cycle horizon is defined to be thirty years starting at a particular date, the end of the 30 years may define a time when a contract with MPM system 602 is finished such that MPM system 602 is disabled unless the contract is renewed. It should be appreciated that the life cycle horizon may not be required for MPM system 602 to function properly. For example, once installed, MPM system 602 may run indefinitely until an external influence disables MPM system 602 (e.g., a building owner shuts down their building). If the life cycle horizon is not considered, the payback period may not be inherently shortened due to an approaching date.

A solution determined based on the scenario comparison may be dependent on a length of the payback period selected. As the length of the payback period increases, maintenance/replacement activities may be economically viable at earlier times as compared to a shorter payback period as operational costs may be larger over a long payback period. In other words, a price of maintenance/replacement can be more easily offset if operational costs are large in comparison to lower operational costs. Similarly, as the length of the payback period decreases, economic viability of maintenance/replacement may be more difficult to achieve as operational costs over a short payback period can be lower than over a long payback period which differs from a maintenance/replacement activity which may incur a set amount that is independent of the length of the payback period.

To ensure economic viability of performing maintenance/replacement of the building equipment has a sufficient chance of occurring, maintenance viability calculator 1104 and/or a component therein (e.g., scenario generator 1202, objective function generator 935, objective function optimizer 940, etc.) may set constraints on the length of the payback period such that the payback period is not too short and/or too long. For example, maintenance viability calculator 1104 may constrain the length of the payback period to be at least one year and no more than five years. In this way, achieving economic viability of maintenance/replacement at some point in time may be sufficiently likely, and can also ensure that maintenance/replacement is not occurring extremely frequently due to the payback period being too long. In some embodiments, the payback period is always restricted to be finite as an infinitely long payback period may result in maintenance/replacement constantly occurring.

Figure 13:
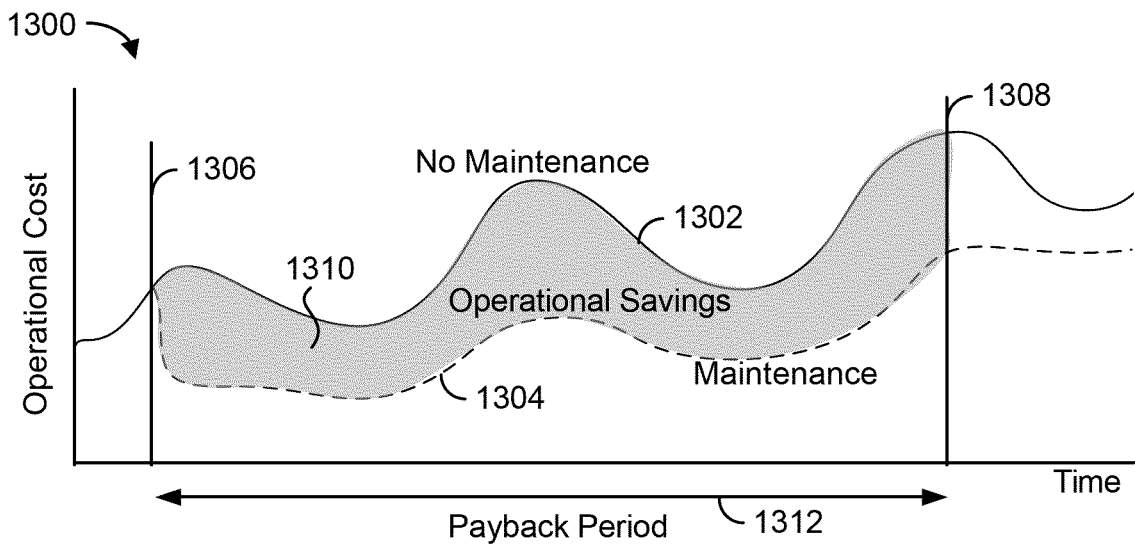
FIG. 13 is a graph illustrating a difference in operational costs incurred at each time during a payback period under a first scenario in which maintenance/replacement of building equipment is performed and a second scenario in which maintenance/replacement of building equipment is not performed, according to some embodiments.

Referring now to FIG. 13, a graph 1300 illustrating a difference in operational costs incurred at each time during a payback period under a first scenario in which maintenance/replacement of building equipment is performed and a second scenario in which maintenance/replacement of building equipment is not performed is shown, according to some embodiments. Graph 1300 is shown to include a series 1302. Series 1302 can illustrate estimated operational costs over time if no maintenance (and/or replacement) is performed on building equipment. Graph 1300 is also shown to include a series 1304. Series 1304 can illustrate estimated operational costs over time if maintenance (and/or replacement) is performed on the building equipment.

Series 1302 and series 1304 are shown to be equivalent until a start time 1306 of a payback period 1312. In this case, payback period 1312 can be defined as beginning at start time 1306 and extending for two years until an end time 1308. At start time 1306, series 1304 is shown to diverge from series 1302 due to estimated effects of maintenance/replacement of building equipment occurring. After start time 1306, estimated operational costs associated with series 1302 are shown to be consistently higher than estimated operational costs associated with series 1304 due to the maintenance/replacement improving a degradation state of the building equipment, thereby increasing operating efficiency and/or reliability. As such, operational costs over payback period 1312 are shown to be reduced due to the maintenance/replacement. It should be appreciated that FIG. 13 does not directly indicate a cost of performing the maintenance/replacement, only improvements in operational costs resulting from the maintenance/replacement.

The degradation state of the building equipment can be estimated based on various degradation models of the building equipment. For example, a degradation model can be provided by a manufacturer of building equipment to illustrate how the building equipment degrades over time. As another example, a degradation model can be generated by MPM system 602 based on an analysis of how loads and other inputs to the building equipment affect efficiency and reliability of the building equipment over time. The degradation model can capture how efficiency and reliability of the building equipment change over time based on an amount of usage of the building equipment, how long the building equipment is in operation, how maintenance/replacement affects the efficiency and reliability, etc. The degradation model can be used (e.g., by maintenance viability calculator 1104) to estimate the effect of performing maintenance/replacement on the building equipment and of operational costs over the payback period.

Graph 1300 is also shown to include an operational savings 1310. Operational savings 1310 can define an amount saved in operational costs between not performing maintenance/replacement at start time 1306 (i.e., as illustrated by series 1302) and performing maintenance/replacement at start time 1306 (i.e., as illustrated by series 1304). Operational savings 1310 can be calculated by scenario cost calculator 1204 and/or objective function optimizer 940 and used to determine if/when to perform maintenance/replacement of the building equipment. In particular, economic viability can be identified if operational savings 1310 (i.e., the shaded area of graph 1300) is equal to or greater than a cost of performing the maintenance/replacement. If operational savings 1310 is equal to or greater than a cost of performing the maintenance/replacement during the payback period, optimal strategy generator 1206 of maintenance viability calculator 1104 can generate equipment purchase and maintenance recommendations indicating maintenance/replacement should be performed at start time 1306. Alternatively, if operational savings 1310 less than a cost of performing the maintenance/replacement during the payback period, optimal strategy generator 1206 may generate equipment purchase and maintenance recommendations indicating that maintenance/replacement should not be performed at start time 1306.

In some embodiments, graph 1300 illustrates estimations made at a particular time step (e.g., a current time step) of the payback period. In terms of the scenario comparison described above with reference to FIGS. 11 and 12, start time 1306 can illustrate the beginning of time step k such that maintenance viability calculator 1104 can determine whether or not to perform maintenance/replacement at start time 1306. If start time 1306 does not result in economic viability of maintenance/replacement, operational costs associated with performing maintenance/replacement and with abstaining from maintenance/replacement can be reevaluated at a next time step, in which case the payback period can shift forward by one time step.

Figure 14:
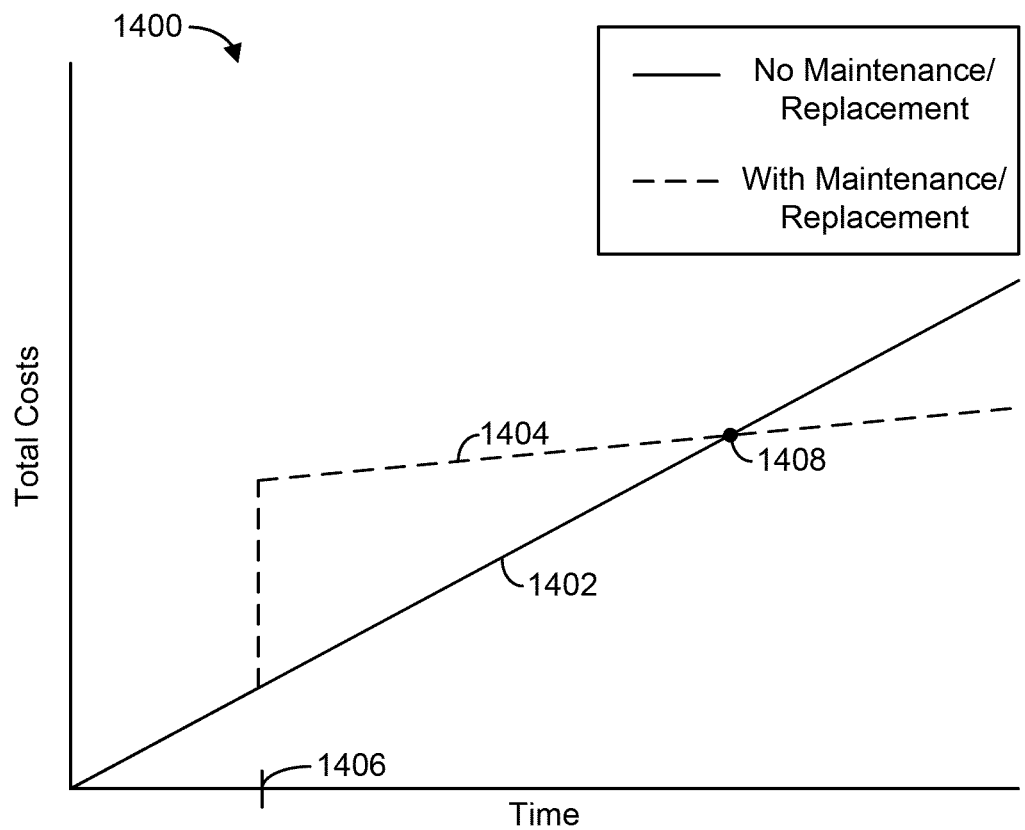
FIG. 14 is a graph illustrating total costs over time under a first scenario in which maintenance/replacement of building equipment is performed and a second scenario in which maintenance/replacement of building equipment is not performed, according to some embodiments.

Referring now to FIG. 14, a graph 1400 illustrating total costs over time under a first scenario in which maintenance/replacement of building equipment is performed and a second scenario in which maintenance/replacement of building equipment is not performed is shown, according to some embodiments. The total costs indicated by graph 1400 can indicate a total of operational, maintenance, and replacement costs. Graph 1400 can illustrate how maintenance viability calculator 1104, as described in greater detail above with reference to FIGS. 11 and 12, compares a baseline scenario where no maintenance/replacement of the building equipment occurs to a scenario where maintenance/replacement of the building equipment does occur.

Graph 1400 is shown to include a series 1402 illustrating total costs over time for a baseline scenario (i.e., a scenario where no maintenance/replacement of building equipment is performed). Graph 1400 is also shown to include a series 1404 illustrating total costs associated with a scenario where maintenance/replacement of building equipment is performed.

Series 1402 and series 1404 are shown to have equivalent total costs in graph 1400 until a time 1406. In some embodiments, time 1406 represents a time step k of a payback period at which a scenario comparison can be performed. At time 1406, series 1404 is shown to diverge from series 1402 due to estimated effects of a maintenance/replacement activity being performed on building equipment. At time 1406, total costs associated with series 1404 are shown to increase due to the maintenance/replacement being performed. As a result of the maintenance/replacement, a degradation state of the building equipment can be improved (e.g., lowered), thereby reducing operational costs associated with operating the building equipment. The reduction in operational costs is shown in graph 1400 by the slope of series 1404 being lower after time 1406 as compared to prior to time 1406.

To determine if the maintenance/replacement activity should be performed time 1406 (e.g., immediately), maintenance viability calculator 1104 can determine if an equivalence point 1408 is within a payback period starting at time 1406. Equivalence point 1408 can indicate a point where total costs associated with series 1402 and series 1404 are equal. If equivalence point 1408 is within the payback period, performing maintenance/replacement at time 1406 may be economically viable (i.e., series 1404 is an economically viable solution). If series 1404 is economically viable, a maintenance and replacement strategy can be generated such that maintenance/replacement is performed at time 1406. If equivalence point 1408 is not within the payback period starting at time 1406, series 1404 may not be economically viable. In this case, the maintenance and replacement strategy can be generated based on decisions variables associated with series 1402. If series 1404 is not economically viable, the comparison between series 1402 and series 1404 can be advanced by one time step to a next time step following time 1406.

Process for Performing Maintenance as Soon as Economically Viable

Figure 15:
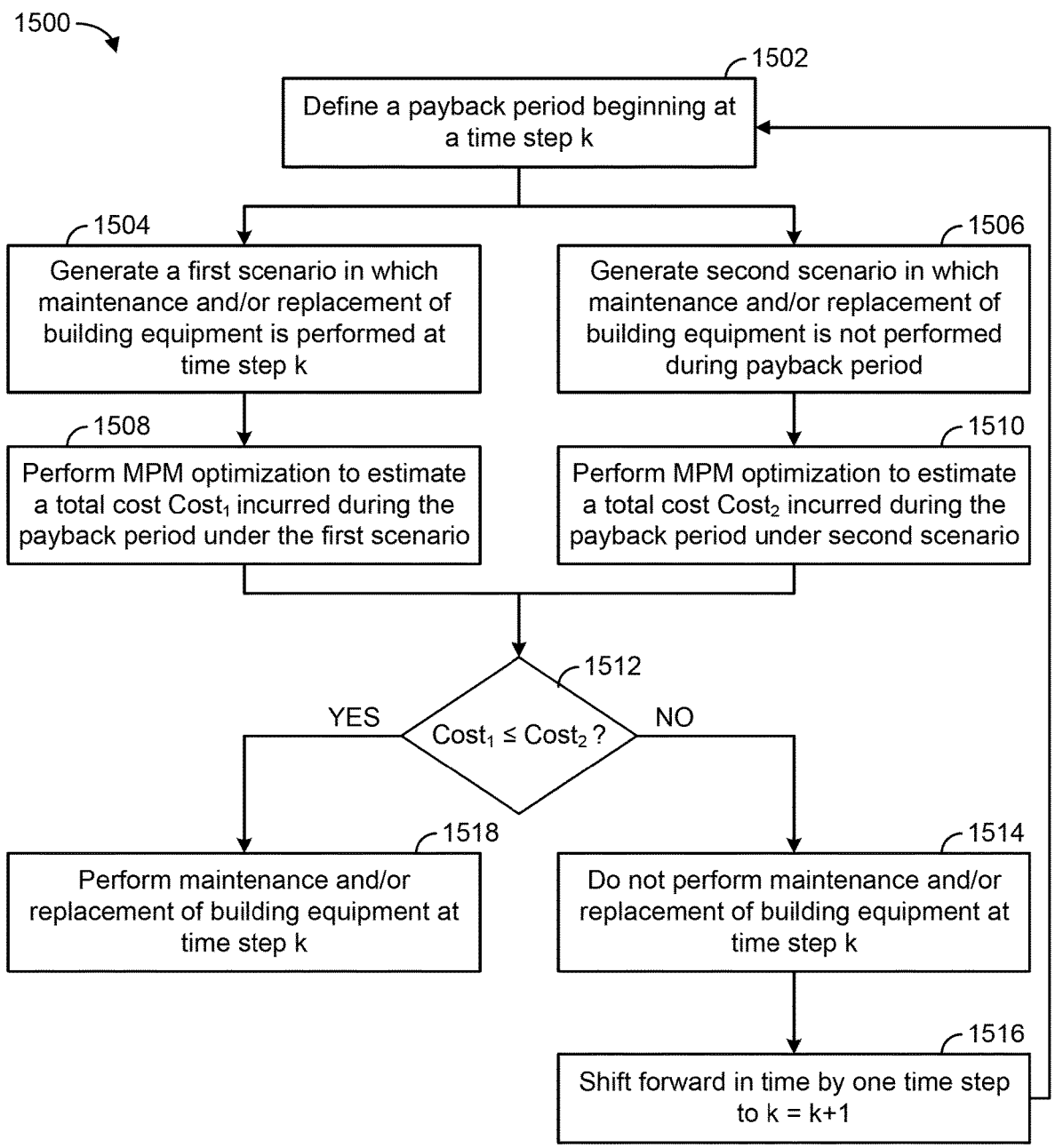
FIG. 15 is a flow diagram of a process for performing maintenance and/or replacement of building equipment, according to some embodiments.

Referring now to FIG. 15, a process 1500 for performing maintenance and/or replacement of building equipment is shown, according to some embodiments. Process 1500 can be performed to identify an earliest (or near earliest) time at which performing maintenance/replacement of building equipment is economically viable. By performing maintenance/replacement at the earliest economically viable time, the building equipment can be repaired/replaced at no additional cost to an entity (e.g., a customer, a building owner, etc.) associated with the building equipment as compared to continuing operation of the building equipment without performing maintenance/replacement. In this way, the entity can reduce a degradation state of the building equipment and a provider of maintenance and/or replacement services can get more business. It should be noted that process 1500 is shown specific to a case where decisions (e.g., operational decisions, maintenance/replacement decisions) are not predefined. Accordingly, process 1500 includes optimizations as an example of computations that can be performed to generate (define) the decisions. As described below, process 1500 can be manipulated for cases in which decisions are predefined by defining the decisions during scenario generation and skipping optimization steps to generate the decisions. In this case, costs of the scenarios may be computed based on the predefined decisions. In some embodiments, some and/or all steps of process 1500 are performed by BMS 606, MPM system 602, and/or components therein.

Process 1500 is shown to include defining a payback period beginning at a time step k (step 1502). The payback period can define an amount of time starting from time step k by which an entity (e.g., a customer, a building owner, an accountant, etc.) associated with the building equipment expects to offset (i.e., payback) a cost of performing maintenance/replacement if maintenance/replacement is performed. For example, the end of the payback period may be 6 months, two years, ten years, etc. from the beginning of time step k. By performing maintenance/replacement, a degradation state of the building equipment can be improved (e.g., lowered), thereby resulting in reduced operational costs. If savings due to reduced operational costs is large enough, the savings can offset the cost of performing the maintenance/replacement. The length of the payback period can be set automatically, by a user, etc. In some embodiments, the payback period is constrained to not extend beyond the end of a life cycle horizon if a life cycle horizon is considered. Effects of the life cycle horizon on the payback period are described in greater detail above with reference to FIG. 12. In some embodiments, step 1502 is performed by maintenance viability calculator 1104.

Process 1500 is shown to include generating a first scenario in which maintenance and/or replacement of building equipment is performed at time step k (step 1504). As described above, by performing maintenance/replacement of the building equipment at time step k, a degradation state of the building equipment can be reduced, thereby resulting in savings in operational costs over the payback period. Performing maintenance/replacement at time step k can also result in business for a provider of maintenance and/or replacement services at an earlier time than letting the building equipment, for example, run until failure. The first scenario can be generated by setting one or more decision variables of an objective function to indicate maintenance/replacement should occur at time step k (e.g., by setting the decision variables to 1). In some embodiments, if decisions are predefined, step 1504 can include defining some and/or all of the other decision variables including operational decisions and maintenance/replacement decisions. In this case, the decisions may be predefined by a user, automatically based on a previous decision set, etc. In some embodiments, step 1504 is performed by scenario generator 1202 of maintenance viability calculator 1104.

Process 1500 is shown to include generating a second scenario in which maintenance and/or replacement of building equipment is not performed during the payback period (step 1506). In some embodiments, the second scenario is referred to as a baseline scenario. The second scenario can be generated for later comparison against the first scenario to determine if maintenance/replacement of the building equipment should occur at time step k. In essence, the second scenario can define a scenario where the building equipment is allowed to continue to degrade over the payback period and is operated accordingly. In some embodiments, if process 1500 includes predefining decision variables, step 1506 may additionally include predefining other decision variables (e.g., the operational decision variables) in addition to defining the decision variables such that maintenance/replacement is not performed during the payback period. In some embodiments, step 1506 is performed by scenario generator 1202.

Process 1500 is shown to include performing MPM optimization to estimate a total cost $Cost_1$ incurred during the payback period under the first scenario (step 1508). $Cost_1$ as determined based on the optimization (or other computation) can define a total cost associated with performing maintenance/replacement of the building equipment as well as operating the building equipment over the payback period. The optimization can be performed based on an objective function generated for the first scenario. The objective function can be generated as to require maintenance/replacement be performed at time step k. From time step k onwards through the payback period, operating costs can be estimated based on estimated degradation states and usage of the building equipment. The estimated operating costs can then be added to the cost of performing maintenance/replacement on the building equipment to determine a value of $Cost_1$. In some embodiments, if decision variables are predefined, step 1508 may include estimating/computing $Cost_1$ directly based on the predefined variables and may or may not include additional computations. In some embodiments, step 1508 is performed by objective function optimizer 940 and/or scenario cost calculator 1204.

Process 1500 is shown to include performing MPM optimization to estimate a total cost $Cost_2$ incurred during the payback period under the second scenario (step 1510). As no maintenance/replacement is performed in the second scenario, $Cost_2$ can reflect an estimated price of continuing to operate building equipment from time step k onwards through the payback period as usual. In this case, the degradation state of the building equipment may continue to increase, thereby resulting in higher operating costs over time. However, as no maintenance/replacement activities are performed in the second scenario, $Cost_2$ may not include costs related to maintenance/replacement of building equipment. Similar to step 1508, if predefining decision variables is included in process 1500, step 1510 may include estimating/computing $Cost_2$ directly based on the predefined variables and may or may not include additional computations. In some embodiments, step 1510 is performed by objective function optimizer 940 and/or scenario cost calculator 1204.

Process 1500 is shown to include a determination of if $Cost_1$ is less than or equal to $Cost_2$ (step 1512). If $Cost_1 \leq Cost_2$ ("YES"), process 1500 can proceed to step 1518 as performing maintenance/replacement at time step k may be economically viable. If $Cost_1 > Cost_2$ ("NO"), process 1500 can proceed to step 1514 as performing maintenance/replacement at time step k may not be economically viable. In some embodiments, step 1512 is performed by optimal strategy generator 1206.

Process 1500 is shown to include not performing maintenance and/or replacement of building equipment at time step k (step 1514). Step 1514 can occur if performing maintenance/replacement is not economically viable at time step k. In this case, building equipment can continue to be operated as usual, which can lead to a worsening degradation state of the building equipment. However, if step 1514 is reached, it may be the case that allowing the building equipment to further degrade and any additional operational costs incurred due to degraded building equipment is still less expensive than performing maintenance/replacement and operating less degraded building equipment. Step 1514 can be fulfilled by generating a maintenance and replacement strategy for the building equipment that does not include maintenance/replacement occurring at time step k. In some embodiments, step 1514 is performed by optimal strategy generator 1206, MPM system 602, and/or BMS 606.

Process 1500 is shown to include shifting forward in time by one time step to k=k+1 (step 1516). As step 1516 can occur if performing maintenance/replacement at time step k is not economically viable, process 1500 can determine if performing maintenance/replacement is economically viable at a next time step (i.e., time step k+1). By shifting forward in time to the next time step, step 1516 can ensure optimizations are performed in regards to a future time rather than repeating at time step k. After step 1516, process 1500 can repeat beginning at step 1502. In some embodiments, if a life cycle horizon is being considered, process 1500 only repeats if the next time step (i.e., time step k+1) is within the life cycle horizon. If the life cycle horizon is considered and the next time step is not within the life cycle horizon, process 1500 may end at step 1516. However, in cases where the life cycle horizon is not considered, process 1500 can repeat until step 1518 is reached. In other words, if the life cycle horizon is not considered, process 1500 can repeat until performing maintenance/replacement is determined to be economically viable. In some embodiments, step 1516 is performed by maintenance viability calculator 1104 and/or MPM system 602.

Process 1500 is shown to include performing maintenance and/or replacement of building equipment at time step k (step 1518). Step 1518 can occur in process 1500 if performing maintenance/replacement at time step k is determined to be economically viable. If performing maintenance/replacement is economically viable, a cost of the maintenance/replacement activity can be offset (i.e., paid back) due to savings in operational costs over the payback period. In some embodiments, step 1518 can act as a final step of process 1500. As described above, process 1500 can repeat until a time step is identified where performing maintenance/replacement is economically viable (i.e., a time step where $Cost_1 \leq Cost_2$). Step 1518 can include generating a maintenance and replacement strategy for the building equipment that includes performing maintenance/replacement at time step k. In this way, a degradation state of the building equipment can be improved (e.g., lowered) to reduce operational costs over the payback period. If step 1518 is performed, at some point in time at or before the end of the payback period starting at time step k, an entity associated with the building equipment should cooperate (e.g., payback) costs related to performing the maintenance/replacement. In some embodiments, step 1518 is performed by optimal strategy generator 1206, MPM system 602, and/or BMS 606.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A model predictive maintenance system for building equipment, the system comprising:
one or more processing circuits comprising one or more processors and memory storing instructions that, when executed by the one or more processors, cause the one or more processors to perform operations comprising:
obtaining an objective function that defines a cost of operating the building equipment and performing maintenance on the building equipment as a function of operating decisions and maintenance decisions for the building equipment for a plurality of time steps within a time period;
performing iterations over time of:
a first computation of the objective function under a first scenario in which maintenance is performed on the building equipment during the time period, a result of the first computation indicating a first cost of operating and performing maintenance on the building equipment; and a second computation of the objective function under a second scenario in which maintenance is not performed on the building equipment during the time period, a result of the second computation indicating a second cost of operating the building equipment; and switching from controlling the building equipment in accordance with operating decisions defined by the second scenario to controlling the building equipment and causing performance of maintenance on the building equipment during the time period in accordance with operating decisions and maintenance decisions defined by the first scenario in response to reaching an iteration at which the first cost is less than or equal to the second cost.

2. The system of claim 1, wherein the first computation and the second computation are performed using a model that defines evolution of building equipment degradation over time and an effect of the building equipment degradation on performance of the building equipment.

3. The system of claim 1, wherein the objective function further defines a cost of replacing the building equipment as a function of replacement decisions for the building equipment for the plurality of time steps within the time period.

4. The system of claim 1, the iterations further comprising moving the time period over which the first computation and the second computation are performed forward in time with each successive iteration.

5. The system of claim 4, wherein performing the iterations comprises repeating the moving until an end of the time period is equal to or exceeds an end of a life cycle horizon.

6. The system of claim 1, wherein the objective function defines an interest rate, the interest rate indicating a value of money at a future time step, wherein the first computation and the second computation are performed subject to the interest rate.

7. The system of claim 1, the operations further comprising:
determining a set of operating states for the building equipment over the time period by performing at least one of an optimization or an analysis based on historical operating states;
wherein the first computation and the second computation are performed based on the set of operating states to determine operational costs under the first scenario and second scenario.

8. A method for performing model predictive maintenance of building equipment, the method comprising:
obtaining an objective function that defines a cost of operating the building equipment and performing maintenance on the building equipment as a function of operating decisions and maintenance decisions for the building equipment for a plurality of time steps within a time period;
performing iterations over time of:
a first computation of the objective function under a first scenario in which maintenance is performed on the building equipment during the time period, a result of the first computation indicating a first cost of operating and performing maintenance on the building equipment; and
a second computation of the objective function under a second scenario in which maintenance is not performed on the building equipment during the time period, a result of the second computation indicating a second cost of operating the building equipment; and switching from controlling the building equipment in accordance with operating decisions defined by the second scenario to controlling the building equipment and performing maintenance on the building equipment in accordance with operating decisions and maintenance decisions defined by the first scenario in response to reaching an iteration at which a determination that the first cost is less than or equal to the second cost.

9. The method of claim 8, wherein the first computation and the second computation are performed using a model that defines evolution of building equipment degradation over time and an effect of the building equipment degradation on performance of the building equipment.

10. The method of claim 8, wherein the objective function further defines a cost of replacing the building equipment as a function of replacement decisions for the building equipment for the plurality of time steps within the time period.

11. The method of claim 8, the iterations further comprising moving the time period over which the first computation and the second computation are performed forward in time with each successive iteration.

12. The method of claim 11, wherein performing the iterations further comprises repeating the moving until an end of the time period is equal to or exceeds an end of a life cycle horizon.

13. The method of claim 8, wherein the objective function defines an interest rate, the interest rate indicating a value of money at a future time step, wherein the first computation and the second computation are performed subject to the interest rate.

14. The method of claim 8, further comprising:
determining a set of operating states for the building equipment over the time period by performing at least one of an optimization or an analysis based on historical operating states;
wherein the first computation and the second computation are performed based on the set of operating states to determine operational costs under the first scenario and second scenario.

15. A controller for performing model predictive maintenance of building equipment, the controller comprising:
one or more processors; and
one or more non-transitory computer-readable media storing instructions that, when executed by the one or more processors, cause the one or more processors to perform operations comprising:
obtaining an objective function that defines a cost of operating the building equipment and performing maintenance on the building equipment as a function of operating decisions and maintenance decisions for the building equipment for upcoming time steps;
performing iterations over time as a beginning of the upcoming time steps advances, each iteration comprising:
a first computation of the objective function under a first scenario in which maintenance is performed on the building equipment during the upcoming time steps, a result of the first computation indicating a first cost of operating and performing maintenance on the building equipment over the upcoming time steps; and
a second computation of the objective function under a second scenario in which maintenance is not performed on the building equipment during the upcoming time steps, a result of the second computation indicating a second cost of operating the building equipment over the upcoming time steps; and controlling the building equipment in accordance with operating decisions defined by the second scenario until reaching an iteration at which the first cost is less than or equal to the second cost and then controlling the building equipment and causing performance of maintenance on the building equipment in accordance with operating decisions and maintenance decisions defined by the first scenario upon reaching the iteration at which the first cost is less than or equal to the second cost.

16. The controller of claim 15, wherein the first computation and the second computation are performed using a model that defines evolution of building equipment degradation over time and an effect of the building equipment degradation on performance of the building equipment.

17. The controller of claim 15, wherein the objective function further defines a cost of replacing the building equipment as a function of replacement decisions for the building equipment for the upcoming time steps.

18. The controller of claim 15, wherein performing the iterations comprises shifting the upcoming time steps forward in time and repeating the first computation and the second computation until the first cost is less than or equal to the second cost.

19. The controller of claim 18, wherein performing the iterations over time further comprises repeating the shifting, the first computation, and the second computation until an end of the upcoming time steps is equal to or exceeds an end of a life cycle horizon.

20. The controller of claim 15, wherein the objective function defines an interest rate, the interest rate indicating a value of money at a future time step, wherein the first computation and the second computation are performed subject to the interest rate.

* * * * *